(12) United States Patent
Colomb et al.

(10) Patent No.: US 7,649,160 B2
(45) Date of Patent: Jan. 19, 2010

(54) WAVE FRONT SENSING METHOD AND APPARATUS

(75) Inventors: Tristan Colomb, Martigny (CH);
Etienne Cuche, Lignières (CH); Nicolas Aspert, Lausanne (CH); Jonas Kuehn, Vevey (CH); Pierre Marquet, Cheseaux-sur-Lausanne (CH); Christian Depeursinge, Préverenges (CH); Frédéric Montfort, Lausanne (CH); Florian Charriere, Lausanne (CH); Anca Marian, Sherbrook (CA); Sébastien Bourquin, Moudon (CH); Yves Emery, Le Mont (CH); Silvain Herminjard, Neuchâtel (CH)

(73) Assignee: Lyncee Tec S.A., Lausanne (CH)

( * ) Notice: Subject to any disclaimer, the term of this patent is extended or adjusted under 35 U.S.C. 154(b) by 77 days.

(21) Appl. No.: 11/884,453

(22) PCT Filed: Feb. 17, 2006

(86) PCT No.: PCT/IB2006/050532

§ 371 (c)(1),
(2), (4) Date: Nov. 21, 2007

(87) PCT Pub. No.: WO2006/090320

PCT Pub. Date: Aug. 31, 2006

(65) Prior Publication Data

US 2008/0265130 A1 Oct. 30, 2008

(30) Foreign Application Priority Data

Feb. 23, 2005 (EP) .................................. 05101374

(51) Int. Cl.
*G03H 1/02* (2006.01)
*G03H 1/10* (2006.01)

(52) U.S. Cl. .................. 250/201.9; 359/9; 382/210
(58) Field of Classification Search ................. 382/210, 382/154; 250/201.9; 359/9–11
See application file for complete search history.

(56) References Cited

U.S. PATENT DOCUMENTS 6,262,818 B1 * 7/2001 Cuche et al. ............... 359/9

OTHER PUBLICATIONS

Stadelmaier et al, "Compensation of lens aberrations in digital holography", Optics Letters Opt. Soc. America USA, vol. 25, No. 22, 2000, pp. 1630-1632 (XP-002388510).
Ferraro et al, "Compensation of the inherent wave front curvature in digital holographic coherent microscopy for quantitative phase-contrast imaging", Applied Optics Opt. Soc. America USA, vol. 42. No. 11, 2003, pp. 1938-1946 (XP002388511).
Carl et al, "Parameter-optimized digital holographic microscope for high-resolution living-cell analysis", Applied Optics Opt. Soc. America USA, vol. 43, No. 36, 2004, pp. 6536-6544. (XP002388512).
Cuche et al, "Digital holography for quantitative phase-contrast imaging", Optic Letters, OSA, Optical Society of America, Washington, DC, US, vol. 24, No. 5, Mar. 1, 1999, pp. 291-293 (XP000823520).
International Search Report mailed Jul. 20, 2006 in PCT/IB2006/050532.
Written Opinion mailed Jul. 20, 2006 in PCT/IB2006/050532.

* cited by examiner

*Primary Examiner*—Georgia Y Epps
*Assistant Examiner*—Tony Ko
(74) *Attorney, Agent, or Firm*—Nixon & Vanderhye P.C.

(57) ABSTRACT

A new way of mixing instrumental and digital means is described for the general field of wave front sensing. The present invention describes the use, the definition and the utility of digital operators, called digital wave front operators (DWFO) or digital lenses (DL), specifically designed for the digital processing of wave fronts defined in amplitude and phase. DWFO are of particular interest for correcting undesired wave front deformations induced by instrumental defects or experimental errors. DWFO may be defined using a mathematical model, e.g. a polynomial function, which involves coefficients. The present invention describes automated and semi-automated procedures for calibrating or adjusting the values of these coefficients. These procedures are based on the fitting of mathematical models on reference data extracted from specific regions of a wave front called reference areas, which are characterized by the fact that specimen contributions are a priori known in reference areas. For example, reference areas can be defined in regions where flat surfaces of a specimen produce a constant phase function. The present invention describes also how DWFO can be defined by extracting reference data along one-dimensional (1D) profiles. DWFO can also be defined in order to obtain a flattened representation of non-flat area of a specimen. Several DWFO or DL can be combined, possibly in addition with procedures for calculating numerically the propagation of wave fronts. A DWFO may also be defined experimentally, e.g. by calibration procedures using reference specimens. A method for generating a DWFO by filtering in the Fourier plane is also described. All wave front sensing techniques may benefit from the present invention. The case of a wave front sensor based on digital holography, e.g. a digital holographic microscope (DHM), is described in more details. The use of DWFO improves the performance, in particular speed and precision, and the ease of use of instruments for wave front sensing. The use of DWFO results in instrumental simplifications, costs reductions, and enlarged the field of applications. The present invention defines a new technique for imaging and metrology with a large field of applications in material and life sciences, for research and industrial applications.

19 Claims, 25 Drawing Sheets

WAVE FRONT SENSING METHOD AND APPARATUS

This application is the US national phase of international application PCT/IB2006/050532 filed 17 Feb. 2006 which designated the U.S. and claims benefit of EP 05101374.6, dated 23 Feb. 2005, the entire content of which is hereby incorporated by reference.

FIELD OF THE INVENTION

The present invention is related in general to the field of wave front sensing and in particular to a method and apparatus involving specific means for the digital processing of wave fronts, in order to improve the performance, the ease of use, and the realization of wave front sensing systems.

STATE OF THE ART

Thanks to technologies for digital image acquisition, most imaging devices are now able to provide their results under a digital form, i.e. in a form that can be stored, processed, and presented with a computer. The majority of image sensors provide intensity images, which result from the conversion of the amplitude of a radiation into an electrical signal. When transmitted to a computer, these intensity images can be digitally processed. Classical methods for digital image processing apply on intensity images that are represented using real or integers numbers.

A first step towards the present invention has been described by E. Cuche and C. Depeursinge in patent WO200020929. In this reference, two particular examples of wave front operators have been introduced; the digital reference wave, and the digital phase mask. The function of the digital reference wave was to describe a digital replica of a reference wave used for recording a hologram. The function of the digital phase mask was to compensate for the wave front deformation induced by a microscope objective. The digital reference wave and the digital phase mask, as introduced in patent WO200020929, can be considered as particular cases of DWFO, but with a restricted definition compared to the definition of DWFO as introduced by the present invention. Moreover, the present invention describes several automated or semi-automated procedures, and in particular fitting procedures, which can be used for adjusting precisely a DWFO and that are not described in patent WO200020929. In addition, others novelties introduced by the present invention are, among others: The definition of DWFO for correcting aberrations of any type and of any order, the definition of DWFO for compensating errors associated to any instrumental defects, the definition of DWFO for compensating experimental or environmental errors, the definition of DWFO enabling instrumental simplifications, the introduction of DWFO for correcting intensity images, the possibility to apply several DWFO in several planes, the possibility to operate with a DWFO in the reciprocal or Fourier space, the possibility to operate with a DWFO by division or by convolution, the possibility to define a DWFO by filtering the Fourier transform of a wave front, more detailed and exhaustive descriptions of mathematical models that can be used to define DWFO, a more detailed and exhaustive description of the concept of reference specimen, the introduction a wave front analysis unit whose main function is to define reference data for proper application of fitting procedures, a detailed description of fitting procedures, a detailed description of fitting procedures enabling the definition of DWFO using one-dimensional and two-dimensional data, a method for tilt compensation, a method for compensating temporal offset variations, a method for compensating the shape of a specimen, methods for compensating specimen-induced effects.

In Optics Letters, Volume 25, Issue 22, pages 1630-1632, November 2000, a paper by A. Stadelmaier and J.-H. Massig, entitled *Compensation of lens aberrations in digital holography*, describes the use of a phase error function for correcting digitally the spherical aberration of an objective lens in digital holography. The phase error function presents similarities with DWFO and can be considered as a particular case of DWFO, but with a restricted definition. Moreover, the phase error function was determined using a pin-hole as reference specimen, while the present invention uses preferably flat surfaces as reference objects. Finally this paper does not describe automated or semi-automated procedures, fitting procedures in particular, for adjusting the phase error function.

In Applied Optics, Volume 42, Issue 11, pages 1938-1946, a paper by P. Ferraro, S. De Nicola, A. Finizio et al, entitled *Compensation of the inherent wave front curvature in digital holographic coherent microscopy for quantitative phase-contrast imaging*, describes different methods for correcting digitally the defocusing (parabolic) deformation of the phase of a wave front. Here also, a correcting phase factor is used and can be considered as a particular case of DWFO, but with a restricted definition. Moreover this paper does not describe automated or semi-automated procedures, fitting procedures in particular for adjusting the correcting phase factor.

In Ultramicroscopy, Volume 85, Issue 3, pages 165-182, a paper published in 2000, by M. Lehmann, entitled *Determination and correction of the coherent wave aberration from a single off-axis electron hologram by means of a genetic algorithm*, describes a method, involving digital procedures, for evaluating and correcting aberrations in electron holography. This paper describes the use of a phase plate, which can be considered as a particular case of DWFO, but with a restricted definition. The main differences with the present invention are:

- The phase plate acts only in the reciprocal (Fourier) space, while DWFO may act both on reciprocal and direct spaces.
- The phase plate comprises only a limited number of five symmetrical aberrations, while DWFO as described here may comprise indifferently symmetrical and anti-symmetrical aberrations of any orders.
- This reference describes a semi-automatic method for adjusting the coefficients of the phase plate. This method combines a genetic algorithm and a simplex algorithm, while automated procedures described here uses preferably standard fitting procedures, that are simpler to implement, and that perform faster. Moreover the described genetic-simplex algorithm uses only amplitude data to adjust the parameters, while the present invention uses preferably phase data. Finally, the described algorithm is restricted to the approximation of weak phase objects, which is not the case with the present invention.

In Applied Optics, Volume 34, Issue 36, pages 6536-6544, a paper published in December 2004, by D. Carl, B. Kemper, G. Wernicke and G. von Bally, entitled *Parameter-optimized digital holographic microscope for high-resolution living-cell analysis*, describes a method for reconstructing and processing wave fronts from digitally acquired off-axis holograms. This paper describes the use of a synthetic hologram, which can be considered as a particular case of DWFO, but with a restricted definition. The main differences with the present invention are:

The paper describes the reconstruction of a complex wave front by a non-diffractive method that requires several assumptions and that imposes limitations. For example, it is assumed that rapid intensity variations in the hologram plane are only due to a phase difference between an object wave and a reference wave. It is also assumed that the object wave can be approximated by a constant within neighboring pixels in the hologram plane, i.e. that the object wave is assumed to be a slowly varying function. The present invention do not suffers from these limitations.

The method described by the paper imposes prior recording and reconstruction of a hologram without object. This is not required by the present invention.

The synthetic hologram acts by subtraction while a DWFO acts by multiplication or division or convolution.

The synthetic hologram is calculated with a mathematical model restricted to the second order (3 coefficients), meaning that wave front processing capabilities, and in particular wave front correction capabilities are strongly restricted compared to the present invention.

The synthetic hologram is calculated with a mathematical model involving parameters. These parameters are first evaluated by measuring distances and sizes on an image reconstructed without object. Then, if necessary, an iterative approach is mentioned for finer adjustment. The present invention describes parameters adjustment using fitting procedures that are not described by the paper and that is more straightforward, more flexible and more powerful.

In summary, all above-mentioned references describe the use of digital procedures for wave front processing presenting similarities with the present invention. There are however important differences between these works and the present invention, including at least one of the following points:

Above-mentioned works restrict the use of digital procedures to the correction of effects associated to an objective lens, and in some cases to the compensation of a tilt aberration (e.g. a tilt aberration resulting from off-axis geometry). The present invention extends digital processing possibilities to a much larger palette of functions including for instance compensation of instrumental errors induced by any of the instrument's components, compensation of instrumental errors induced by misalignments, compensation of environmental and experimental errors, compensation of specimen-induced errors.

Among above mentioned works, the most sophisticated mathematical model for defining a DWFO-equivalent tool is described in the paper by M. Lehmann, which describes a mathematical model involving 5 parameters and which enables to describe aberrations up to order 4 (spherical, defocus, astigmatism and coma). Other works are limited for most of them to the defocus aberration (order 2) or to the spherical aberration (A. Stadelmaier and J.-H. Massig). The present invention describes procedures for defining and adjusting DWFO without restrictions for the definition of a mathematical model.

None of the above-mentioned references describe automated or semi-automated procedures for adjusting the coefficients involved by a DWFO, based on fitting procedures as described by the present invention.

None of the above mentioned references introduce the concept of reference data extracted by a wave front analysis unit defining automatically, or semi-automatically, areas where specimen contributions are a priori known.

None of the above-mentioned references describe instrumental simplifications resulting from the use of DWFO. The only exception is patent WO200020929, which mentions the use of a mathematical operator for replacing a microscope objective in the reference arm of an interferometric setup. The present invention is much more general from this point of view.

None of the above-mentioned references describe cost reductions resulting from the use of DWFO. In particular, none of the above-mentioned works describe the possibility to reduce the quality of elements embedded in a wave front sensor.

None of the above-mentioned references describe simplifications of the use of an apparatus resulting from the use of DWFO.

None of the above mentioned works describes an improvement of the stability and robustness resulting from the use of DWFO.

None of the above-mentioned references describe the possibility to combine several DWFO or DL, possibility in combination with propagation calculations. The only exception is patent WO200020929, which describes two planes (hologram plane and observation plane) but operators described in patent WO200020929 are only particular cases of DWFO.

None of the above-mentioned references describe the use of DWFO for correcting intensity images.

None of the above-mentioned references describe the possibility to operate with a DWFO indifferently in the reciprocal space or in the direct space.

None of the above-mentioned references describe the possibility to operate with a DWFO indifferently by multiplication, by division or by convolution.

None of the above-mentioned references describe the possibility to define a DWFO by a filtering procedure in the Fourier plane of a wave front.

Compared to above-mentioned references, the present invention gives a much more detailed and exhaustive descriptions of mathematical models that can be used to define DWFO.

Compared to above-mentioned references, the present invention gives a much more detailed and exhaustive description of the concept of reference specimen.

None of the above-mentioned references introduces a wave front analysis unit whose main function is to define reference data for proper application of fitting procedures.

None of the above-mentioned references describe fitting procedures enabling the definition of DWFO using one-dimensional data.

None of the above-mentioned references describe an automatic method specifically dedicated for tilt compensation. This is however a very important feature for practical applications, None of the above-mentioned references describe a method for compensating temporal offset variations.

None of the above-mentioned references describe a method for compensating the shape of a specimen.

None of the above-mentioned references describe methods for compensating specimen-induced effects.

Links can also be established between digital procedures described by the present invention and mathematical or numerical methods developed and used for describing or simulating or designing imaging devices, such as Fourier optics, linear canonical transforms and optical design software. The main common point between these methods and the present invention is the use of complex operators describing optical functions and devices. Others common points are the use of numerical models describing wave propagation and the use of fitting procedures applied on phase data in order to describe and to quantify the aberrations or the errors of a system. There are however a fundamental difference between these methods and the present invention. First, the implementation of these methods as commercial products define purely software tools, whereas the present invention describes a method and apparatus that mixes digital processing and instrumental features. Second, digital processing possibilities offered by these techniques are focused on two main functions: wave front analysis and simulation imaging systems, but the possibility to process wave fronts in real-time, in particular for correction purposes, is not a function of these methods.

Another category of imaging techniques presenting similarities with the present invention is de-convolution microscopy or de-convolution imaging, which is an image processing technique that can be utilized for improving the contrast and resolution of digital images captured by a microscope. The main function of de-convolution microscopy is to remove the blurring present in microscope images induced by the limited aperture of the objective. A common point with the present invention is the idea to improve the performance of an imaging device by application of digital processing method. Another common point is the recourse to an operator called point spread function (PSF), which is defined by a mix between analytical models and experimental measurements. However de-convolution techniques apply only on intensity images, and in particular on intensity images acquired by classical optical microscope. De-convolution techniques are not designed for processing the result of wave front sensors providing amplitude and phase information. The PSF operator can therefore not be understood as being a digital wave front operator since phase information is absent from the calculation performed by de-convolution techniques. Phase information is also absent from the results provided by a de-convolution microscope. However, an extension of the PSF concept, called complex PSF or optical transfer function (OTF), comprising both amplitude and phase transfer functions, can be understood as a particular case of digital wave front operator as described further.

SUMMARY OF THE INVENTION

The present invention considers the operations of image sensing and digital image processing within the scope of complex numbers, which is more appropriate to describe the physical process of image formation, since wave fronts are defined by their amplitude and phase, and since it is more compatible with the mathematical formalism describing wave propagation. Instead of standard intensity images, the present invention considers wave fronts defined by their amplitude and phase.

The present invention relates to the category of imaging devices defined by the family of wave front sensors. Wave front sensors are apparatus that are able to detect the amplitude and phase of a radiation, possibly after interaction with a sample. As examples of wave front sensors, we can mention apparatus that detect the phase thanks to an interference process, such as interferometers, holographic devices, ellipsometers, differential interference contrast (DIC) microscope, Zernike phase-contrast (PhC) microscope, fringe projection devices. As other examples of wave front sensors we can mention apparatus that detect the phase thanks to electronics devices, such as acoustic imaging devices.

The present invention relates also to the use of any kind of classical intensity imaging techniques that can operate as a wave front sensor thanks to a particular procedure, e.g. if one can retrieve the phase of a wave front thanks to several intensity images acquired in different conditions. Another example is a wave front constructed using an intensity image, by adding a phase defined mathematically thanks to numerical means. Therefore the present invention relates also for example to the use of an optical microscope, a confocal microscope, an electron microscope, an X-ray imaging device, a camera, a telescope, an endoscope.

One of the strengths of wave front sensors is their ability to achieve sub-wavelength, high resolution and high precision imaging and metrology, thanks to an access to the phase of a radiation. As a result of this high sensitivity wave front sensors are also highly sensitive to external perturbations. Moreover a high degree of precision is required for the realization and assembly of all components embedded in a wave front sensor. This results in expensive instruments and reduces the field of applications to environments showing relatively low levels of perturbations.

Processing wave fronts using digital procedures, as proposed by the present invention, provides advantages for wave front sensing, in particular for industrial applications, since it permits several technical benefits and original features, such as:

Digital procedure can be applied to compensate measurement errors due to defects of the instruments, e.g. defects of its components or defects in the arrangement of its components.

Components of standard instruments can be suppressed by replacing their function with a numerical procedure.

Digital processing methods, possibly automated methods, can be applied to replace some actions, usually performed by acting physically on the apparatus or on the experiment, such as positioning and orienting the specimen or components of a wave front sensor.

The robustness and the stability of the measurements can be improved by applying digital procedures that monitor and compensate the effect of environmental perturbations.

The precision of the measurements can be adapted to different levels by changing the complexity of the mathematical models used by the procedure for digital wave front processing, without additional costs, except may be a small increase of the processing time.

For one of the embodiments of the present invention, high precision measurements can be achieved on the basis of only one image acquisition, resulting in a speedup of the process compared to numbers of wave fronts sensors, such as those using phase shifting interferometry (PSI), which require several acquisitions.

Digital procedures can be applied to compensate for the shape of the specimen, e.g. in order to obtain a flattened representation of non-flat samples.

The function of a digital procedure can be adapted dynamically to follow temporal evolutions.

The main advantages of the present invention can be summarized as follows: reduced costs, improved performance, especially in terms of precision and speed, improved ease of use, improved robustness with respect to environmental perturbations, improved flexibility and enlarged field of applications.

In their classical implementation, most conventional systems for image or wave front sensing and processing can be described as comprising three distinct parts:

An instrument for forming image or a wave front from a specimen.

An image sensor comprising means for analogue to digital (AD) conversion.

A processing unit, such as a computer, for digital processing.

In most conventional systems, even if these three parts are interfaced, they are considered as separate entities, and each of these parts are developed and optimized separately for a given application or a desired level of performance. With the present invention, the processing unit and the apparatus are connected in a much closer way, which will become apparent in what follows. For example, the present invention describes digital procedures that enable significant simplifications of the instrument.

When connected to a unit for digital processing, conventional wave front sensing systems processes the intensity information and the phase information as separate entities defined by real-valued digital images. With the present invention, intensity information and phase information are processed together by applying digital processing to a digital wave front defined mathematically as a complex-valued image or a complex-valued array. This fundamental difference opens new possibilities and enlarges the potential of digital processing to several tasks that can not be achieved with conventional systems.

With most conventional systems, the functions of the digital processing unit can be divided into five different classes:

Analysis: The digital processing unit may be used to measure data.

Control of the image sensor: The processing unit may comprise means to control features of the image sensor, such as exposure time and gain.

Control of the instrument: The processing unit may comprise means to control features of the instrument, such as the power of a radiation source, or motorized parts used for the positioning of the specimen or for the positioning of an element of the instrument.

Monitoring the instrument: The processing unit may comprise means for measuring data from sensors, other than the image sensor, incorporated in the apparatus.

Image quality improvement: Digital procedures can be applied to improve the quality of the images, or the precision of measurements performed on the images. For example, the noise can be reduced thanks to statistical tools, or frequency filtering tools, or by subtracting an image calibrated with a reference specimen.

Of course, combinations of theses tasks can be implemented. With the present invention, the functions of digital processing are extended broadly over the fields described above for reasons that will become apparent in what follows. In particular, the fact that digital processing is applied to wave fronts, i.e. complex images, instead of being applied to simple intensity images is clearly an advantage for quality improvement issues. Digital wave front processing, as defined by the present invention offers also unique features for instrumental defects compensations, as well as for costs reduction, instrumental simplification and ease of use improvement.

The present invention relates to the use of digital wave front operators (DWFO), which define a class of digital operators specially defined for the processing of wave fronts. DWFO are also called digital lenses (DL), because they may act digitally in a way that is comparable to the way a lens acts physically on a radiation, i.e. by deforming a wave front. There is however an important difference between a classical lens and a DWFO or a DL, since a classical lens is realized by machining or molding a piece of material such as glass, whereas DWFO or DL can be defined in a very flexible way by simply adapting a mathematical model. Therefore, the shape of a classical lens is restricted by the possibilities offered by machining or molding technologies, and lenses with special shapes, e.g. a shape different from the spherical shape, may be complex to realize and expensive. On the contrary, there are almost no limits for defining a DL and its function. Therefore, DL may realize operations that could not be realized by classical lenses. For example, as shown here, a single DL can be used to compensate perfectly strong and high order aberrations, while a combination of several classical lenses should be used to achieve a similar result.

Classical lenses and DL or DWFO have in common the fact that combinations of several elements can be realized. Often, classical imaging systems combine several lenses for a specific function. With digital lenses, it is also possible to combine several elements. With combinations of DL, the propagation of the radiation between successive elements must be performed numerically. Another difference is that the number of elements may be reduced with DL, because the flexibility offered for defining DL enables to combine the functions of several elements in a single element.

Digital procedures using DWFO and DL can be efficiently used for correcting wave fronts. Wave front correction is the traditional field of optical design. Optical imaging techniques, optical microscopy in particular, ensure high quality images thanks to the definition of sophisticated optical assemblies, and thanks to the use of highly precise components, that minimize undesired wave front deformations. Undesired wave front deformations caused by an imaging instrument are often called aberrations. With wave front sensors in general, and more particularly with interferometers and holographic imaging devices, the problem of wave front correction is very critical because the determination of reliable and precise phase information imposes more strict conditions on the instrument design and on the quality of its components. Moreover, techniques involving an interference process, such as interferometry or holography, require apparatus comprising devices for generating a reference wave, in addition to the devices used for generating an object wave from a specimen. In this case, wave front deformations must be minimized for both the reference and objects waves, and a standard rule imposes that the two waves must undergo exactly the same deformations. This conducts to complex and expensive instruments, which are difficult to use. The present invention enables efficient and precise wave front correction, with a digital approach that simplifies the design and the use of wave front sensors.

The use of DWFO provides new and original procedures for digital processing that apply at a level that cannot be achieved with conventional systems. In particular the present invention extends the possibilities of digital processing to what follows:

Instruments can be realized with components of reduced quality and costs: DWFO can be used to compensate for the lack of precision that may result from the replacement of a high quality component by a lower quality component in an apparatus. For example, lenses and objective lenses designed to minimize aberrations can be replaced by more simple and less expensive lenses without loss of precision and accuracy.

Instruments can be realized with a reduced number of components: DWFO can be used to replace the function of components usually included in a wave front sensor. For instance, with interferometric systems, such as interference microscopes or digital holographic microscopes (DHM), the use of DWFO enables to avoid the presence of an objective lens in the reference arm, as required for example by the Linnick configuration. For example, a DWFO can be used to replace the field or tube lens usually required when working with infinity corrected microscope objectives. For example, DWFO or combinations of DWFO can be used to change the magnification of a system without modifying the optical design.

Instruments can be realized with reduced costs larger tolerances and reduced precision: Most wave front sensors, especially interferometric wave front sensors, must be realized with a high degree of precision for the alignment and positioning of elements embedded in the instrument. DWFO can be used to compensate for the lack of precision that may result from imperfections in the alignment and positioning of elements.

The use of the instrument can be simplified: Most wave front sensors are sophisticated instruments and their use requires specific know-how. For example, most conventional instruments require a high precision for the position and the orientation of the specimen, as well as for the position and orientation of a reference surface. The use of DWFO enables to simplify the use of the instrument. For example, DWFO can be used to compensate for the lack of precision that may result from an approximate positioning or orientation of the specimen or of a reference surface.

Reduced sensitivity to environmental perturbations: To ensure reliable performance, in particular measurement precision and stability, most wave front sensors must be insulated from environmental perturbations, such as mechanical vibrations. The measurement stability can be improved by applying DWFO designed for monitoring and compensating temporal variations Moreover, the present invention describes DWFO that are specifically adapted for the processing of wave fronts extracted from off-axis holograms or interferograms, which present the advantage that the information necessary to build a wave front can be acquired with a single image capture, possibly during a very short time period. This results in an improved robustness with respect to environmental perturbations.

Increased possibilities for system automation: As a result of their complex use, automation of wave font sensors is a matter of constant developments in order to minimize operator's interventions. Such automated procedures involve generally motorized translation stages or plateform with angular degrees of freedom, driven automatically thanks to diverse means such as feed-back loops, sensors and signal or image analysis procedures. DWFO can be used to define efficient automated procedures, with the advantage that these procedures reduce, or even completely suppress the need for motorized systems and moving parts.

In-line or real-time correction possibilities: DWFO can be adapted in real-time to follow temporal evolution of instrumental or experimental features. In particular, the present invention offers flexible and attractive issues within the context of adaptive optics. For example, a DWFO can be used to replace a deformable mirror, a spatial light modulator, a liquid crystal devices or an active system that modulates physical wave fronts.

Compensation of specimen-induced effects: DWFO can be used to suppress or to attenuate undesired contributions from the specimen, such as specimen-induced aberrations. For example, the wave front coming from non-flat specimen can be processed in order to obtain a flattened representation of the specimen.

The present invention describes several mathematical models or functions, which can be used to define and compute DWFO. These mathematical models involve coefficients. The present invention describes several procedures, fully automated or semi-automated, that can be used to adjust these coefficients or parameters. These procedures may also use reference specimens or test targets, to calibrate at least a part of the coefficients.

The present invention describes also procedures that may be applied to calibrate experimentally a DWFO by using a reference specimen. The present invention describes also the definition of DWFO obtained by filtering spatial frequency in the Fourier plane of a wave front, or in the Fourier plane of a hologram or interferogram.

In summary, the present invention describes a method and apparatus for wave front sensing, which combines instrumental and digital processing in a way which is original and which offers numerous technical advantages, in terms of performance, instruments realization and conception.

One primary object of the invention is a wave front sensing system that comprises an apparatus for wave front sensing called wave front sensor, and a method for digital processing of wave fronts. The system mixes digital processing and instrumental features of the wave front sensor, in a way that simplifies the wave front sensor without decreasing the performance of the system, but even improving the performance of the system.

Another object of the invention is a method for digital processing of wave fronts that is suitable for automated implementation, or partially automated implementation, resulting in an improved ease of use of the system.

Still another object of the invention is a method for digital processing of wave fronts that reduces the sensitivity of the system regarding environmental perturbations.

Still another object of the invention is a method for digital processing of wave fronts that broadens the field of application of the system.

Still another object of the invention is a method for digital processing of wave fronts that reduces the costs of a wave front sensor.

Therefore according to these and other objects, the present invention describes the use, the definition and the utility of digital or numerical operators, called digital wave front operators (DWFO), which are specifically designed for the digital processing of wave fronts. DWFO may also be called digital lenses (DL), since they may act digitally in a way that is comparable to the way a lens acts physically on a radiation.

One of the main functions of DWFO is to compensate for instrumental imperfections at the wave front sensor level. DWFO can also be used to reduce the number of elements in a wave front sensor. DWFO can also be used to reduce the quality and the costs of elements embedded in a wave front sensor. DWFO can also be used to reduce the precision of the arrangement of elements embedded in a wave front sensor.

Another function of DWFO is to simplify the use of the system. For example, DWFO can be used to compensate for an imperfect alignment or positioning or orientation of a specimen with respect to a wave front sensor. For example, DWFO can be used to compensate for an imperfect alignment or positioning or orientation of a reference surface embedded in a wave front sensor.

Another function of DWFO is to improve the measurement stability and repeatability by reducing the sensitivity of the system to environmental perturbations. For example, DWFO can be used to monitor and to reduce temporal fluctuations due to environmental perturbations, such as mechanical vibrations.

Another function of DWFO is to compensate for effects associated to the specimen under investigation. For example, DWFO can be used to obtain a flattened representation of non-flat specimen. For example, DWFO can also be used to compensate for specimen-induced undesired effects.

Several DWFO can be combined, possibly in combination with procedures for computing the propagation of wave fronts, in order to fill a specific function. For example a combination of DWFO can be used to magnify images.

Another function of DWFO is to enable reliable performance for wave front sensing using instruments not specifically designed or optimized for wave front sensing. For example, DWFO can be used, possibly in combination with instrumental features, for sensing wave fronts by use of instruments derived from conventional instruments designed for imaging purposes, such as a microscope, a stereo-microscope, a confocal microscope, a phase-contrast microscope, a differential interference contrast (DIC) microscope, an endoscope, a camera or a telescope.

Another function of DWFO is to enable reliable imaging and speed performance with instruments not specifically designed or optimized for imaging purposes. For example, DWFO can be used, possibly in combination with instrumental features, to improve the performance, in particular speed and image quality, of interferometers, or ellipso-meters, or refracto-meters, or evanescent wave microscope, or total internal reflection microscopes. For example, DWFO can be used to improve the image quality of low cost wave front sensors. For example, DWFO can be used to obtain reliable images from instruments using cylindrical lenses as objective lens. For example, DWFO can be used to obtain reliable images from instruments using an objective lens such as a single lens, a ball lens, a half ball lens or a solid immersion lens.

DWFO are complex operators defined in amplitude and phase. DWFO may be defined using a mathematical model or function. For example, a DWFO can be defined using a complex function whose phase is defined by polynomial functions. The complexity of the mathematical model can be adapted with a great flexibility to suit the desired function of the system or depending on the desired degree of performance of the system.

A DWFO may also be defined experimentally thanks to calibration procedures using a reference specimen.

A DWFO may also be defined directly from a measured wave front. For example, a DWFO may be defined by a filtering operation in the Fourier plane or in the reciprocal space of a wave front, e.g. a low-pass filtering operation, or band-pass filtering operations, or a high-pass filtering operation.

When a mathematical model is used for defining a DWFO, this mathematical model involves coefficients. The present invention describes automated and semi-automated procedures for calibrating or adjusting the values of these coefficients. These procedures are based on the fitting of mathematical models or functions on reference data. Reference data are phase or amplitude or intensity data extracted from specific areas of a wave front called reference areas. Reference areas are characterized by the fact that the contributions of the specimen inside reference areas are a priori known, meaning that the specimen shape is known, or assumed to be known, in the corresponding regions of the specimen. For example, reference areas can be flat area located in or around a specimen under investigation. Various fitting procedures can be applied to evaluate the coefficients. The choice of a procedure is essentially driven by the mathematical model, and by the nature of the reference areas. The reference data, extracted from reference areas, can be at least one of, or a combination of: a set of points, a set of one-dimensional lines or a set of two-dimensional surfaces.

DWFO are preferentially two-dimensional (2D) functions. The present invention describes how DWFO can be defined by extracting reference data along one-dimensional (1D) profiles.

A reference specimen, e.g. a mirror, can be used to calibrate the values of the coefficients. In this case, reference data can be extracted from the entire field of view (FOV).

Reference areas can also be defined in order to obtain a flattened representation of a non-flat area of a specimen.

All wave front sensing techniques may benefit from the present invention. The case of a wave front sensor based on digital holography, e.g. a digital holographic microscope (DHM), is described in more details by the present invention.

The use of DWFO improves the performance, e.g. speed and precision, and the ease of use of instruments for wave front sensing. The use of DWFO may result into technical simplifications and costs reductions at the instrumental level. The use of DWFO widens the field of applications of wave front sensing techniques.

The present invention defines a new technique for imaging, microscopy in particular, and metrology with a large field of applications in material and life sciences, for industrial applications, quality control in particular, development applications and research applications. Among others the present invention is particularly recommended for the following applications: surface topography measurements, surface analysis, optical testing, non-invasive biological cells and tissues imaging and monitoring, cell on chip inspections, micro-fluidic devices inspections, inspections—dynamic inspections in particular—of micro electromechanical systems (MEMS) and micro opto electromechanical systems (MOEMS), characterization of surfaces and internal structures in transparent and semi-transparent specimen, inspection of micro-injected or molded parts.

BRIEF DESCRIPTION OF THE DRAWINGS

FIG. 10A shows, in perspective, the phase image of a sample composed of hemispherical particles on a flat glass plate.

FIG. 10B presents an image where regions that should not be considered as reference areas have been removed and replaced by a texture pattern.

FIG. 17A presents, in perspective, the phase image obtained by definition of the reference areas on a flat surface.

FIG. 17B presents the result after phase unwrapping of FIG. 17A.

FIG. 17C presents the result when reference areas have been defined on the metallic sphere.

FIG. 18A presents, the phase image obtained by definition of the reference areas on a flat surface.

FIG. 18B presents the result after phase unwrapping of FIG. 18A.

FIG. 18C presents the result when reference areas have been defined on the lens.

FIG. 24A presents the image obtained for a correction with a Zernike polynomial of order 6, and FIG. 24B for a Zernike polynomial order 17. As can be seen wave front correction according to the present invention enable significant improvement of image quality.

FIG. 25A present a first image numerically reconstructed without special processing.

FIG. 25B present a magnified image obtained by defining a DWFO playing the role of a digital lens acting as a magnifying lens. Compared to others digital methods for zooming images, the present procedure presents the advantage that no information is lost as a result of interpolation.

DETAILED DESCRIPTION OF THE INVENTION

General Description of the System

Figure 1:
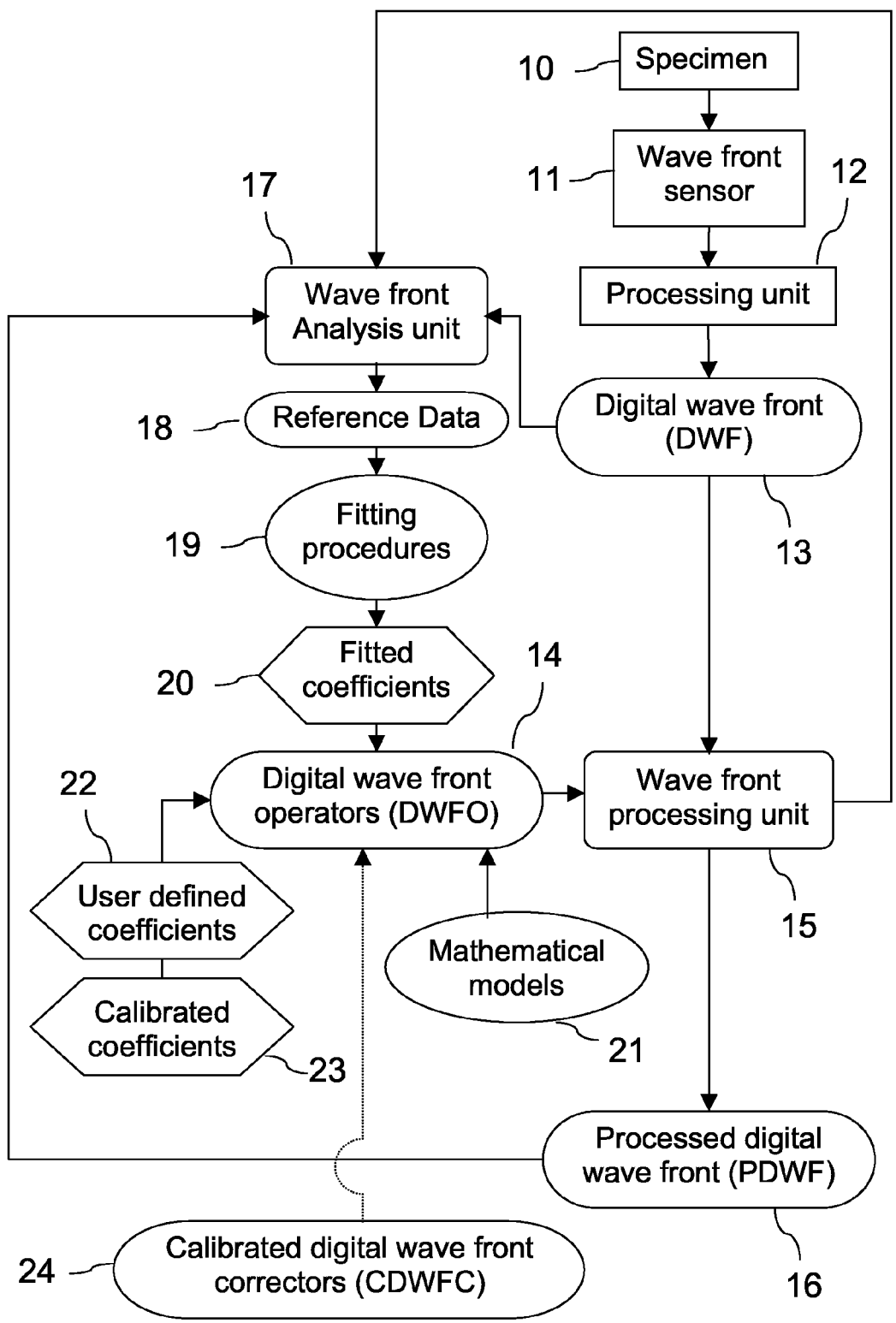
FIG. 1 describes schematically a wave front sensing system and wave front processing according to the present invention.

As shown in FIG. 1, a wave front sensing system according to the present invention comprises a specimen (10) investigated by a wave front sensor (11). The wave front sensor (11) is connected to a processing unit (12) providing a digital wave front DWF (13). The digital wave front DWF (13) is processed by at least one digital wave front operator DWFO (14), thanks to a wave front processing unit (15), in order to produce a processed digital wave front PDWF (16). A wave front analysis unit (17) is connected to at least one of: the digital wave front DWF (13), the wave front processing unit (15), the processed digital wave front PDWF (16). The wave front analysis unit (17) provides reference data (18). At least one fitting procedure (19) is applied on the reference data (18) to provide fitted coefficients (20). At least one digital wave front operator DWFO (14) is defined using at least one mathematical model (21) and using at least one of: the fitted coefficients (20), the calibrated coefficients (22), the user defined coefficients (23). Additionally, and optionally, digital wave front operators DWFO (14) may be defined using calibrated digital wave front correctors CDWFC (24).

The present invention describes objects called digital wave fronts, such as the digital wave front DWF (13) provided by the wave front sensor (11) and by the processing unit (12), digital wave front operators DWFO (14), the processed digital wave front PDWF (16), and other digital wave fronts resulting from operations performed by the wave front processing unit (15). These quantities may be defined as discrete two-dimensional (2D) complex functions. A digital wave front may also be defined as being a digital complex image. A digital wave front may also be defined as an array of complex numbers, each element of the array being defined by a real part and by an imaginary part. A digital wave front may also be defined as an array of complex numbers, each element of the array being defined by a phase value and by an amplitude value. A digital wave front may also be defined as a 2D array of elements called pixels, each pixel being defined by a real part and by an imaginary part, or by a phase value and by amplitude value. For anyone of the definitions given here above, the amplitude, the intensity, the phase, the real part or the imaginary part of a digital wave front are discrete 2D functions of real numbers digitally encoded.

Digital wave fronts, such as the digital wave front DWF (13) provided by the wave front sensor (11) and by the processing unit (12) or digital wave front operators DWFO (14) or the processed digital wave front PDWF (16) or others digital wave fronts resulting from operations performed by the wave front processing unit (15), may be expressed in both the direct space and in the reciprocal space. The reciprocal space is also called momentum space, or frequency space, or Fourier space, or k-space. A digital wave front in the real space is related to its definition in the reciprocal space by a transform operator, which performs the discrete numerical calculation of a transformation called integral transform. As examples of transform operators, we can mention operators resulting from the discrete calculation of integral transforms such as one of: a Fourier transform, a fractional Fourier transform, a Fourier series, a cosine transform, a sine transform, a Hadamard transform, a Hankel transform, a Hartley transform, a wavelet transform, a radon transform. The inverse definitions of these integral transforms, e.g. the inverse Fourier transform, define inverse transform operators that relate the reciprocal space to the direct space. One of the most familiar integral transform is the Fourier transform (FT) for which numerical calculations, referred as the discrete Fourier transform (DFT), can be efficiently performed using a fast Fourier transform (FFT) algorithm. With the Fourier transform, the reciprocal space is often called Fourier space and the inverse transform is called inverse Fourier transform ($FT^{-1}$). In what follows, for more clarity and conciseness, the expressions Fourier Transform (FT), inverse Fourier transform ($FT^{-1}$) and Fourier space will be sometimes used instead of the general definitions of integral transform, transform operator and reciprocal space.

Description of a Digital Wave Front DWF (13)

The present invention is related to the use of a wave front sensor (11), connected to a processing unit (12), which is able to provide the result of its measurement in a digital form, which enables the definition of a digital wave front (DWF).

In one embodiment of the present invention, a DWF (13) may be defined in the direct space, and expressed in terms of spatial coordinates. For example, a DWF may be expressed as follows:

$$DWF(k,l)=A(k,l)\exp\{i\phi(k,l)\}, \qquad (1)$$

where i is the imaginary number, k and l are integers, $\phi$ defines a phase function, and A defines an amplitude function. The amplitude function may also be defined as the square root of an intensity function I. If a DWF is defined in a plane of coordinates 0xy, with $\Delta x$ and $\Delta y$ defining the spatial sampling intervals along respectively the 0x and 0y directions, a DWF may also be expressed as follows:

$$DWF(k\Delta x,l\Delta y)=A(k\Delta x,l\Delta y)\exp\{i\phi(k\Delta x,l\Delta y)\}. \qquad (2)$$

If necessary, a temporal variable may also be introduced in the expression of a DWF, which becomes:

$$DWF(k,l,q\Delta t)=A(k,l)\exp\{i\phi(k,l,q\Delta t)\}, \qquad (3)$$

or $$DWF(k\Delta x,l\Delta y,q\Delta t)=A(k\Delta x,l\Delta y,q\Delta t)\exp\{i\phi(k\Delta x,l\Delta y,q\Delta t)\}, \qquad (4)$$

where q is an integer and $\Delta t$ defines the temporal sampling interval.

The spatial sampling intervals $\Delta x$ and $\Delta y$ may have precise values defined by specific features of the wave front sensor, or by specific features of the processing unit. The values of the spatial sampling intervals can also be set to arbitrary values, e.g. this value can be unity ($\Delta x=\Delta y=1$).

In another embodiment of the present invention, DWF (13) may be defined in the reciprocal space or Fourier space, and expressed in terms of spatial frequencies. This may result from the fact that the processing unit (12) comprises for example a Fourier transform operation or an equivalent operation. This may also result from the fact that the wave front sensor directly provides its measurements in the reciprocal or Fourier plane. In this case, DWF may be expressed as follows:

$$\tilde{D}WF(m,n)=\tilde{A}(m,n)\exp\{i\tilde{\phi}(m,n)\}, \qquad (5)$$

where m and n are integers, $\tilde{\phi}$ defines a phase function in the reciprocal or Fourier space, and $\tilde{A}$ defines an amplitude function in the reciprocal or Fourier space. If $\tilde{D}WF$ is defined in a plane $0\mu v$ of spatial frequency coordinates $\mu$ and $v$, with $\Delta\mu$ and $\Delta v$ defining the spatial sampling intervals along respectively the $0\mu$ and $0v$ directions, a $\tilde{D}WF$ may also be expressed as follows:

$$\tilde{D}WF(m\Delta\mu,n\Delta v)=\tilde{A}(m\Delta\mu,n\Delta v)\exp\{i\tilde{\phi}(m\Delta\mu,n\Delta v)\} \qquad (6)$$

If necessary, a temporal variable can be added in the expression of a $\tilde{D}WF$, which becomes:

$$\tilde{D}WF(m,n,q\Delta t)=\tilde{A}(m,n,q\Delta t)\exp\{i\tilde{\phi}(m,n,q\Delta t)\}, \qquad (7)$$

or $$\tilde{D}WF(m\Delta\mu,n\Delta v,q\Delta t)=\tilde{A}(m\Delta\mu,n\Delta v,q\Delta t)\exp\{i\tilde{\phi}(m\Delta\mu,n\Delta v,q\Delta t)\}. \qquad (8)$$

In principle, a digital wave front DWF defined in the direct space, and a digital wave front $\tilde{D}WF$ defined in the reciprocal space are linked by a relation of the type:

$$\tilde{D}WF(m\Delta\mu,n\Delta v)=FT[DWF(k\Delta x,l\Delta y)], \qquad (9)$$

or $$DWF(k\Delta x,l\Delta y)=FT^{-1}[\tilde{D}WF(m\Delta\mu,n\Delta v)], \qquad (10)$$

where FT is a transform operator, e.g. a discrete Fourier transform (DFT), and where $FT^{-1}$ is the inverse transform operator, e.g. an inverse discrete Fourier transform (IDFT).

Propagation of Digital Wave Fronts

The processing unit (12), and the wave front processing unit (15) described by the present invention may involve calculations of the propagation, or back-propagation of DWF. The propagation of a DWF, over a distance d, from a plan of coordinates 0xy to a plan of coordinates 0x'y', will be expressed as follows:

$$DWF(m\Delta x',n\Delta y')=PROP_d[DWF(k\Delta x,l\Delta y)], \qquad (10)$$

where PROP is an operator called propagator or propagation operator. Back propagation with a negative distance is also possible since the propagation is performed numerically.

As described further several propagation operators can be applied to propagate digital wave fronts between different planes.

This operation may be performed by a numerical calculation of wave propagation, e.g. in the scalar approximation using the Rayleigh-Sommerfeld integral or the Fresnel-Kirchoff intergral or an approximation of these integrals.

For example, the propagation of a DWF, may be calculated in the Fresnel approximation using the following expression:

$$DWF(m\Delta x', n\Delta y') = Cst\exp\left\{\frac{i\pi}{\lambda d}\left(\begin{array}{c}m^2\Delta x'^2 + \\ n^2\Delta y'^2\end{array}\right)\right\} \cdot FFT\left[\begin{array}{c}DWF(k\Delta x, l\Delta y) \\ \exp\left\{\frac{i\pi}{\lambda d}\left(\begin{array}{c}k^2\Delta x^2 + \\ l^2\Delta y^2\end{array}\right)\right\}\end{array}\right] \quad (11)$$

where $\lambda$ is the wavelength of the radiation and FFT is the Fast Fourier Transform operator, and Cst is a complex constant.

The calculation in the Fresnel approximation can also be done within the framework of its expression as a convolution. In this case, we can write:

$$DWF(m\Delta x', n\Delta y') = Cst \cdot FFT^{-1}\left[\begin{array}{c}FFT[DWF(k\Delta x, l\Delta y)] \cdot \\ FFT\left[\exp\left\{\frac{i2\pi}{\lambda d}(k^2\Delta x^2 + l^2\Delta y^2)\right\}\right]\end{array}\right] \quad (12)$$

where $FFT^{-1}$ is the inverse fast Fourier transform operator.

The calculation of the propagation of digital wave fronts can also be performed in the reciprocal or Fourier space. In this case, the propagation calculation may be performed by a multiplication with an operator such as a transfer function or a frequency transfer function. For example, in the reciprocal space, propagation of digital wave fronts can be performed by multiplication with the free space transfer function or by the free space propagation operator.

The Wave Front Sensor (11) and the Processing Unit (12)

The present invention is related to the use of a wave front sensor (11), characterized by the fact that, in combination with a processing unit (12), it provides a DWF (13), i.e. digital data describing the phase and the amplitude or intensity of a radiation having interacted with a specimen (10). As described further, the DWF (13) may comprise error contributions resulting from an undesired deformation of the wave front caused by the wave front sensor.

Among other functions, the processing unit (12) may fill the function of analogous to digital (AD) conversion in order to provide data that can be further processed numerically or digitally, using e.g. a computer.

It may occur that the wave front sensor (11), and the processing unit (12) are comprised in a single entity, for example if the wave front sensor comprises means for digital conversion.

In one embodiment of the present invention, the wave front sensor (11) uses an intensity sensitive image sensor, which records the result of the interference between two waves defining a hologram. The resulting hologram is converted in a digital form and transmitted to a processing unit (12), such as a computer, which defines a DWF (13) by applying at least one of, or a combination of the following procedures:

A Fourier transform (FT).
An inverse Fourier transform ($FT^{-1}$).
A fractional Fourier transform.
A Cosine Transform.
A Sine transform
Processing in the Fourier plane, such as filtering or translation or truncation or addition or subtraction.
Calculation of wave propagation, e.g. in the scalar approximation using the Rayleigh-Sommerfeld integral or one of its approximations such as the Fresnel integral.
Convolution
Correlation
A phase shifting procedure using several holograms recorded for different phase relations between the interfering waves.
Analytic continuation.
A wavelet transform.

In another embodiment of the present invention, the wave front sensor (11) uses an intensity sensitive image sensor, which records the result of the interference between two waves defining an interferogram or an interference pattern or a fringe pattern. The intensity image resulting from the interference process is converted in a digital form and transmitted to a processing unit (12), which defines a DWF by applying at least one of, or a combination of the following procedures:

A Fourier transform (FT).
A fractional Fourier transform.
A Cosine Transform.
A Sine transform.
An Inverse Fourier transform ($FT^-$).
Processing in the Fourier plane, such as filtering or translation or truncation or addition or subtraction . . .
Calculation of wave propagation, e.g. in the scalar approximation using the Rayleigh-Sommerfeld integral or one of its approximation such as the Fresnel integral.
Convolution.
Correlation.
A phase shifting procedure using several interferograms recorded for different phase relations between the interfering waves.
Fringe pattern analysis.
Fourier analysis of interferograms.
Analytic continuation.
A wavelet transform In another embodiment of the present invention, the wave front sensor (11) uses an intensity sensitive image sensor, which records a single image, such as an off-axis hologram, or an off-axis interferogram, from which a DWF can be defined using the processing unit (12). The image can be acquired in a short time period, enabling fast wave front sensing with a reduced sensitivity to environmental perturbations, such as vibrations. Fast wave front sensing may also be important for real-time observations of time varying phenomena.

In an other embodiment of the present invention the wave front sensor (11) and the processing unit (12) define one of a digital holographic microscope, a digital holographic endoscope or a digital holographic telescope realized for example according to the content of patent WO200020929, A Method for simultaneous amplitude and quantitative phase contrast imaging by adjusting reconstruction parameters for definition of digital replica of reference wave and aberration parameters correction digitally, by Cuche E. and Depeursinge C., filled in October 1998.

In an other embodiment of the present invention the wave front sensor (11) and the processing unit (12) define a digital holographic imaging devices as described for example by patent WO2003048868-A, Digital holographic imaging apparatus has container that contains medium in which sample is located, by Marquet P., Cuche E., Depeursinge C., and Magistretti P., December 2001.

Other examples of digital holographic imaging devices, that may constitute examples of practical implementations of a wave front sensor (11) and of a processing unit (12), can be found in the references cited in patents WO200020929 and WO2003048868-A.

In another embodiment of the present invention the wave front sensor (11) and the processing unit (12) define a device for direct to digital holography (DDH) as described for example by patent WO9857234, entitled Direct to-digital holography and holovision, by Thomas C. E., Baylor L. R., Hanson G. R. et al., June 1997, or as described for example by patent WO2004025379-A2, Direct-to-digital holography system for image processing, has tilting mirror optically coupled between laser and illumination lens at back focus point of lens, where mirror reflects laser beam towards lens at off-axis angle, by Thomas C. T., Mayo M., McMackin I., et al., September 2002.

In another embodiment of the present invention the wave front sensor (11) and the processing unit (12) define a device for high-speed interference microscopy as described for example by patent WO200240937-A, entitled High speed interferential microscopic imaging, uses two-arm interferometer with sinusoidal modulation and computer integrating output interference signal, by Dubois A. and Boccara C, November 2000.

In another embodiment of the present invention the wave front sensor (11) and the processing unit (12) define a interferometric device for probing a specimen comprising nanoparticles as described for example by patent WO2003060588-A, Microscopic viewing of a 3-D object by viewing the sample through an interferometer with local probes of nanometer dimensions introduced into the sample, by Boccara A. and Dubois A., priority FR000132 07 Jan. 2002.

In another embodiment of the present invention the wave front sensor (11) and the processing unit (12) define a devices for quantitative phase imaging as described for example by patent WO2003034010-A, Phase determination of radiation wave-field to produce phase image of objects in optical microscopy using computed measure of phase over object surface, Allman B. E., Nugent K, October 2001, or as described for example by patent WO2003012822-A1, Phase retrieval from focused and defocused electron beam images in electron microscopy preventing image distortion, Allman B., July 2001.

In another embodiment of the present invention the wave front sensor (11) comprises two radiation sources emitting radiations at two different central wavelengths or a single tunable radiation source enabling to define two different central wavelengths. Together, the wave front sensor (11) and the processing unit (12) provide a digital wave front defined with a phase corresponding to a synthetic wavelength resulting from a combination of the wave fronts recorded for two different central wavelengths. If the two central wavelengths are available simultaneously, a synthetic wavelength may also be generated by the apparatus, meaning that the specimen (10) will be probed with a radiation equivalent to a radiation with the synthetic wavelength.

In another embodiment of the present invention the wave front sensor (11) and the processing unit (12) may define a device combining digital holographic imaging and fluorescence microscopy as described for example by patent WO2003002972-A, Three-dimensional sample image obtaining method, especially a thick biological sample, using combination of digital holography and fluorescence microscopy to yield a clear final image, Dubois F. and Yourassowsky C., priority EP870147 29 Jun. 2001.

In another embodiment of the present invention the wave front sensor (11) and the processing unit (12) may define a device for ellipsometric microscopy as described for example by patent WO200250513-A, entitled The apparatus to give a two-dimensional ellipsometric display of a sample uses a polarizer and an analyzer, together with a microscope and structured light, to give a view of small samples which are not seen with a normal microscope, by Ausserre D., Valignat M., December 2000.

In another embodiment of the present invention the wave front sensor (11) and the processing unit (12) may define a device for quantitative optical microscopy as described for example by A. Y. M. NG, C. W. See and M. G. Somekh, in a paper entitled *Quantitative optical microscope with enhanced resolution using pixilated liquid crystal spatial light modulator*, published in 2004 in Journal of Microscopy Vol. 214, pp 334-340.

In another embodiment of the present invention the wave front sensor (11) and the processing unit (12) may define a device for digital in-line holography as described for example by Wenbo Xu, M. H. Jericho, I. A. Meinertzhagen, and H. J. Kreuzer, in a paper entitled *Digital in-line holography for biological applications*. Published in Proc. Natl. Acad. Sci. USA, Vol. 98, pp. 11301-11305, in 2001.

In another embodiment of the present invention, the wave front sensor (11) may be a classical optical microscope on which a module, comprising for example a coherent light source and optical fibers, in order to enable the creation of holograms or interferograms.

In another embodiment of the present invention, the wave front sensor (11) provides holograms or interferograms and the processing unit (12) reconstruct a complex field by a method of local least square estimation, as described e.g. by M. Liebling, T. Blu and M. Unser, in a paper entitled *Complex-Wave Retrieval from a Single Off-Axis Hologram*, published in the Journal of the Optical Society of America A, vol. 21, no. 3, pp. 367-377, in March 2004.

In others embodiments of the present invention, the wave front sensor (11) may be one of: an optical microscope, a stereo-microscope, a confocal microscope, a de-convolution microscope, a phase-contrast microscope, a differential interference contrast (DIC) microscope, an endoscope, a camera, a telescope, an interference microscope, a white-light interferometer, an ellipsometer, a refractometer, an evanescent wave sensor or microscope, or total internal reflection sensor or microscope, an imaging device using a ball lens or a half-ball lens as objective lens, an imaging device using a solid immersion lens (SIL) as objective lens, an imaging devices using an infinity corrected microscope objective without filed lens, an imaging device using a cylindrical lens as objective lens, an imaging device.

In another embodiment of the present invention, the wave front sensor (11) may be a conventional intensity imaging apparatus, such as an optical microscope, that provides only intensity data, and a digital wave front (13) may be constructed by adding phase data numerically or digitally. In this case, the present invention may be used to process the intensity image provided by the imaging microscope.

In another embodiment of the present invention, the wave front sensor (11) may be an apparatus using a method of fringe projection.

In another embodiment of the present invention, the wave front sensor (11) may be a Talbot interferometer, e.g. a Talbot interferometer connected to an x-Ray radiation source.

In another embodiment of the present invention, the wave front sensor (11) may be Hartmann-Shack wave front sensor.

In another embodiment, the present invention enables reliable performance for wave front sensing using instruments not specifically designed or optimized for wave front sensing. For example, the present invention, possibly in combination with other instrumental features, may enable wave front sensing by use of instruments derived from conventional instruments designed for other imaging purposes, such as a microscope, a stereo-microscope, a confocal microscope, a de-convolution microscope, a phase-contrast microscope, a differential interference contrast (DIC) microscope, an endoscope, a camera, a telescope.

In another embodiment, the present invention enables reliable imaging and speed performance with instruments not specifically designed or optimized for imaging purposes. For example, the present invention can be used, possibly in combination with other instrumental features, to improve the performance, in particular speed and image quality, of interferometers, or ellipso-meters, or refracto-meters, or evanescent wave microscope, or total internal reflection microscopes. For example, the present invention can be used to improve the image quality of low cost wave front sensors. For example, the present invention can be used to obtain reliable images from instruments using non standard objective lenses, such as cylindrical lenses, single lenses, ball lenses, half-ball lenses, or a solid immersion lenses.

In another embodiment of the present invention, the wave front sensor (11) and the processing unit (12) provide directly a DWF as defined by one of equations (1) to (8).

Description of a Digital Wave Front Operator (14)

The present invention describes the use, the definition and the utility of digital or numerical operators, called digital wave front operators or DWFO (14), which are specifically defined for the digital processing of wave fronts. DWFO may also be called digital lenses (DL), because they may act digitally on a digital wave front in a way that is comparable to the way a lens acts physically on a radiation. In what follows, the two denominations DWFO and DL will be used indifferently to describe a digital wave front operator (14).

As described further in details (see e.g. FIG. 6), a DWFO (14) may be defined using a mathematical model (21), which involves coefficients. As described further, the present invention defines different types of coefficients as the calibrated coefficients (23), the user defined coefficients (22) and the fitted coefficients (21). As described further the present invention describes how coefficients can be defined or evaluated, in particular methods are described for adjusting automatically or semi-automatically the values of the coefficients involved by a DWFO.

As described further, a DWFO (14) may also be a measured quantity evaluated by using a reference specimen as specimen (10). For example, a DWFO may be evaluated by using a flat surface, such as a mirror, as reference sample. For example, if the wave front sensing system is applied to observe transparent specimen in transmission, removing the sample is a procedure that can be applied to obtain a reference sample.

As described further (see e.g. FIG. 3), a DWFO (14) may also be defined by processing of a digital wave front. For example, a DWFO (14) can be obtained by filtering spatial frequencies in the Fourier plane of a digital wave front. For example, the filtering operation in the Fourier plane may be a low-pass or a band-pass, or a high-pass filtering operation.

A DWFO or a DL has the same mathematical definition as a DWF. A DWFO is a discrete 2D function of complex numbers, which can be defined by an amplitude function $A_O$ and by a phase function $\phi_O$. According to the expressions of a DWF given by one of equations (1) to (8), a DWFO can also be defined by different expressions.

In one embodiment of the present invention, a DWFO (14) may be defined in the direct space, and expressed in terms of spatial coordinates. For example, a DWFO may be expressed as follows:

$$\mathrm{DWFO}(k,l)=A_O(k,l)\exp\{i\phi_O(k,l)\}. \tag{13}$$

The amplitude function $A_O$ may also be defined as the square root of an intensity function $I_O$. If a DWFO is defined in a plane of coordinates $0x_Oy_O$, with $\Delta x_O$ and $\Delta y_O$ defining the spatial sampling intervals along respectively the $0x_O$ and $0y_O$ directions, a DWFO may also be expressed as follows:

$$\mathrm{DWFO}(k\Delta x_O, l\Delta y_O)=A_O(k\Delta x_O, l\Delta y_O)\exp\{i\phi_O(k\Delta x_O, l\Delta y_O)\}. \tag{14}$$

If necessary, a temporal variable may also be added in the expression of a DWFO, which becomes:

$$\mathrm{DWFO}(k,l,q\Delta t)=A_O(k,l)\exp\{i\phi_O(k,l,q\Delta t)\}, \tag{15}$$

or $$\mathrm{DWFO}(k\Delta x_O, l\Delta y_O, q\Delta t)=A_O(k\Delta x_O, l\Delta y_O, q\Delta t)\exp\{i\phi_O(k\Delta x_O, l\Delta y_O, q\Delta t)\}, \tag{16}$$

where q is an integer and $\Delta t$ defines the temporal sampling interval.

The spatial sampling intervals $\Delta x_O$ and $\Delta y_O$ may have precise values defined by specific features of the wave front sensor, or by specific features of the processing unit. The values of the spatial sampling intervals can also be set to arbitrary values, e.g. this value can be unity ($\Delta x_O=\Delta y_O=1$).

In another embodiment of the present invention, DWFO may be defined in the reciprocal space or Fourier space, and expressed in terms of spatial frequencies. In this case, DWFO may be expressed as follows:

$$\tilde{\mathrm{DWFO}}(m,n)=\tilde{A}_o(m,n)\exp\{i\tilde{\phi}_o(m,n)\}, \tag{17}$$

where m and n are integers, $\tilde{\phi}_o$ defines a phase function in the reciprocal or Fourier space, and $\tilde{A}_o$ defines an amplitude function in the reciprocal or Fourier space. If a $\tilde{\mathrm{DWFO}}$ is defined in a plane of spatial frequency coordinates $0\mu_O\nu_O$ with $\Delta\mu_O$ and $\Delta\nu_O$ defining the spatial sampling intervals along respectively the $0\mu_O$ and $0\nu_O$ directions, a $\tilde{\mathrm{DWFO}}$ may also be expressed as follows:

$$\tilde{\mathrm{DWFO}}(m\Delta\mu_O, n\Delta\nu_O)=\tilde{A}_o(m\Delta\mu_O, n\Delta\nu_O)\exp\{i\tilde{\phi}_o(m\Delta\mu_O, n\Delta\nu_O)\} \tag{18}$$

If necessary, a temporal variable can be added in the expression of a $\tilde{\mathrm{DWFO}}$, which becomes:

$$\tilde{\mathrm{DWFO}}(m,n,q\Delta t)=\tilde{A}_o(m,n,q\Delta t)\exp\{i\tilde{\phi}_o(m,n,q\Delta t)\}, \tag{19}$$

or $$\tilde{\mathrm{DWFO}}(m\Delta\mu_O, n\Delta\nu_O, q\Delta t)=\tilde{A}_o(m\Delta\mu_O, n\Delta\nu_O, q\Delta t)\exp\{i\tilde{\phi}_o(m\Delta\mu_O, n\Delta\nu_O, q\Delta t)\}. \tag{20}$$

In principle, a digital wave front operator DWFO (14) defined in the real space, and a digital wave front operator $\tilde{\mathrm{DWFO}}$ (14) defined in the reciprocal space are linked by a relation of the type:

$$\tilde{\mathrm{DWFO}}(m\Delta\mu_O, n\Delta\nu_O)=\mathrm{FT}[\mathrm{DWFO}(k\Delta x_O, l\Delta y_O)], \tag{21}$$

or $$\mathrm{DWFO}(k\Delta x_O, l\Delta y_O)=\mathrm{FT}^{-1}[\tilde{\mathrm{DWFO}}(m\Delta\mu_O, n\Delta\eta_O)], \tag{22}$$

where FT is a transform operator, e.g. a discrete Fourier transform (DFT), and where $FT^{-1}$ is the inverse transform operator, e.g. an inverse discrete Fourier transform (IDFT).

A DWFO may also be defined in order to describe the complex transfer function or by the optical transfer function (OTF), which comprise the amplitude or magnitude transfer function (ATF or MTF) and the phase transfer function (PTF). In this case, the OTF and the corresponding DFWO may be defined thanks to an experimental measurement providing the transfer function, in amplitude and phase, of the wave front sensor (11) or the transfer function or the wave front sensor (11) and processing unit (12). In this case, the OTF and the corresponding DFWO may also be defined thanks to a mix between a mathematical model and experimental measurements providing the transfer function, in amplitude and phase, of the wave front sensor (11) or the transfer function or the wave front sensor (11) and processing unit (12).

A DWFO may also be defined in order to describe an ideal specimen. For example, data describing a perfect specimen, such as simulated data or tabulated data or plans or drawing, can be used to construct the phase and amplitude functions of a DWFO. Such a DWFO can then be used for comparison and quality control purposes.

The amplitude function $A_O$ may be a constant equal to unity, defining a DWFO (14) as a pure phase object.

Description of the Processed Digital Wave Front (16)

The processed digital wave front (16) is provided by the wave front processing unit (15). As described further, the processed digital wave front (16) results from at least one mathematical operation between a digital wave front and at least one digital wave front operator (14). In what follows, the processed digital wave front (16) will be sometimes expressed by PDWF.

A processed digital wave front (PDWF) has the same mathematical definition as a digital wave front (DWF) or a digital wave front operator (DWFO). A PDWF is a discrete 2D function of complex numbers, which can be defined by an amplitude function $A_P$ and by a phase function $\phi_P$. According to the expressions of the DWF given by one of equations (1) to (8), and to the expressions a DWFO given by on of equations (13) to (20), a PDWF can also be defined by different expressions.

In one embodiment of the present invention, a PDWF (16) may be defined in the direct space, and expressed in terms of spatial coordinates. For example, a PDWF may be expressed as follows:

$$PDWF(k,l)=A_P(k,l)\exp\{i\phi_P(k,l)\}. \quad (23)$$

The amplitude function $A_P$ may also be defined as the square root of an intensity function $I_P$. If a PDWF is defined in a plane of coordinates $0x_Py_P$, with $\Delta x_P$ and $\Delta y_P$ defining the spatial sampling intervals along respectively the $0x_P$ and $0y_P$ directions, a PDWF may also be expressed as follows:

$$PDWF(k\Delta x_P,l\Delta y_P)=A_P(k\Delta x_P,l\Delta y_P)\exp\{i\phi_P(k\Delta x^P,l\Delta y_P)\}. \quad (24)$$

If necessary, a temporal variable may also be added in the expression of a PDWF, which becomes:

$$PDWF(k,l,q\Delta t)=A_P(k,l)\exp\{i\phi_P(k,l,q\Delta t)\}, \quad (25)$$

or $$PDWF(k\Delta x_P,l\Delta y_P,q\Delta t)=A_P(k\Delta x_P,l\Delta y_P,q\Delta t)\exp\{i\phi_P(k\Delta x_P,l\Delta y_P,q\Delta t)\}, \quad (26)$$

where q is an integer and $\Delta t$ defines the temporal sampling interval.

The spatial sampling intervals $\Delta x_P$ and $\Delta y_P$ may have precise values defined by specific features of the wave front sensor or processing unit, or by specific features of used DWFO. The values of the spatial sampling intervals may also be set to arbitrary values, e.g. this value can be unity ($\Delta x_P=\Delta y_P=1$).

In another embodiment of the present invention, a PDWF (16) may be defined in the reciprocal space or Fourier space, and expressed in terms of spatial frequencies. In this case, a PDWF may be expressed as follows:

$$\widetilde{PL}_{DWF}(m,n)=\widetilde{A}_P(m,n)\exp\{i\widetilde{\phi}_P(m,n)\}, \quad (27)$$

where m and n are integers, $\widetilde{\phi}_P$ defines a phase function in the reciprocal or Fourier space, and $\widetilde{A}_P$ defines an amplitude function in the reciprocal or Fourier space. If a $\widetilde{PL}DWF$ is defined in a plane of spatial frequency coordinates $0\mu_P\nu_P$ with $\Delta\mu_P$ and $\Delta\nu_P$ defining the spatial sampling intervals along respectively the $0\mu_P$ and $0\nu_P$ directions, a $\widetilde{PL}DWF$ may also be expressed as follows:

$$\widetilde{PL}_{DWF}(m\Delta\mu_P,n\Delta\nu_P)=\widetilde{A}_P(m\Delta\mu_P,n\Delta\nu_P)\exp\{i\widetilde{\phi}_P(m\Delta\mu_P,n\Delta\nu_P)\} \quad (28)$$

If necessary, a temporal variable can be added to the expression of a $\widetilde{PL}DWF$, which becomes:

$$\widetilde{PL}_{DWF}(m,n,q\Delta t)=\widetilde{A}_P(m,n,q\Delta t)\exp\{i\widetilde{\phi}_P(m,n,q\Delta t)\}, \quad (29)$$

or $$\widetilde{PL}_{DWF}(m\Delta\mu_P,n\Delta\nu_P,q\Delta t)==\widetilde{A}_P(m\Delta\mu_P,n\Delta\nu_P,q\Delta t)\exp\{i\widetilde{\phi}_P(m\Delta\mu_P,n\Delta\nu_P,q\Delta t)\}. \quad (30)$$

In principle, a PDWF defined in the real space, and a processed digital wave front $\widetilde{PL}DWF$ defined in the reciprocal space are linked by a relation of the type:

$$\widetilde{PL}_{DWF}(m\Delta\mu_P,n\Delta\nu_P)=FT[PDWF(k\Delta x_P,l\Delta y_P)], \quad (31)$$

or $$PDWF(k\Delta x_P,l\Delta y_P)=FT^{-1}[\widetilde{PL}_{DWF}(m\Delta\mu_P,n\Delta\eta_P)], \quad (32)$$

where FT is a transform operator, e.g. a discrete Fourier transform, and where $FT^{-1}$ is the inverse transform operator, e.g. an inverse discrete Fourier transform.

Definition of Phase Images and Definition of Amplitude or Intensity Images

From a digital wave front, e.g. a DWF, a DWFO or a PDWF, a phase image can be obtained by calculating the argument of a digital wave front or by extracting the phase function of a digital wave front.

From a digital wave front, e.g. a DWF, a DWFO or a PDWF, an amplitude image can be obtained by calculating the modulus of a digital wave front or by extracting the amplitude function of the digital wave front.

From a digital wave front, e.g. a DWF, a DWFO or a PDWF, an intensity image can be obtained. An intensity image is defined as the power of two of an amplitude image.

An amplitude or intensity or phase image can be a focused or a defocused image. The transformation of defocused images into focused images may be performed by applying a propagation calculation. The transformation of defocused images into focused images may also be performed by translating the specimen (10) with respect to the wave front sensor (11). Image focusing may also be made automatically by an auto-focus method. Preferably, amplitude or intensity or phase images extracted from the processed digital wave front PDWF are focused images.

Among different images that can be extracted from a digital wave front, the phase image is of particular interest, since it provides spatial information defined at a sub-wavelength scale along the axial direction. The axial direction defines the direction that is perpendicular to the plane of an image, or the direction that is perpendicular to the plane of the specimen. The physical interpretation of a phase image depends on the specimen and on the experimental configuration. In reflection, a phase image is directly proportional to the surface topography, as long as optical or dielectric properties of the specimen surface are homogeneous. In reflection, if the optical or dielectric properties of the surface of the specimen vary, this may induce contrasts in the phase image. In transmission, the phase image is proportional to the optical path length (OPL) traveled by the radiation inside the specimen. The OPL depends on the refractive index and on the thickness of the specimen. In a preferred embodiment, a phase image extracted from the processed digital wave front PDWF (16), is a focused image enabling quantitative measurements such as surface topography measurements, height measurements, distance measurements, thickness measurements, optical path length measurements, optical properties measurements, refractive index measurements.

In what follows, the concept of constant phase image or the concept of region of interest (ROI) of a phase image with a constant phase will be sometimes used, in particular within the context of the definition of area of references, and within the context of the definition of reference specimen. A constant phase image is a phase image for which the phase values are equal, or can be considered as being equal, inside the whole field of view of the wave front sensing system. A region of interest of a phase image with a constant phase is a region of a phase image inside which all phase values are equal or can be considered as being equal. The expression "can be considered to be equal" may mean that, over the whole field of view or inside a ROI, the variations of the phase values are limited and do not exceed a certain value defining the precision for phase measurement. For example, phase values variations can be estimated by calculating the standard deviation of phase values. In principle, constant phase values can be obtained over a given area when the corresponding area of the specimen is flat, or can be considered as being flat. The expression "can be considered as being flat" may mean that, in the corresponding area, the variations of the height of the specimen or the variations of the thickness of the specimen or the variations of the optical or dielectric properties of the specimen phase are limited within a certain range that correspond to the accuracy of the system Description of the Wave Front Processing Unit (15)

The wave front processing unit (15) performs the mathematical operations necessary to provide the processed digital wave front PDWF (16), which results from at least one mathematical operation between the digital wave front DWF (13) and at least one digital wave front operator DWFO (14).

For more clarity and conciseness, the following descriptions will often restrict the expressions of amplitude and phase functions to the following symbols: $\phi$, $A$, $A_O$, $\phi_O$, $A_P$, $\phi_P$, $\tilde{A}$, $\tilde{\phi}$, $\tilde{\phi}_O$, $\tilde{A}_O$, $\tilde{\phi}_P$ and $\tilde{A}_P$. It is however clear regarding what precedes, that amplitude and phase functions are 2D arrays or discrete functions that can be expressed in the different coordinates systems defined above: $0xy$, $0x_O y_O$, $0x_P y_P$, $0\mu\nu$, $0\mu_O\nu_O$, $0\mu_P\nu_P$, using integer numbers (e.g. k, l, m, n) and sampling intervals $\Delta x$, $\Delta y$, $\Delta x_O$, $\Delta y_O$, $\Delta x_P$, $\Delta y_P$, $\Delta\mu$, $\Delta\nu$, $\Delta\mu_O$, $\Delta\nu_O$, $\Delta\mu_P$, $\Delta\nu_P$. It is also clear that a temporal variable can also be added using the temporal sampling interval $\Delta t$. As explain further, it may occur that all operations of the wave front processing unit (15) occur in the same plane with DWF, DWFO and PDWF being expressed with the same coordinate system and the same sampling intervals. If DWF, DWFO and PDWF are defined in different planes, for example if the wave front processing unit comprises propagation operators, it is clear, even if not expressed using clear notations such as subscripts, that it may occur that DWF, DWFO and PDWF may be expressed in different planes implicating different coordinates systems, and if necessary different sampling intervals.

In what follows, several relationships describe how the wave front processing unit (15) may define a PDWF on the basis of a DWF and at least one DWFO. For more clarity and conciseness, these relationships will be preferentially expressed in the direct space. However, it is clear that anyone of the DWF, PDWF and DWFO involved in these relationships can be defined in both the direct and reciprocal spaces.

In one embodiment of the present invention, the PDWF is defined by the product between the DWF and one DWFO, with PDWF, DWFO and DWF being all defined in the direct space, and in the same plane (e.g. a plane of coordinate 0xy). In this case the PDWF can be expressed as follows:

$$\text{PDWF} = \text{DWF} \cdot \text{DWFO} = A_P \exp\{i\phi_P\} = AA_O \exp\{i(\phi+\phi_O)\}. \tag{33}$$

In another embodiment of the present invention, the PDWF is defined by the product between the DWF and the product of several DWFO, with PDWF, DWFO and DWF being all defined in the direct space, and in the same plane (e.g. a plane of coordinate 0xy). In this case the PDWF can be expressed as follows:

$$PDWF = DWF \cdot \prod_i DWFO_i \tag{34}$$
$$= A_P \exp\{i\phi_P\}$$
$$= A \cdot \prod_i (A_{O,i}) \exp\{i(\phi + \sum_i \phi_{O,i})\},$$

where the DWFO number i of the product of DWFO can be expressed as:

$$\text{DWFO}_i = A_{O,i} \exp\{i\phi_{O,i}\}. \tag{35}$$

In another embodiment of the present invention, the PDWF is defined by the product between the DWF and the complex conjugate of one DWFO, with PDWF, DWFO and DWF being all defined in the direct space, and in the same plane. In this case the PDWF can be expressed as follows:

$$\text{PDWF} = \text{DWF} \cdot \overline{\text{DWFO}} = A_P \exp\{i\phi_P\} = AA_O \exp\{i(\phi-\phi_O)\}. \tag{36}$$

In another embodiment of the present invention, the amplitude $A_P$ of the PDWF is defined by the quotient of the amplitude of DWF by the amplitude of DWFO ($A/A_O$), and the phase function of PDWF is defined by adding the phase functions of DWFO and DWF, with PDWF, DWFO and DWF being all defined in the direct space, and in the same plane. In this case the PDWF can be expressed as follows:

$$PDWF = A_P \exp\{i\phi_P\} = \frac{A}{A_O} \exp\{i(\phi + \phi_O)\}. \tag{37}$$

In another embodiment of the present invention, the PDWF is defined by the division of DWF by a DWFO, with PDWF, DWFO and DWF being all defined in the direct space, and in the same plane. In this case the PDWF can be expressed as follows:

$$PDWF = A_P \exp\{i\phi_P\} = \frac{A}{A_O}\exp\{i(\phi + \phi_O)\}. \quad (38)$$

In another embodiment of the present invention, the PDWF is defined by the product or by the division of the DWF by several DWFO, and each DWFO may act by at least one of the four ways described by equations (33), (36), (37) or (38). Here also, PDWF, DWFO and DWF are defined in the direct space, and in the same plane. In this case the PDWF can be expressed as follows:

$$PDWF = A_P \exp\{i\phi_P\} = A \cdot \prod_i ((A_{O,i}))^{\pm 1}\exp\{i(\phi \pm \sum_i \phi_{O,i})\}, \quad (39)$$

where the DWFO number i can be expressed as:

$$DWFO_i = (A_{O,i})^{\pm 1}\exp\{\pm i\phi_{O,i}\}, \quad (40)$$

In another embodiment of the present invention, PDWF is defined by the convolution of DWF with DWFO, with PDWF, DWF and DWFO being all defined in the direct space, in the same plane. In this case, the PDWF can be expressed as follows:

$$PDWF = FT^{-1}[FT[DWF] \cdot FT[DWFO]], \quad (41)$$

or, according to former descriptions:

$$PDWF = FT^{-1}[\tilde{D}_{WF} \cdot \tilde{D}_{WFO}] = FT^{-1}[\tilde{A}\tilde{A}_o \cdot \exp\{i(\tilde{\phi} + \tilde{\phi}_o)\}] \quad (42)$$

The convolution operation may also be defined with the complex conjugate of DWFO.

Figure 2:
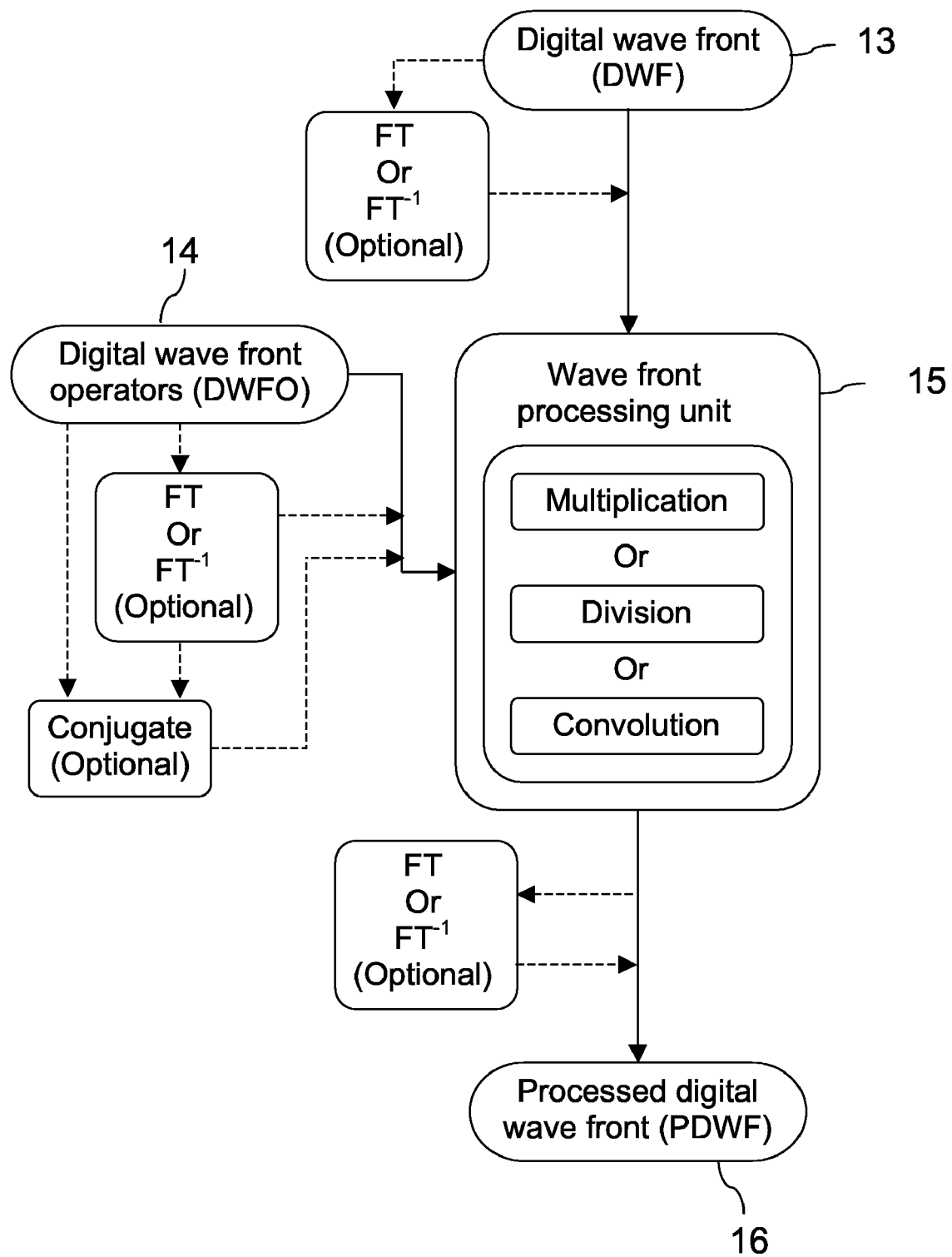
FIG. 2 describes schematically different operations that may be performed by the wave front processing unit (15) in order to define a processed digital wave front PDWF (16) by processing a digital wave front DWF (13) with at least one digital wave front operator DWFO (14).

FIG. 2, schematically describes the different operations that may be performed by the wave front processing unit (15) in order to define a processed digital wave front (16) by processing a digital wave front with at least one digital wave front operator (14). All described operations (multiplication or division or convolution) can take place in the direct space or in the reciprocal space. Optionally, a transform operator (FT) or an inverse transform operator (FT$^{-1}$), such as a Fourier transform or an inverse Fourier transform, may be applied to the DWF or to the DWFO before processing by the wave front processing unit (15). Optionally, after processing by the wave front processing unit (15), a transform operator (FT) or an inverse transform operator (FT$^{-1}$), such as a Fourier transform or an inverse Fourier transform, may be applied to define the PDWF (16). Optionally, the complex conjugate of the DWFO may be considered. If more than one DWFO is applied, the effects of several DWFO will be combined according to equation (39).

In another embodiment of the present invention, a particular type of DWFO (14) may be defined as follows:
  a) Calculating the Fourier transform of the DWF (13) or the Fourier transform of a digital wave front available from the wave front processing unit (15). If the corresponding digital wave front is already defined in the Fourier or reciprocal space, this operation is not necessary. The Fourier transform operation may also be replaced by another transform operator.
  b) Application of filtering procedures in the Fourier or reciprocal space, in order to remove specific spatial frequencies. For example a low-pass filtering operation, or band-pass filtering operations, or a high-pass filtering operation.
  c) Inverse Fourier transform of the result of step b). If the corresponding DWFO is expected to apply on the reciprocal or Fourier space, this operation is not necessary. The inverse Fourier transform operation may also be replaced by another inverse transform operator.

Figure 3:
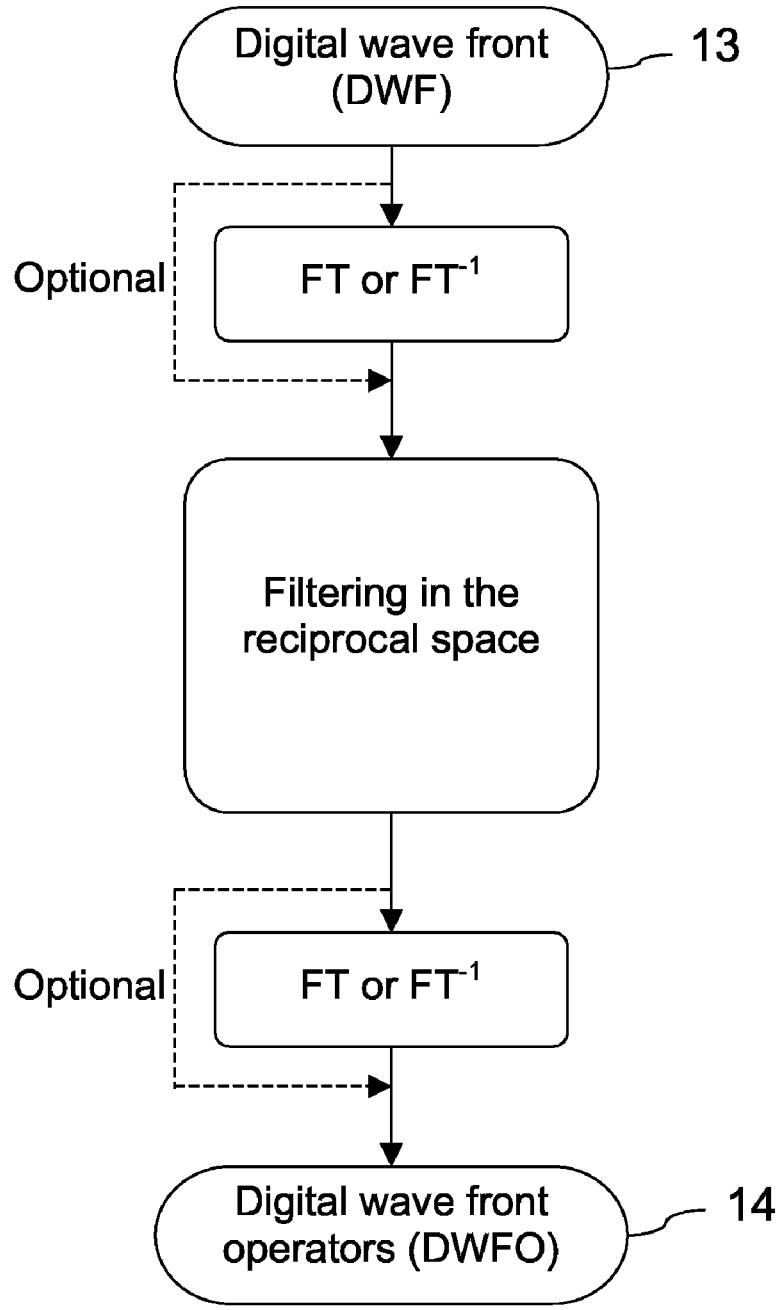
FIG. 3 describes schematically how a particular type of digital wave front operator DWFO (14) can be defined by filtering spatial frequencies of a digital wave front DWF (13) in the reciprocal or Fourier space.

The DWFO defined by the steps described above may then apply according to anyone of the previously described possible actions of a DWFO, as described for example in FIG. 2. FIG. 3 describes schematically how this particular type of DWFO can be defined. Instead of being applied to a digital wave front, the definition of a DWFO by the filtering operation described above, may also be applied to a real-valued image, such as an interferogram or a hologram.

Figure 4:
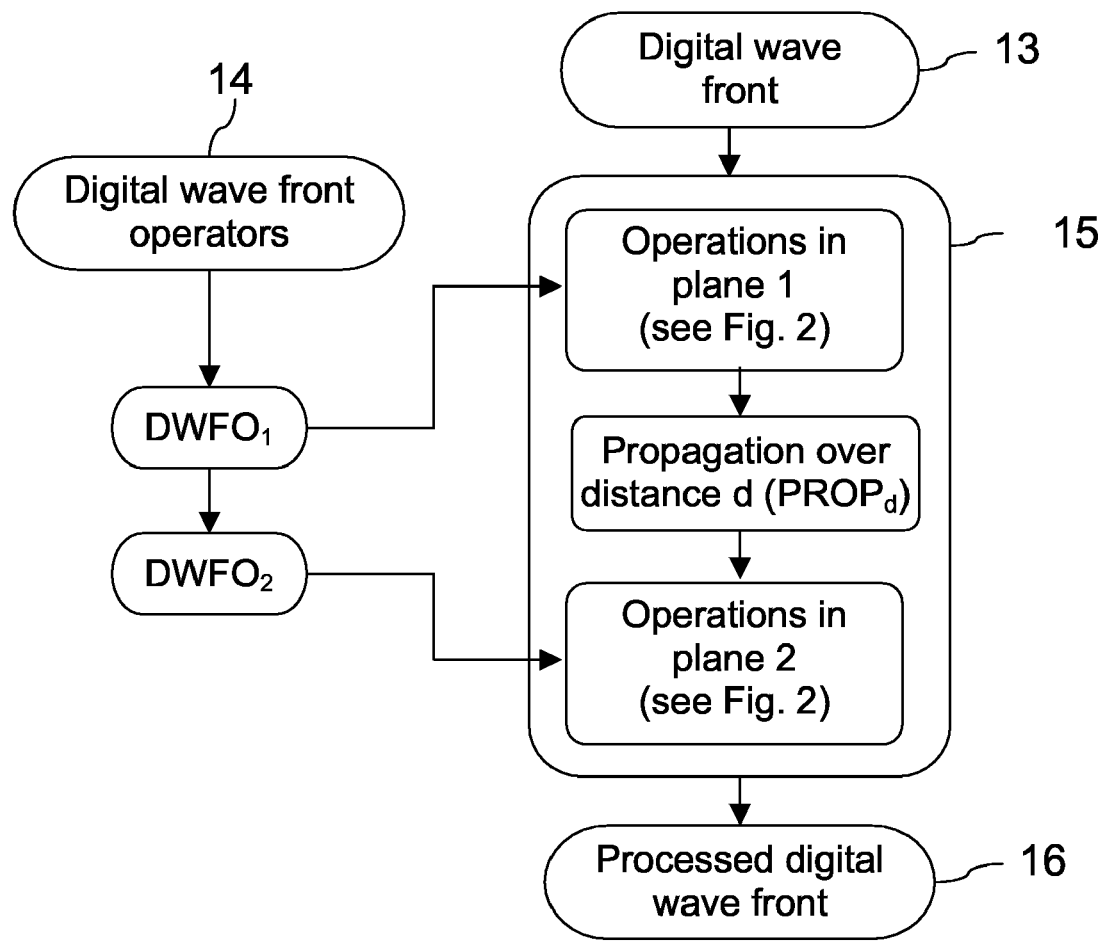
FIG. 4 describes schematically how the wave front processing unit (15) may combine operations with digital wave front operators DWFO (14) defined in two different planes separated by a distance d.
Figure 4:
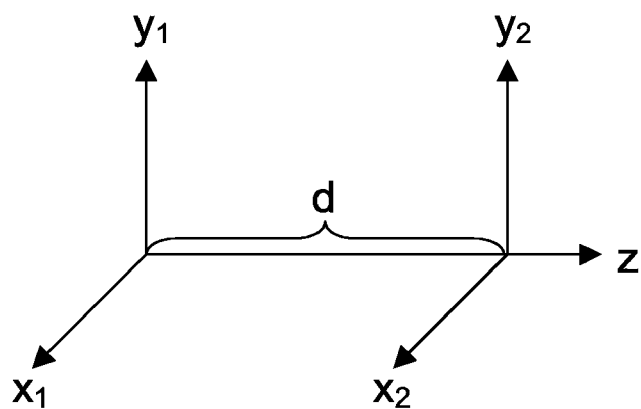

In another embodiment of the present invention, described schematically by FIG. 4, the wave front processing unit (15) provides a PDWF (16) defined by the following steps:
  In a first plane (plane 1) of coordinate $0x_1y_1$, application of a first wave front operator $DWFO_1$.
  Propagation over a distance d. to a second plane of coordinates $0x_2y_2$.
  In the second plane: Application of a second digital wave front operator $DWFO_2$.

In each plane, at least one DWFO may operate according to anyone of the possible actions of a DWFO, as described in FIG. 2. In plane 2, $DWFO_2$ apply on a digital wave front defined after propagation over a distance d. If desired, it is possible also to suppress one of the two steps describing operations with DWFO, in one of the two planes. If $DWFO_1$ and $DWFO_2$ apply as multiplicative terms, the resulting PDWF can be expressed as follows:

$$PDWF = DWFO_2 \cdot PROP_d[DWFO_1 \cdot DWF] \quad (43)$$

Figure 5:
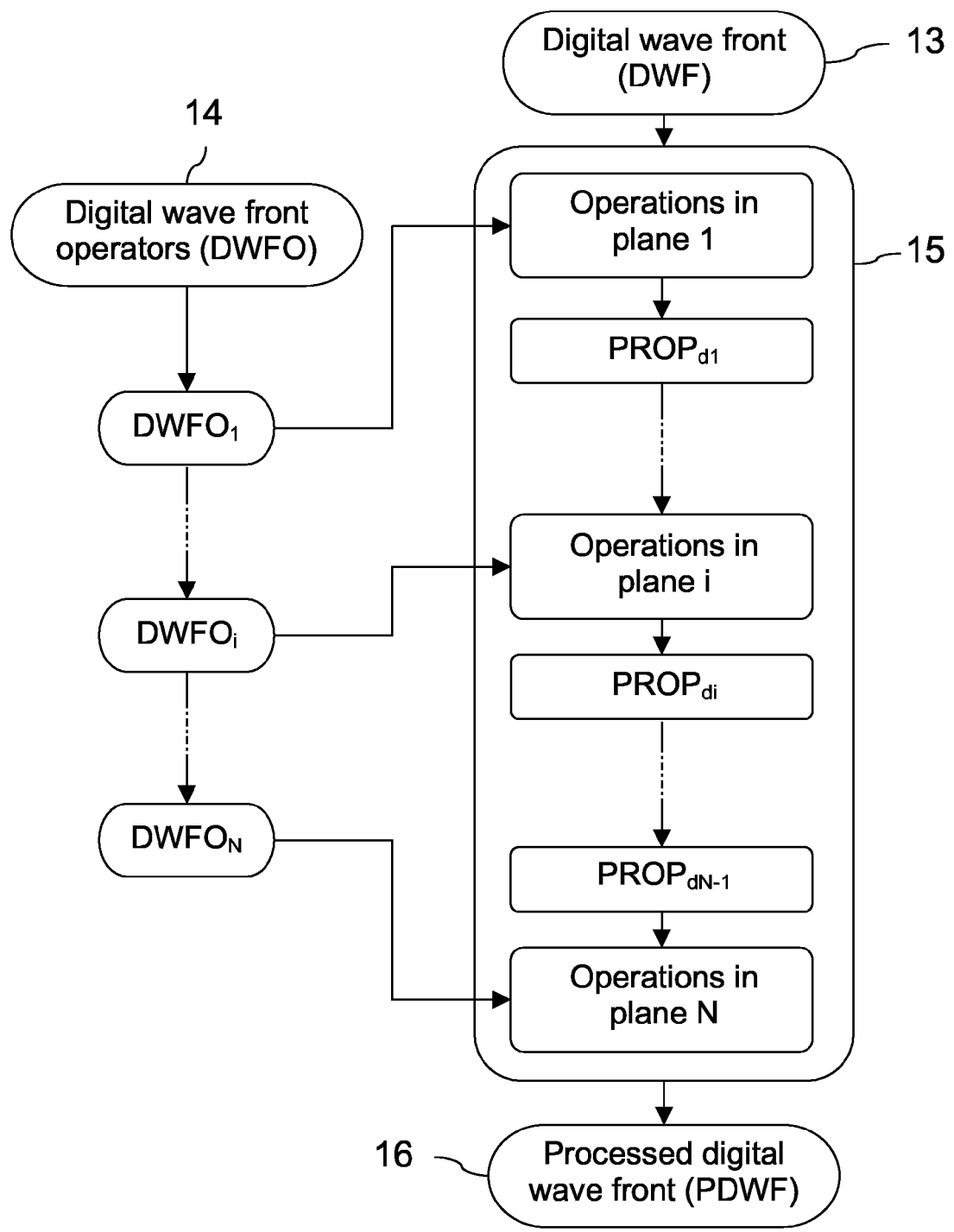
FIG. 5 describes schematically how the wave front processing unit (15) may combine operations with digital wave front operators DWFO (14) defined in N different planes.

In another embodiment of the present invention, described schematically by FIG. 5, the wave front processing unit provides a PDWF defined by generalizing the process described by FIG. 4. It comprises the following points:
  N (at least two) separate planes are defined.
  In each plane, at least one DWFO is defined.
  In each plane, at least one DWFO may act according to at least one of the previously described actions of DWFO as described e.g. by FIG. 2.
  Between each plane at least one propagation operator (PROP) is applied. Back propagation, with negative distances, is possible since the propagation is performed numerically.

In each plane, corresponding operations may occur either in the direct space or in the reciprocal space. In each plane, Fourier transform (FT) or inverse Fourier transform (FT$^{-1}$) may be optionally applied according to FIG. 2. In each plane, the complex conjugate of the corresponding DWFO may be optionally considered. Operations in plane 1, as well as operations in plane N, may be suppressed if desired.

Mathematical Models (21) and Coefficients

The present invention describes the use of mathematical models (21) for defining digital wave front operators DWFO (14). The present invention describes examples of mathematical functions that can be used as mathematical models, but the present invention is not restricted to the described functions. As will become apparent in what follows, mathematical models involve coefficients. Coefficients are divided in three different categories:

User defined coefficients (22) are coefficients provided thanks to non-automated way, e.g. by a person operating on the system.

Calibrated coefficients (23) are provided thanks to semi-automated or automated procedures. Calibrated coefficients are coefficients that have been evaluated during a former use of the system. Calibrated coefficients may be stored on a computer memory. For example, calibrated coefficients can be evaluated by using a reference specimen, such as a mirror. Several examples of specimen that can be used as reference specimen are described further.

Fitted coefficients (20) are provided by fitting procedures (19) applied on reference data (18). Reference data are provided by a wave front analysis unit (17) that analyze at least one of: the digital wave front (13), the processed digital wave front (16), or one or more of the wave fronts that may result from operations performed by the wave front processing unit (15). If the specimen (10) is a reference specimen, fitted coefficients (20) may be used to define the calibrated coefficients (23).

Optionally, before their utilization for the calculation of a DWFO, coefficients, such as user defined coefficients (22) or calibrated coefficients (23) or fitted coefficients (20), may be converted. For example coefficients may be converted thanks to look-up tables or according to a function or according to an external constraint or according to a relationship that relate the coefficients values to experimental or environmental parameters. For example, coefficients defined for a given radiation wavelength may be converted to perform properly at another wavelength. For example, coefficients adapted for a particular type of specimen can be converted to work properly with another type of specimen. For example, coefficients corresponding to a particular configuration of the wave front sensor can be converted to work properly with another configuration of the wave front sensor. For example, coefficients corresponding to an objective lens with a given magnification can be converted to work properly with another objective lens defining another magnification. For example, coefficients corresponding to particular environmental conditions can be converted to work properly with others environmental conditions. For example, coefficients adapted to a given image sensor may be converted to work properly with another image sensor. For example, coefficients defined in the direct space may be converted to apply in the reciprocal space. For example, coefficients defined in a given plane of given coordinates may be converted to apply properly in another plane. For example, coefficients may be converted in order to apply properly after application of a procedure for calculating wave front propagation.

Figure 6:
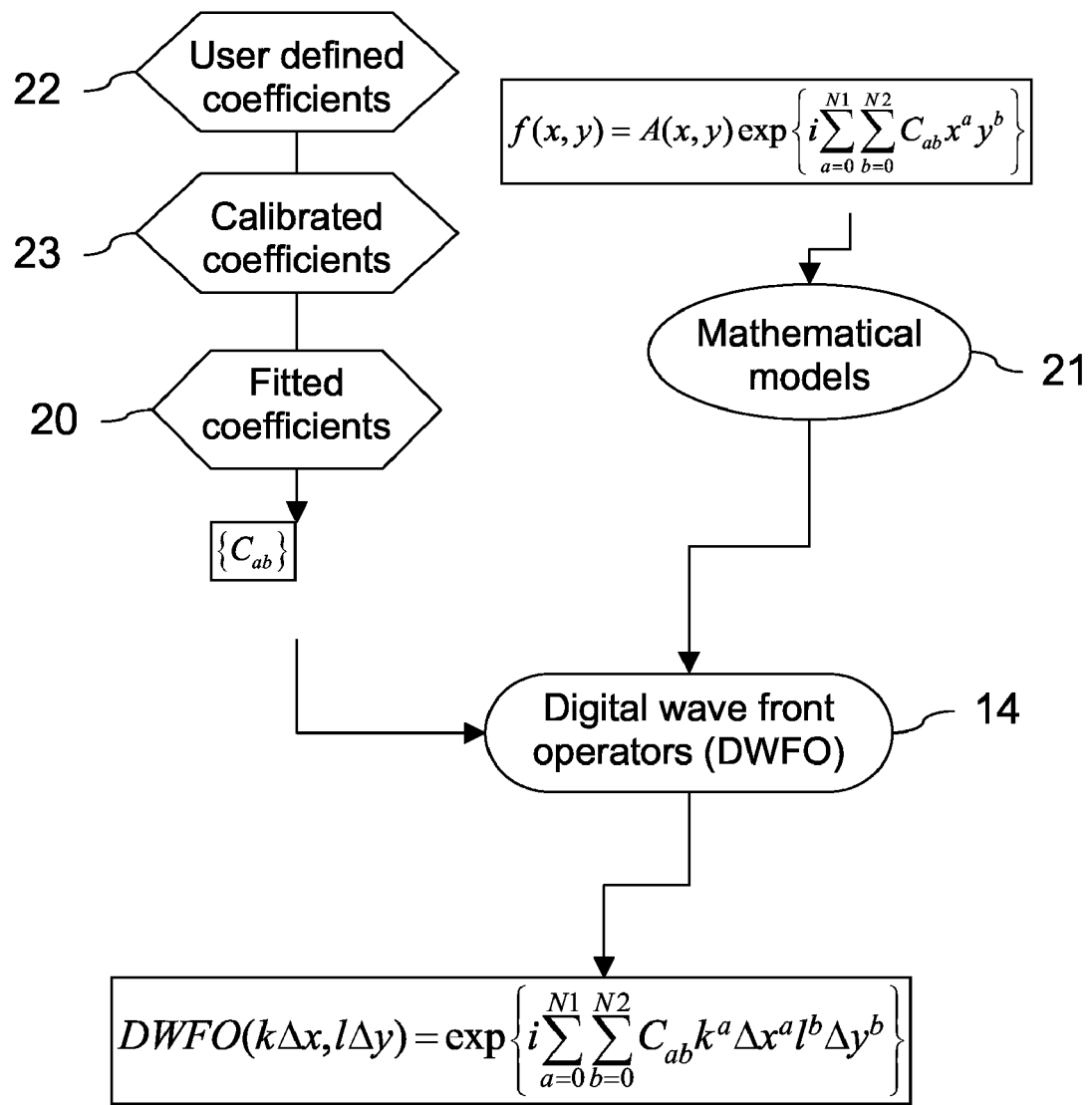
FIG. 6 describes schematically how a digital wave front operator DWFO (14) may be defined using a mathematical model (21) and a set of coefficients.

In one embodiment of the present invention a DWFO can be defined using polynomial functions as mathematical model. For example, the mathematical model may be a polynomial function of two variables x and y (bivariate polynomials) involving a sum of terms. The terms are defined by the powers of the two variables. Each terms of the polynomial function is multiplied by coefficients. The orders (maximum powers in the two variables) of the polynomial functions can be adapted. For example one of the mathematical models (21) can be:

$$f(x, y) = A(x, y)\exp\left\{i\sum_{a=0}^{N1}\sum_{b=0}^{N2} C_{ab} x^a y^b\right\}, \tag{44}$$

where N1 and N2 define the polynomial orders, and $C_{ab}$ define the polynomial coefficients. The amplitude function A(x,y) can be for example a polynomial function, or a Gaussian function or a constant. For example we can have A(x,y)=1. This function defines a DWFO as follows:

$$DWFO(k\Delta x, l\Delta y) = A(k\Delta x, l\Delta y)\exp\left\{i\sum_{a=0}^{N1}\sum_{b=0}^{N2} C_{ab} k^a \Delta x^a l^b \Delta y^b\right\}, \tag{45}$$

where $C_{ab}$ define coefficients, e.g. fitted coefficients (20) or calibrated coefficients (23) or user defined coefficients (22). FIG. 6 describes the definition of a DWFO (14) using this mathematical model with an amplitude function equal to unity.

In what follows, for more clarity and conciseness, mathematical models will be expressed assuming a constant amplitude function equal to unity (A(x,y)=1), but it is clear that given expressions are still valid for others amplitude functions, such as a polynomial function, or a Gaussian function or a constant or a Bessel function. Still for more conciseness, the expressions of the corresponding DWFO will not be always given since it can be directly derived as a discrete formulation. Still for more conciseness, it is clear that the term coefficient may define indifferently one of the fitted coefficients (20) or the calibrated coefficients (23) or the user defined coefficients (22). Still for more conciseness, none of the above described mathematical model involve a temporal variable, but it is clear that mathematical models can also be used to define time-varying DWFO. Mathematical models are described above as 2D functions, but 3D functions may also be used to define a mathematical model. For example, 3D mathematical models may be useful for the definition of DWFO describing the transfer function or the optical transfer function (OTF) of an imaging system. In some cases, mathematical models will be simply expressed by a phase function W(xy), assuming a mathematical model of the form:

$$f(x,y)=\exp\{iW(x,y)\}. \tag{46}$$

The phase function W(x,y) will be sometimes called aberration function or aberration polynomial.

In another embodiment of the present invention, the mathematical model (21) may be defined as follows:

$$f(x, y) = \exp\left\{-i\frac{\pi}{\lambda f}(x^2 + y^2)\right\}. \tag{47}$$

This function is often used to describe a lens of focal length f. In this case, f defines the coefficient of the corresponding DWFO. Several DWFO describing lenses of different focal lengths, located in different planes can be defined using this mathematical model. If desired, the physical constants π and λ can be removed from equation (47).

In another embodiment of the present invention, the mathematical model (21) may be defined as follows:

$$f(x, y) = \exp\left\{-i\left(\frac{\pi(x-a)^2}{\lambda f_1} + \frac{\pi(y-b)^2}{\lambda f_2}\right)\right\}. \tag{48}$$

This function may describe a kind of lens with two focal length $f_1$ and $f_2$, and with a centre of symmetry defined by a and b. In this case, $f_1$, $f_2$, a and b define the coefficients of the corresponding DWFO. Of course, the lens may be centred by defining a=b=0. We way also have $f_1=f_2$ to describe a spherical or parabolic lens. We can also have $f_1$ or $f_2$ equal to infinity in order to describe a cylindrical lens. Several DWFO describing such kind of lenses of different focal lengths, located in different planes can be defined. If desired $\pi$ and $\lambda$ can be removed from equation (48).

In another embodiment of the present invention, the mathematical model (21) may be defined as follows:

$$f(x, y) = \exp\left\{i\frac{2\pi}{\lambda}(k_x x + k_y y)\right\}. \tag{49}$$

This function is often used to describe a plane wave of wave vectors $k_x$ and $k_y$. It defines a DWFO as follows:

$$DWFO(k\Delta x, l\Delta y) = \exp\left\{i\frac{2\pi}{\lambda}(k_x \Delta x + k_y \Delta y)\right\}, \tag{50}$$

where $k_x$ and $k_y$ define two coefficients, e.g. fitted coefficients (20) or calibrated coefficients (23) or user defined coefficients (22). If desired $\pi$ and $\lambda$ can be removed from equation (50), we can also define ($\Delta x=\Delta y=1$).

In another embodiment of the present invention, a DWFO can be defined using the following function:

$$f(x,y,t)=\exp\{i\Omega(t)\}, \tag{51}$$

as one of the mathematical model (21), where Q(t) is a function independent from space that describes temporal fluctuations. For example, Q(t) can be considered as describing the temporal fluctuations of an offset of a phase function describing a wave front. This function defines a DWFO as follows:

$$DWFO(k\Delta x, l\Delta y, m\Delta t)=\exp\{i\Omega(m\Delta t)\}, \tag{52}$$

where $\Omega(m\Delta t)$ defines a time varying coefficient, e.g. one of the fitted coefficients (20).

In another embodiment of the present invention, the mathematical model (21) can be defined using a phase function as follows:

$$W(x,y)=A(x^2+y^2)^2+By(x^2+y^2)+C(x^2+3y^2)+D(x^2+y^2)+Ey+Fx+G, \tag{53}$$

which may be used to describe the primary aberrations. A, B, C, D, E, F, G in equation (53) define the coefficients and correspond respectively to aberrations of the following types: spherical, coma, astigmatism, defocusing, tilt x, tilt y and constant (or piston).

In another embodiment of the present invention, the mathematical model (21) can be defined using a phase function as follows:

$$W(x, y) = \sum_{i=0}^{k}\sum_{j=0}^{i} c_{ij} x^i y^{i-j}, \tag{54}$$

which defines a generalization, of degree k, of the phase function of equation (53). In this case, $c_{ij}$ define the coefficients of the corresponding DWFO.

In another embodiment of present invention, the mathematical model (21) may be defined using polar coordinates $\rho$, $\theta$, according to the following transformation:

$$\frac{x}{R} = \rho\sin\theta \text{ and } \frac{y}{R} = \rho\cos\theta. \tag{55}$$

where R is the radius inside which the corresponding wave front or DWFO is defined or measured. If desired, R can be arbitrarily set to unity (R=1). For example, phase function may be defined as follows:

$$W(\rho, \theta) = \sum_{n=0}^{k}\sum_{l=0}^{n} \rho^n (a_{nl}\cos^l\theta + b_{nl}\sin^l\theta), \tag{56}$$

where $a_{n1}$ and $b_{n1}$ define coefficients of the corresponding DWFO.

In another embodiment of present invention, the mathematical model (21) may be defined using an expansion of Zernike polynomials:

$$W(\rho, \theta) = \sum_{n=0}^{k}\sum_{l=-n}^{n} C_{n,l} Z_n^l(\rho, \theta), \tag{57}$$

where $C_{n,l}$ define the coefficients of the corresponding DWFO, and where $Z_n^l$ define the Zernike polynomials, whose properties and definitions are given by many references in optics and mathematics. Zernike polynomials may also be expressed in standard Cartesian coordinates.

In others embodiments of the present invention, the mathematical model (21) may defined using Bessel functions or Hermit-Gauss functions or a Sinc function, or Legendre polynomials, or Jacobi polynomials, or Chebyshev polynomials, or exponential polynomials, or Hermite Polynomial, or orthogonal Polynomials. A mathematical model (21) may also be defined by recourse to a Gram-Schmidt orthonormalization procedure.

In another embodiment of the present invention, the mathematical model (21) is an expansion of wavelets, such as splines, B-splines, Bezier splines, cubic splines, thin plate splines, bicubic splines, Lemarié's wavelets, Haar functions, Daubechies wavelets.

In others embodiments of the present invention, the mathematical model (21) is defined in order to represent an optical element such as, an aspheric lens, an axicon or conical lens, a wedge, a prism, a ball lens, a half-ball lens, a doublet, a triplet, a beam expander, an aperture, a diffractive element, an array of optical elements, a pattern generator, a collimator, a beam shaper, a grating, a pupil, a gradient index lens, a spherical mirror, a paraboloidal reflector, an ellipsoidal reflector, an anamorphic prism, a pair of anamorphic prism, a diffuser.

Anyone of the previously described mathematical models can be expressed in both the direct space and reciprocal or Fourier space.

Digital Wave Front Processing Applied to Wave Front Correction

The present invention offers interesting possibilities for correcting or reducing wave front errors, such as artifacts introduced by the wave front sensor or by the experimental configuration or by environmental conditions.

Let's define a wave front $\Psi$ available in a digital form, e.g. $\Psi$ may be the digital wave front DWF (13) or the processed digital wave front PDWF (16) or a wave front available from the wave front processing unit (15). $\Psi$ can be defined by an amplitude function A and by a phase function $\phi$:

$$\Psi(k\Delta x, l\Delta y) = A(k\Delta x, l\Delta y) \exp\{i\phi(k\Delta x, l\Delta y)\}. \quad (58)$$

We can decompose $\Psi$ into two contributions as follows:

$$\Psi = \Psi_S \Psi_{Err} = A_S A_{Err} \exp\{i(\phi_S + \phi_{Err})\}, \quad (59)$$

where $$\Psi_S(k\Delta x, l\Delta y) = A_S(k\Delta x, l\Delta y) \exp\{i\phi_S(k\Delta x, l\Delta y)\}, \quad (60)$$

defines the specimen contributions or the contributions that one desires to evaluate with the wave front sensing system, and where, $$\Psi_{Err}(k\Delta x, l\Delta y) = A_{Err}(k\Delta x, l\Delta y) \exp\{i\phi_{Err}(k\Delta x, l\Delta y)\}, \quad (61)$$

defines the error contributions, which comprise all undesired contributions, in particular contributions that are not caused by a specimen.

To clarify the distinction between error contributions and specimen contributions, it is necessary to precise that error contributions may comprise errors induced by the specimen position or orientation with respect to the wave front sensor. Errors contributions may also comprise effects induced at the specimen level such as aberrations of wave front deformations induced by a cover-slip or by a glass plate, or more generally by a device incorporating the specimen. It is also necessary to precise that error contributions may also comprise specimen-induced unwanted contributions, such as specimen-induced aberrations, as described for example by M. Schwertner, M. J. Booth, M. A. A. Neil and T. Wilson in Journal of Microscopy Vol. 213, pp 11-19, in 2004, in a paper entitled *Measurement of specimen-induced aberrations of biological samples using phase stepping interferometry*. If the specimen (10) is a thick semi-transparent or transparent specimen, and if the wave front sensing system enables to probe a wave front emanating from a specific layer located inside the volume of the specimen, error contributions may comprises specimen contributions induced before and after interaction with the layer of interest. For example the thick specimen may be a specimen comprising several layers of distinct materials, or a biological tissue or an organotypic culture of biological cells.

For example, errors contributions may find their origins in the following effects:

Instrumental errors caused by imperfections of the wave front sensor (11), such as misalignments or defects of components.

Experimental errors arising when the specimen (10) is not perfectly oriented or positioned with respect to the wave front sensor (11).

Environmental errors such as vibrations, thermal fluctuations, air fluctuations.

Numerical or digital errors resulting from undesired effects induced by the processing unit (12) or by the wave front processing unit (15) or by a digital wave front operator (14).

Errors contributions may be expressed as being wave front deformations or wave front aberrations or simply aberrations, that induce differences with respect to a perfect or ideal wave front. For example, error contributions may be defined by the following aberration functions: Piston, tilt, power, defocusing, astigmatism, coma, spherical, trefoil, pentafoil, of any orders including e.g. primary aberrations, secondary aberrations, tertiary aberrations, quaternary aberrations.

An ideal or nearly ideal wave front sensing system is a system that provides measurements without error contributions, or with minimized error contributions, or with error contributions that are negligible or small with respect to the specimen contributions. The present invention aims at providing wave front sensing systems approaching the performance of an ideal system.

The present invention aims at providing a wave front sensing system with performance approaching the performance of an ideal or nearly ideal system, by reducing error contributions thanks to digital means. In other words, this means that errors contributions are reduced in the processed digital wave front PDWF (16) compared to error contributions in the digital wave front DWF (13).

Figure 7:
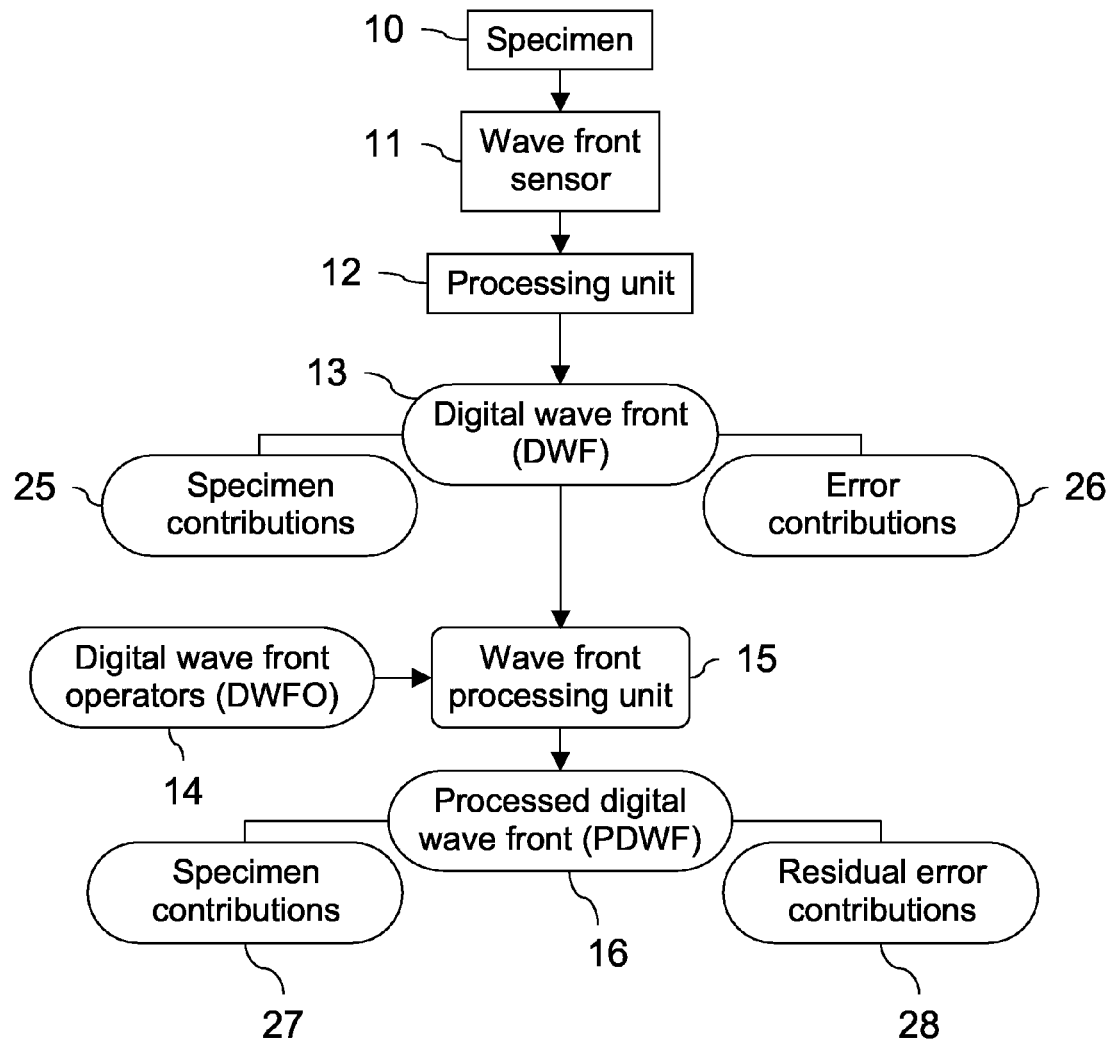
FIG. 7 describes schematically how the present invention (15) may be used to reduce error contributions.

FIG. 7 illustrates schematically how a DWF (13) processed by the wave front processing unit (15) according to the present invention, becomes a PDWF (16). The DWF (13) can be decomposed in specimen contributions (25) and errors contributions (26). The PDWF (16) can be decomposed in specimen contributions (27) and residual errors contributions (28). Residual error contributions (28) are reduced compared to initial error contributions (26) of the DWF (13).

It may occur that the specimen contributions are modified by the wave front processing unit (15). In this case, the specimen contributions (27) of the PDWF may not be an exact replica of the initial specimen contributions (25) of the DWF. For example the wave front processing unit (15) may perform a magnification of the specimen contributions. For example, the wave front processing unit (15) may modify specific parts of the specimen contributions, in order for example to provide a flat, or nearly flat, representation of a non-flat sample. For example, the wave front processing unit (15), may modify the spectrum of the specimen contribution by suppressing high or low frequency components.

Calibrated Digital Wave Front Correctors CDWFC (24) and Reference Specimen

As already described above, e.g. by FIG. 6, a DWFO may be defined using a mathematical model and a set of coefficients. In another embodiment of the present invention, a particular type of digital wave front operators DWFO (14), called calibrated digital wave front corrector CDWFC (24), may be defined by experimental, or calibration procedures. CDWFC (24) may be of particular interest for correcting or reducing error contributions.

Figure 8:
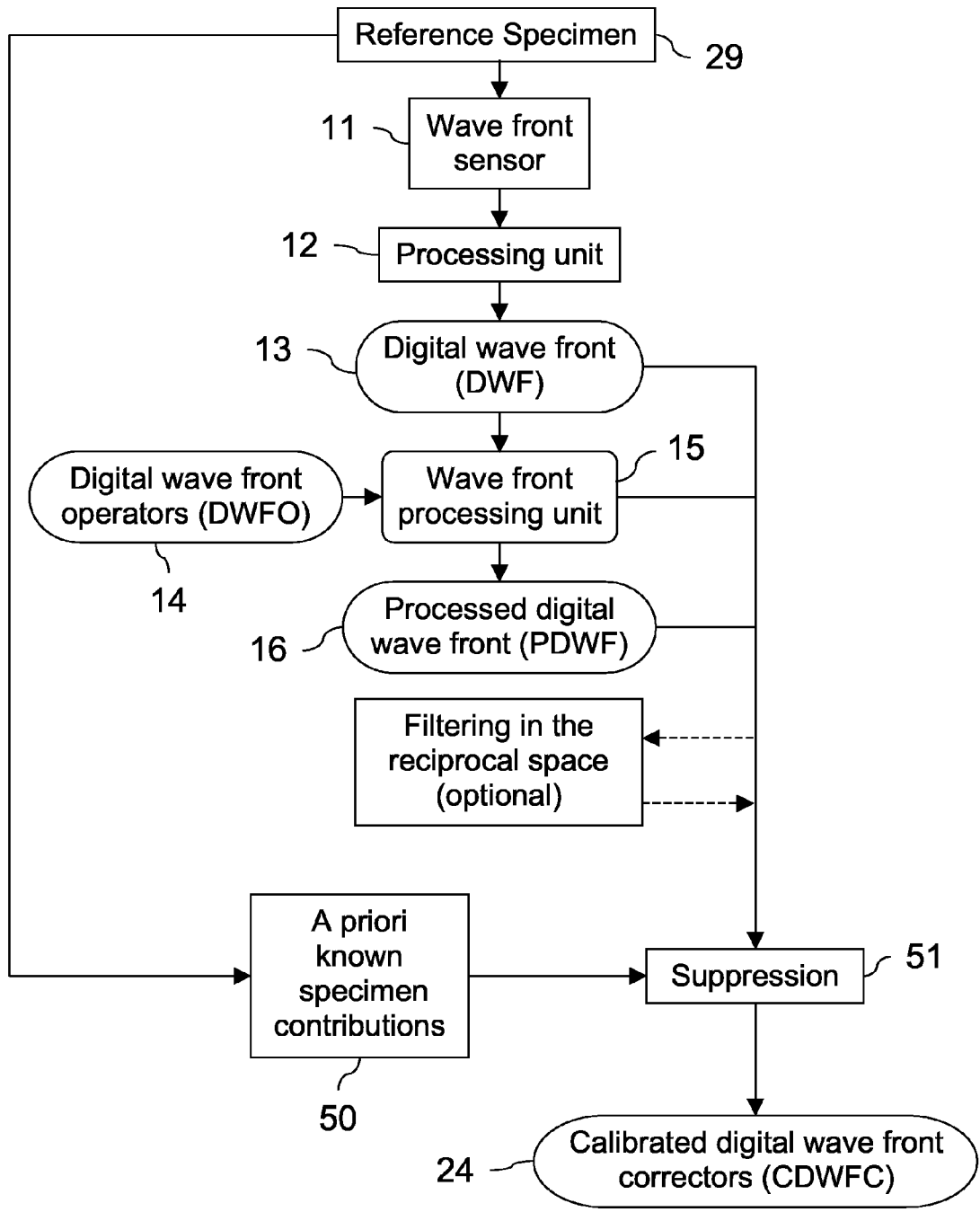
FIG. 8 describes schematically how a calibrated digital wave front corrector CDWFC (24) may be defined using a reference specimen (29) producing a priori known specimen contributions (50) by suppressing (51) a priori known specimen contributions (50) from at least one of: a digital wave front DWF (13), a processed digital wave front PDWF (16), or a wave front available from the wave front processing unit (15).

As shown in FIG. 8, a CDWFC (24) may be defined using a reference specimen (29). A reference specimen (29) is a particular specimen for which the specimen contributions are a priori-known, or assumed to be known. As shown in FIG. 8, a CDWFC (24) can be evaluated by removing the a priori known specimen contributions (50) from at least one of: A DWF (13), a PDWF (16), or a digital wave fronts available from the wave front processing unit (15).

As shown in FIG. 8, optionally an operation of filtering in the Fourier plane, e.g. low-pass filtering or band-pass filtering or high pass filtering, as presented e.g. in FIG. 3, may precede the operation of suppressing a priori know specimen contributions.

As for the definition of a particular type of DWFO (14) described in FIG. 3, a particular type of CDWFC (24) can be defined by an operation of filtering in the Fourier plane or reciprocal space of a digital wave front, e.g. an operation of low-pass filtering or band-pass filtering or high pass filtering.

It may also occur, for example if the wave front sensor (11) and the processing unit (12) provide an off-axis hologram or an off-axis interferogram, that the operation of spatial filtering take place in the Fourier plane of the hologram or interferogram.

Since a CDWFC (24) results from an operation that removes the specimen contributions from a digital wave front, a CDWFC (24) can be considered as a measurement of the error contributions. A CDWFC (24) may also be considered as an approximation of error contributions.

A CDWFC (24) is a particular case of DWFO (14). A CDWFC (24) acts on a digital wave front the same way as a DWFO (14). In particular a CDWFC (24) may be one of the DWFO (14) in FIG. 2, FIG. 4 and FIG. 5.

Let's define a wave front, called calibration wave front $\Psi_{CAL}$, recorded with a reference specimen (29) and available in a digital form.

$$\Psi_{CAL}(k\Delta x, l\Delta y) = A_{CAL}(k\Delta x, l\Delta y) \exp\{i\phi_{CAL}(k\Delta x, l\Delta y)\}. \quad (62)$$

And let's define a decomposition of $\Psi_{CAL}$ in two contributions as follows:

$$\Psi_{CAL} = \Psi_K \Psi_{Err} = A_K A_{Err} \exp\{i(\phi_K + \phi_{Err})\}, \quad (63)$$

where $$\Psi_K(k\Delta x, l\Delta y) = A_K(k\Delta x, l\Delta y) \exp\{i\phi_K(k\Delta x, l\Delta y)\}, \quad (64)$$

defines the a priori known contributions of the reference specimen, and where, $$\Psi_{Err}(k\Delta x, l\Delta y) = A_{Err}(k\Delta x, l\Delta y) \exp\{i\phi_{Err}(k\Delta x, l\Delta y)\}, \quad (65)$$

defines error contributions. The operation of suppression (51) or removing of a priori known specimen contributions (50) may be realized according to at least one the following operations:

Division of $\Psi_{CAL}$ by $\Psi_K$. In this case, the CDWFC represent both the amplitude and the phase of $\Psi_{Err}$.

Multiplication of $\Psi_{CAL}$ by the complex conjugate of $\Psi_K$. In this case, the CDWFC represents the phase of $\Psi_{Err}$, but the amplitude of CDWFC is defined by the product $A_K A_{Err}$.

Subtraction of the phase function of $\Psi_K$ from the phase function of $\Psi_{CAL}$. In this case, the CDWFC represents the phase of $\Psi_{Err}$, but the amplitude of CDWFC is defined by the product $A_K A_{Err}$.

Subtraction of both the phase and amplitude functions of $\Psi_K$ from both the phase and amplitude function of $\Psi_{CAL}$. In this case, the CDWFC represents the phase and the amplitude of $\Psi_{Err}$.

If desired the amplitude of $\Psi_K$ can be arbitrarily set to unity ($A_K(k\Delta x, l\Delta y) = 1$). If desired the amplitude of a CDWFC can be arbitrarily set to unity. If desired, $\Psi_{CAL}$ and CDWFC can be defined by setting the values of the sampling intervals $\Delta x$ and $\Delta y$ to unity.

Figure 9:
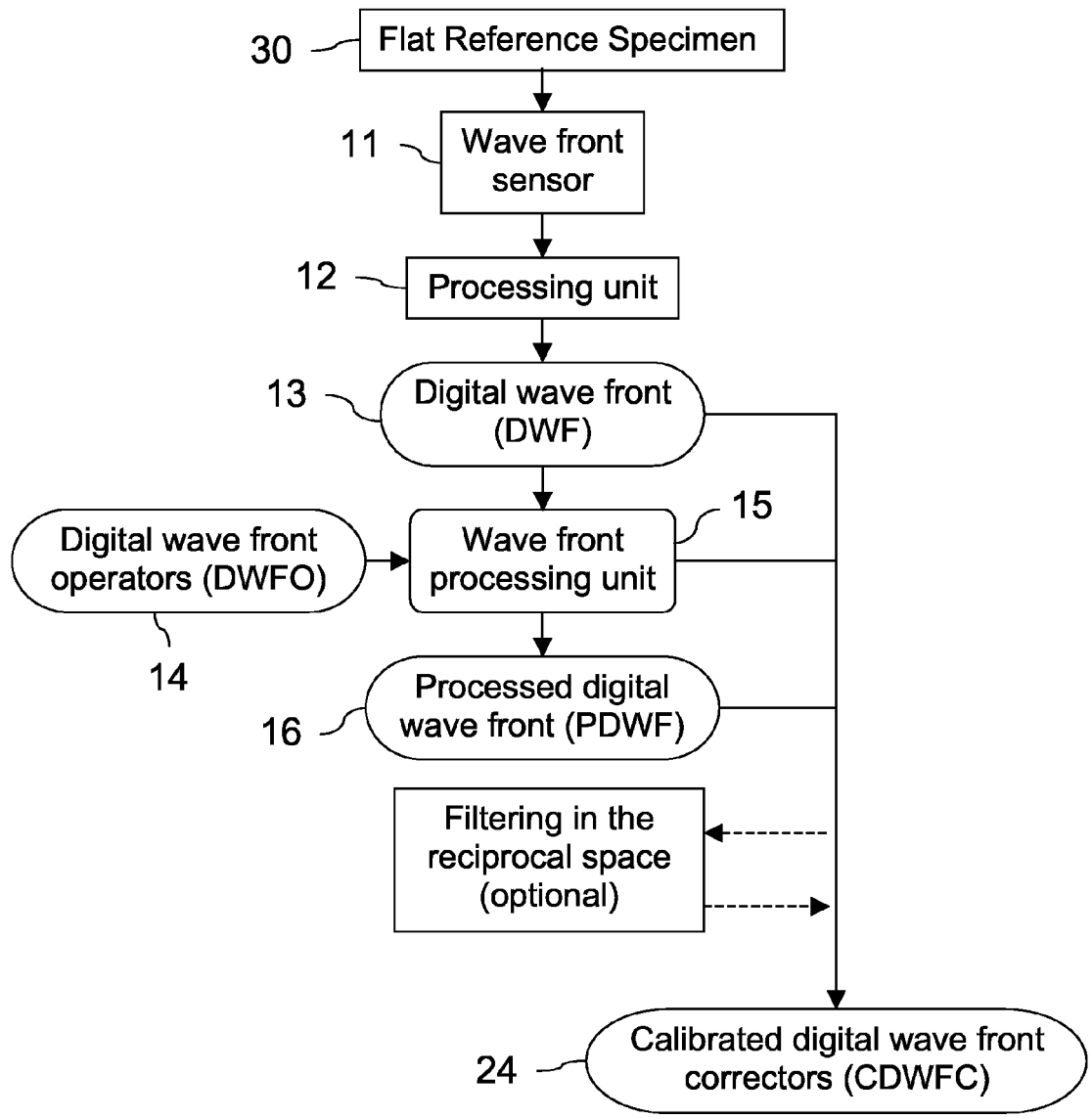
FIG. 9 describes schematically how a calibrated digital wave front corrector CDWFC (24) may be defined using a flat reference specimen (30) producing constant specimen contributions.

A particular case, which may be interesting for many practical applications, occurs when the phase function of the priori known specimen contributions is, or can be approximated by, a constant ($\phi_K(k\Delta x, l\Delta y) =$ Constant). This condition may arise when the reference specimen (29) is, or comprises, a flat surface or several flat surfaces. In this case, as described in FIG. 9, a CDWFC (24) can be directly defined without removing of the a priori known specimen contributions. This is particularly valid if we assume that the amplitude of the a priori known specimen contributions is equal to unity ($A_K = 1$).

In reflection, i.e. when the wave front sensor (11) collects a radiation that is reflected or backscattered by the sample, a reference specimen (29) may be any type of surface having a known, or assumed to be known, topography. More precisely a reference specimen (29) may be for example one of:

A specimen with a flat surface,
a specimen with a spherical surface with a known radius of curvature,
a specimen with a curved surface, with a known curvature, e.g. a parabolic surface or a polynomial surface,
a specimen with a sinusoidal surface topography of known amplitude and period,
a specimen with a surface comprising periodic structure,
a specimen with a Gaussian surface of known parameters,
a specimen with a tilted surface of known slope,
a mirror,
a plate,
a test target,
a calibration standard,
a specimen with a surface, e.g. a flat surface, at an interface between two materials or two media such a liquid-liquid interface or a liquid-solid interface or a liquid-gas or a solid-solid interface or a solid-liquid interface or a solid-gas interface or a gas-gas interface or a gas-liquid interface or a gas-solid interface,
an interface inside a specimen comprising several transparent or semi-transparent layers,
a specimen with a flat surface, may be a polished surface, such as a metallic surface or a dielectric surface or a semi-conductor surface or a glass surface or an organic surface,
a specimen with a thin film or a coating,
a specimen with micro- or nano-structured surface,
a specimen comprising one or a plurality of particles such as metallic or dielectric or semi-conductor or glass particles,
a fibre, transmitting the radiation source of the wave front sensor,
a specimen with any type of surface whose topography has been evaluated thanks to another apparatus or thanks to another wave front sensing system, e.g. a system as described by the present invention.

In transmission, i.e. when the wave front sensor (11) collects a radiation that is transmitted by the sample, a reference specimen (29) must be realized with a material or a plurality of materials that are transparent or semi-transparent for the radiation of the wave front sensor (11). In transmission a reference specimen (29) may be any type of specimen having a known shape, or assumed to be known shape, meaning that the two faces of the reference specimen (29) are surfaces of known topography. In addition, if not homogenous, the refractive index distribution inside a reference specimen (29) must be known, or assumed to be known. For example a reference specimen (29) for transmission observations may be one of:

air, i.e. no specimen,
a container comprising a liquid or a gas,
a transparent plate,
a transparent specimen of known shape,
a transparent specimen of known shape and index of refraction,
a transparent specimen with a spherical or hemi-spherical shape with a known radius of curvature,
a transparent specimen with one face being a flat surface and the opposite face being a curved surface of known curvature, e.g. a parabolic surface or a polynomial surface, a transparent specimen with two faces being curved surfaces of known curvatures, the curvature of each face may be identical or different, a transparent specimen with one face being a flat surface and the other face being a known surface such an exponential surface, a sinusoidal surface, a periodic surface, or a polynomial surface, a transparent sample two faces being known surfaces such as a curved surface, an exponential surface, a sinusoidal surface, a periodic surface, the two faces may be identical or different, a test target, a calibration standard, a specimen with a flat transparent area, possibly a polished area, such as a metallic area or a dielectric area or a semi-conductor area or a glass area, a specimen comprising one or a plurality of particles such as metallic or dielectric or semi-conductor or glass particles, a fibre, transmitting the radiation source of the wave front sensor.

a specimen of any type of shape whose surface topography has been evaluated, for the two faces of the specimen, thanks to another apparatus or thanks to another wave front sensing system, e.g. a system as described by the present invention.

A reference specimen (29) may also be defined, near or on a specimen, by a flat surface of sufficiently large area to cover a sufficiently large part of the field of view (FOV) of the wave front sensing system. Sufficiently as used in the previous sentence means that even if the corresponding CDWFC is not a perfect evaluation of the error contributions, it may be used to perform a partial correction that may be sufficient for a given application or a partial correction that may be improved thanks to others of the procedures described by the present invention.

Wave Front Analysis Unit (17) and Reference Data (18)

The function of the wave front analysis unit (17) is to provide reference data (18). As described further, reference data are used to evaluate fitted coefficients (20) by applications of fitting procedures (19).

The wave front analysis unit (17) provides reference data (18) that may be extracted from at least one of:

A digital wave front DWF (13), a processed digital wave front PDWF (16), a wave front or several wave fronts available from the digital wave front processing unit (15).

Reference data (18) may be at least one of: phase data, amplitude data, complex data. In a preferred embodiment of the present invention, reference data (18) are phase data.

Reference data (18) are extracted from specific regions of a digital wave front called reference areas (35). Reference data may be composed of at least one of:

A set of punctual values extracted from a set of points or pixels, a set of one-dimensional (1D) values extracted from a set of 1D profiles or lines or curves or segments, a set of two-dimensional (2D) values extracted from a set of 2D surfaces, or region of interests (ROI).

If desired reference data may be extracted after application of a filtering procedure in the Fourier plane or in the reciprocal space, e.g. a low-pass filtering operation, or band-pass filtering operations, or a high-pass filtering operation, as described e.g. by FIG. 3.

The reference data are extracted from specific locations, called reference areas (35) or reference surfaces, distributed in the field of view (FOV) of the wave front sensing system.

In one embodiment of the present invention, reference areas are defined in specific locations of the FOV, where the specimen contributions are a priori known, or assumed to be known. This means that reference areas can be considered as parts of the FOV, where the specimen locally satisfy the definition of a reference specimen as defined in previous descriptions of the present invention. This means also that reference areas are areas where errors contributions can be evaluated.

For example, reference areas (35) can be defined in areas of the FOV where the specimen contributions are constant, or assumed to be constant. For example, reference areas (35) may be defined as follows:

If the specimen is located on a flat substrate, such as a flat specimen holder, reference area can be defined on the substrate.

If the specimen comprises flat surfaces, references areas can be defined on these flat surfaces.

If no flat surfaces are available on the FOV, the specimen can be translated until the presence of at least one flat surface in the FOV enables the definition of reference areas and the extraction of reference data (18). Then, the specimen can be translated backwards to observe the desired area of the specimen.

If the specimen (10) is a reference specimen (29) as defined in previous descriptions of the present invention, reference areas can be defined over the entire field of view.

Figure 10:
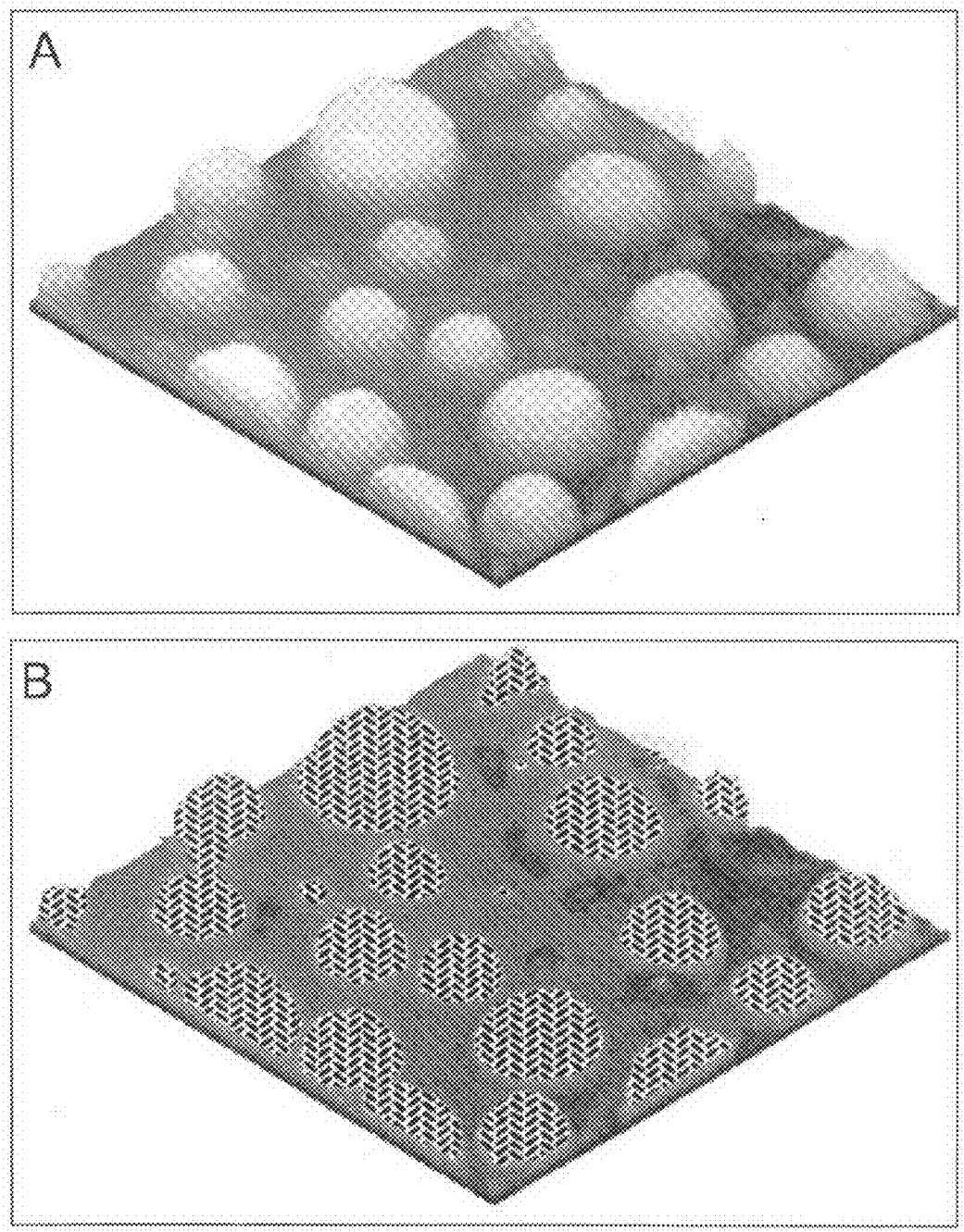
FIG. 10 illustrates on a real example where reference areas can be defined to extract reference data.

FIG. 10 illustrates with a concrete example, where reference areas can be defined when the specimen comprises flat areas. FIG. 10(A) shows, in perspective, the phase image of a sample composed of hemispherical particles of various sizes deposited on a flat glass plate. In this case, references areas can be defined everywhere except on the hemispherical particles. FIG. 10B present an image where regions that should not be considered as reference areas have been removed and replaced by a texture pattern.

Figure 11:
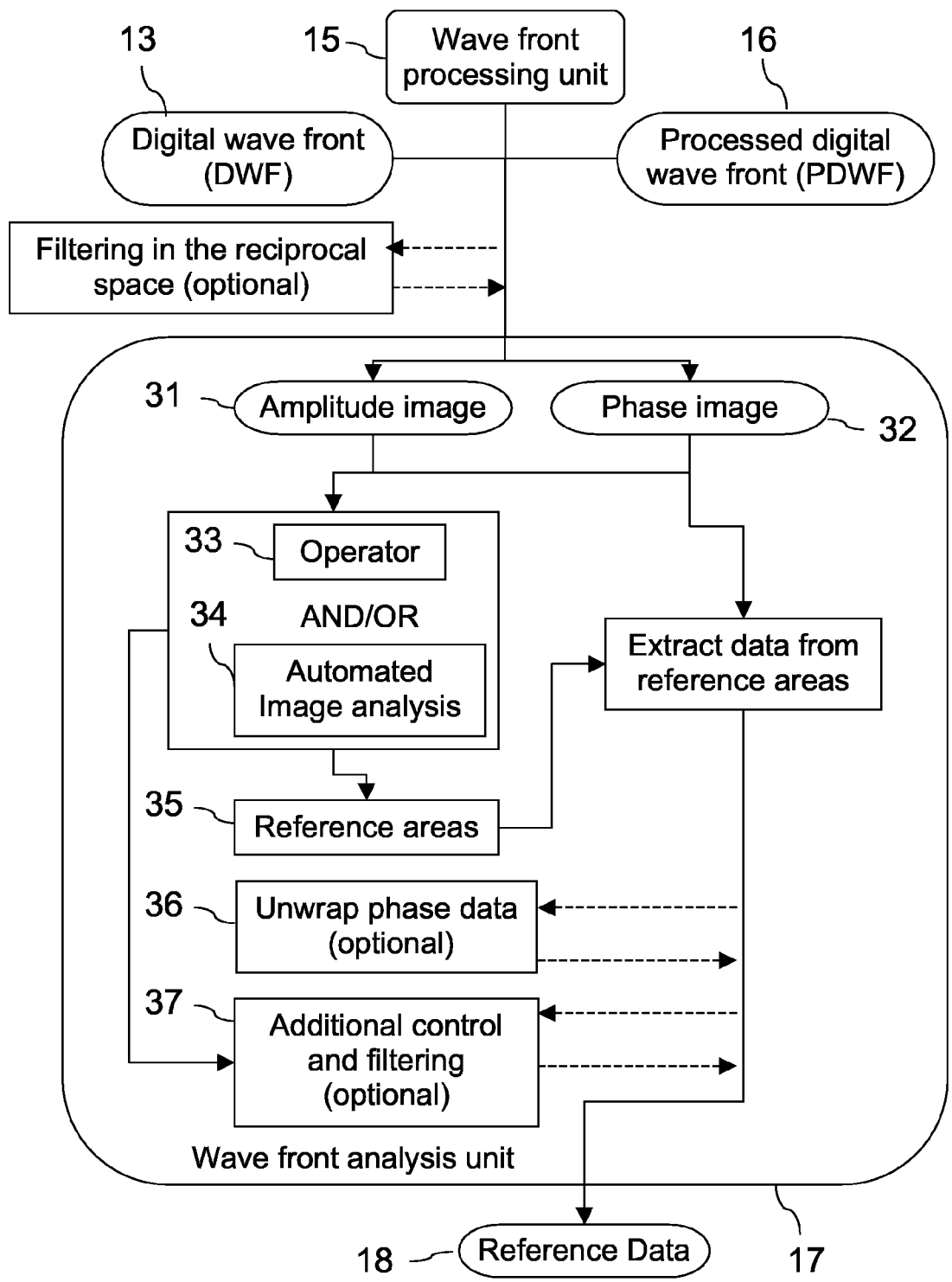
FIG. 11 describes schematically how the wave front analysis unit (17) may provides reference data (18) by extracting amplitude or phase data inside reference areas (35) from at least one of: a digital wave front DWF (13), a processed digital wave front PDWF (16), or a wave front available from the wave front processing unit (15).

As presented in FIG. 11, a first step for defining reference areas (35) consist in calculating at least one of an amplitude image (31) or a phase image (32), from the digital wave front DWF (13), or from the processed digital wave front PDWF (16), or from a wave front available from the digital wave front processing unit (15). Optionally, as shown in FIG. 11, an operation of filtering in the Fourier or reciprocal space, as presented e.g. by FIG. 3, may be applied before calculation of the images. Then, reference areas (35) can be defined using at least one of, or by a combination of the following procedures:

At least one of the amplitude image (31) or the phase images (32) is presented on a screen, e.g. on the screen of a personal computer (PC) or a laptop, and a human operator (33) indicates parts of these images that satisfy the definition of reference areas (35). For example, the human operator (33) may indicate areas where the specimen is assumed to be flat, meaning that the specimen contributions should be constant. For example the human operator (33) may indicate the contours of areas or regions of interests (ROI). For example, human operator (33) may define 1D segments or lines or profiles. To do this, the human operator (33) may use a standard peripheral or accessory of a PC such as a mouse, a keyboard, a touch-screen display, a joystick, a control panel, a touchpad, a trackball, a track-pad, a pedal, a switch, a pen tablet, a digital pen.

Automated image analysis (34) procedures can be applied to find regions of the images that satisfy the definition of reference areas (35). Example of such procedures will be described further.

References areas can be defined thanks to information stored on a computer memory. For example this information may be the coordinates of a set of references areas adapted to a given type of specimen.

Anyone of the above-described methods for defining reference areas can also be applied for defining regions that do not satisfy the definition of references areas. Then, as shown in FIG. 11, data are extracted from at least one of the amplitude image (31) or phase image (32), to define reference data (18). Optionally, as shown in FIG. 11, phase data can be unwrapped (36) before defining reference data (18). Phase unwrapping (36) of phase data is a standard operation that suppresses phase jumps (abrupt variations of $2\pi$) in a phase functions. Phase unwrapping is not necessary when the phase values are restricted in the $[-\pi,\pi]$ interval, meaning that the phase image is sufficiently constant or flat or corrected to avoid the presence of phase jumps in the reference data (18). Optionally also, an additional control (37) may be applied to the extracted data in order to verify if they satisfy the definition of reference data (18), i.e. if extracted data have really been extracted from regions that satisfy the definition of reference areas (35).

As shown in FIG. 11, optionally, additional control and filtering procedures (37) may be performed by a human operator (33) or by an automated image analysis procedure (34). The goal of this operation is to verify if extracted data are conform to the definition of reference data (18). If some of the extracted data are not conform, they can be filtered out or the definition of reference areas (35) may be improved.

Reference data (18) may also be first extracted from a fixed pattern and filtered, e.g. by an iterative process, in order to suppress regions of the extracted data that do not correspond to the definition of reference data (18), i.e. data for which specimen contributions are a priori known. For example, reference data (18) may be extracted from a regular pattern of horizontal and vertical 1D lines. Each line of the pattern is then analyzed and if necessary filtered.

Fitting Procedures (19)

The role of fitting procedures (19) is to provide fitted coefficients (20) that can be used, in combination with mathematical models (21) to define a DWFO (14). Fitting procedures (19) consist basically in numerical methods for fitting measured data with an analytically defined function. For example the fitting procedures (19) may comprise least square fitting procedures, or a regression procedures, or linear regression procedures, or recursion procedures, or interpolation procedures. Fitting procedures (19) may also comprise wavelet transforms. Fitting procedures (19) may also comprise numerical methods for solving systems of equations. As described further, fitting procedures (19) may also play a role for compensating temporal fluctuations of a phase offset.

Let us define 0xy, the plane of coordinates of a phase or amplitude or intensity image, from which reference data (18) have been extracted. Lets us defined $\Delta x$ and $\Delta y$ the sampling intervals in the 0xy plane. $\Delta x$ and $\Delta y$ may have a given value defined by parameters of the system or can be arbitrarily set to unity. The coordinates of a point in the 0xy plane, e.g. the coordinates of a point belonging to the reference data (18), can be defined by two integers, e.g. k and l, or by the products between two integers and the sampling intervals, $k\Delta x$ and $l\Delta y$. The origin (k=l=0) of the 0xy plane can be defined for example in the center or in a corner of the image. Reference data (18), extracted from an image defined in the 0xy plane, can be defined by coordinates indicating their locations with respect to the origin of the 0xy plane. Reference data (18) can also be defined independently from the origin of the 0xy plane. Fitting procedures (19) can take into account the coordinates defining reference data (18) with respect to the origin of the 0xy plane. Fitting procedures (19) can also be applied independently from the origin of the 0xy plane and without taking into account the coordinates of reference data (18). In what follows the 0x axis defines the horizontal direction, and the 0y axis defines the vertical direction. 1D profiles parallel to 0x will be sometimes called horizontal profiles and 1D profiles parallel to the 0y axis will be sometimes called vertical profiles.

Fitting procedures (19) can be applied to the entire part of reference data (18) or only to a subgroup of reference data (18). Fitted coefficients (20) can be defined by calculating the mean value of several coefficients evaluated on different subgroups of reference data (18). Fitted coefficients (20) can also be defined by calculating the mean value of several coefficients evaluated on different reference data (18) defined at different times.

Figure 12:
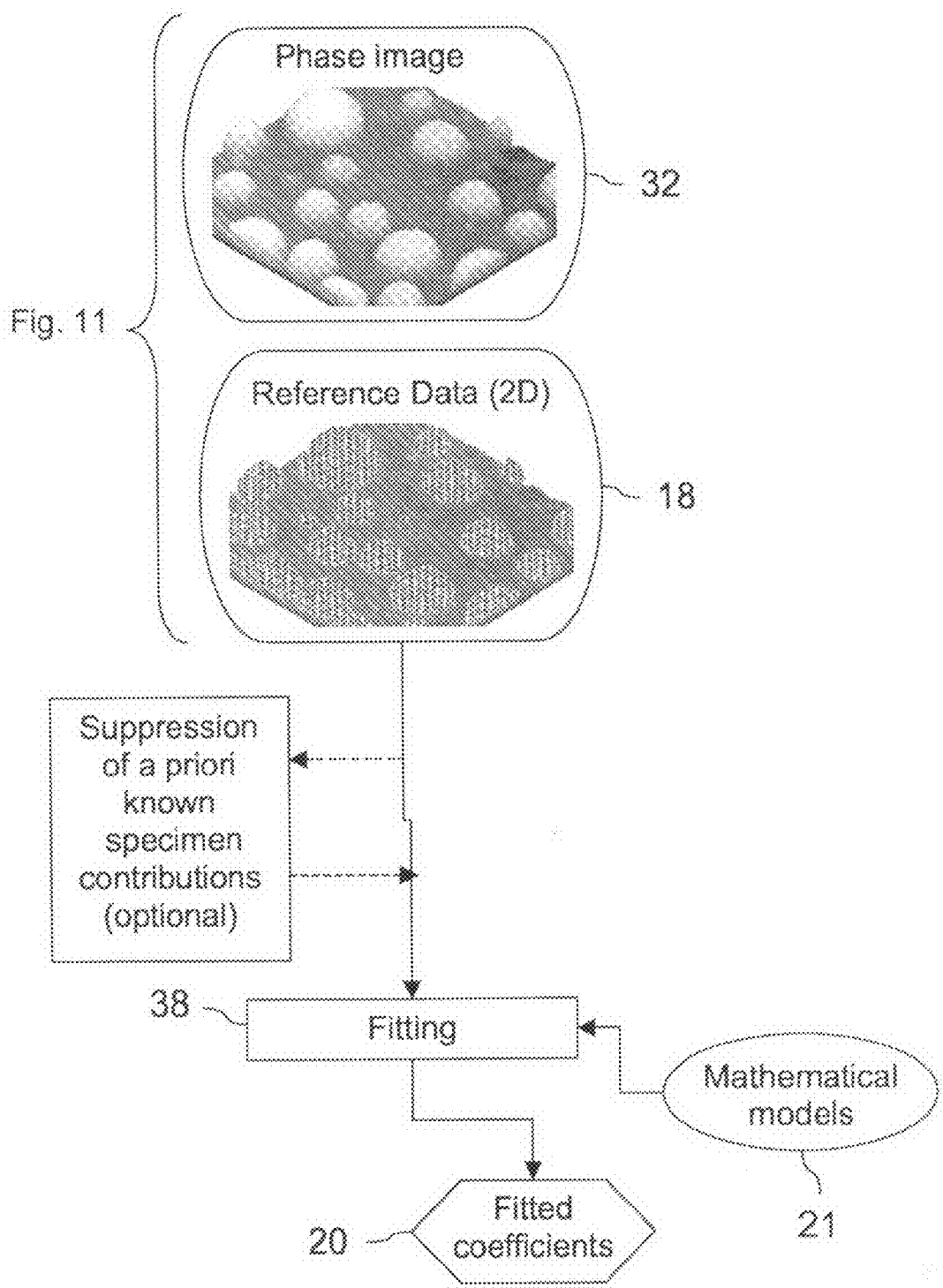
FIG. 12 describes schematically how fitted coefficients (20) can be obtained by fitting at least one mathematical model (21) on two-dimensional (2D) reference data (18).

In one embodiment of the present invention, reference data (18) are 2D data. As presented in FIG. 12, the fitting procedures (19) consist in fitting (38), e.g. by a least square fitting method, the mathematical models (21) on the reference data (18), in order to determine the fitted coefficients (20). 2D reference data (18) can be extracted from a set of several discontinuous reference areas, or from a continuous single reference area. Several mathematical models (21), at least one, may be fitted on the same reference data (18). As shown in FIG. 12, optionally, and in particular if reference areas have not been defined in regions where specimen contribution are constants, a priori known specimen contributions can be removed from the reference data (18) before application of the fitting procedure (38).

When reference data (18) are composed of 1D data extracted along 1D line profiles, the position and the orientation of a profile can be defined by an expression of the type:

$$p(x)=ax+b, \qquad (66)$$

or by an expression of the type:

$$p(y)=cy+d, \qquad (67)$$

where a and c define the slope of the profile, and where b and d define the intersections with respectively 0y and 0x, of a line passing on the profile. As images here are discrete images, the position and the orientation of 1D profiles may also be defined by an expression of the type:

$$p(k)=a\cdot k\Delta x+b, \qquad (68)$$

or by an expression of the type:

$$p(l)=c\cdot l\Delta y+d, \qquad (69)$$

where k and l are integers and where $\Delta x$ and $\Delta y$ are the spatial sampling intervals (pixel sizes) along respectively the horizontal and vertical directions. If we assume a pixel size equal to unity along both directions, the position and the orientation of 1D profiles may also be defined by an expression of the type:

$$p(k)=a\cdot k+b, \qquad (70)$$

or by an expression of the type:

$$p(l)=c\cdot l+d, \qquad (71)$$

For example, p(y)=d or p(l)=d define horizontal profiles. For example, p(x)=b or p(k)=b define a vertical profile. For example, p(x)=x or p(k)=k define a diagonal profile with a slope of 45° passing by the origin. In addition, the length of a 1D line profiles may be defined by an interval of the type:

$$x_{min} \leq x \leq x_{max}, \text{ or } y_{min} \leq y \leq y_{max}, \text{ or } k_{min} \leq k \leq k_{max}, \text{ or } l_{min} \leq l \leq l_{max}, \quad (72).$$

In what follows, 1D profiles will be expressed indifferently using one of expressions 66 to 72.

In another embodiment of the present invention, reference data (18) are composed of 1D data extracted along 1D profiles, and fitting procedures (19) may operate as follows:

In the expression f(x,y) of a 2D function defining at least one of the mathematical models (21), y is replace by the expression of a profile p(x)=ax+b, meaning that the function of two variables f(xy) becomes a function of one variable: $g(x,y) \rightarrow f(x,p(x))=f(x,ax+b)$. For example, with a polynomial phase function we can have:

$$W(x,y) = \Sigma\Sigma C_{ab} x^a y^b \rightarrow \Sigma\Sigma C_{ab} x^a (ax+b)^b.$$

Similarly, x can be replaced by p(y), so that we have $f(x,y) \rightarrow f(p(y),y)$.

In the interval $x_{min} \leq x \leq x_{max}$ or $k_{min} \leq k \leq k_{max}$, function f(x,p(x)) is fitted, e.g. by curve fitting procedure such as a least square fitting procedure, on the 1D reference data (18) extracted along the corresponding 1D profile. Similarly f(p(y),y) can be fitted on the 1D reference data (18) in the interval $y_{min} \leq y \leq y_{max}$ or $l_{min} \leq l \leq l_{max}$. If necessary, before applications of the fitting procedure, a method for phase unwrapping in 1D can be applied to the phase data comprised in the corresponding 1D reference data (18).

Figure 13:
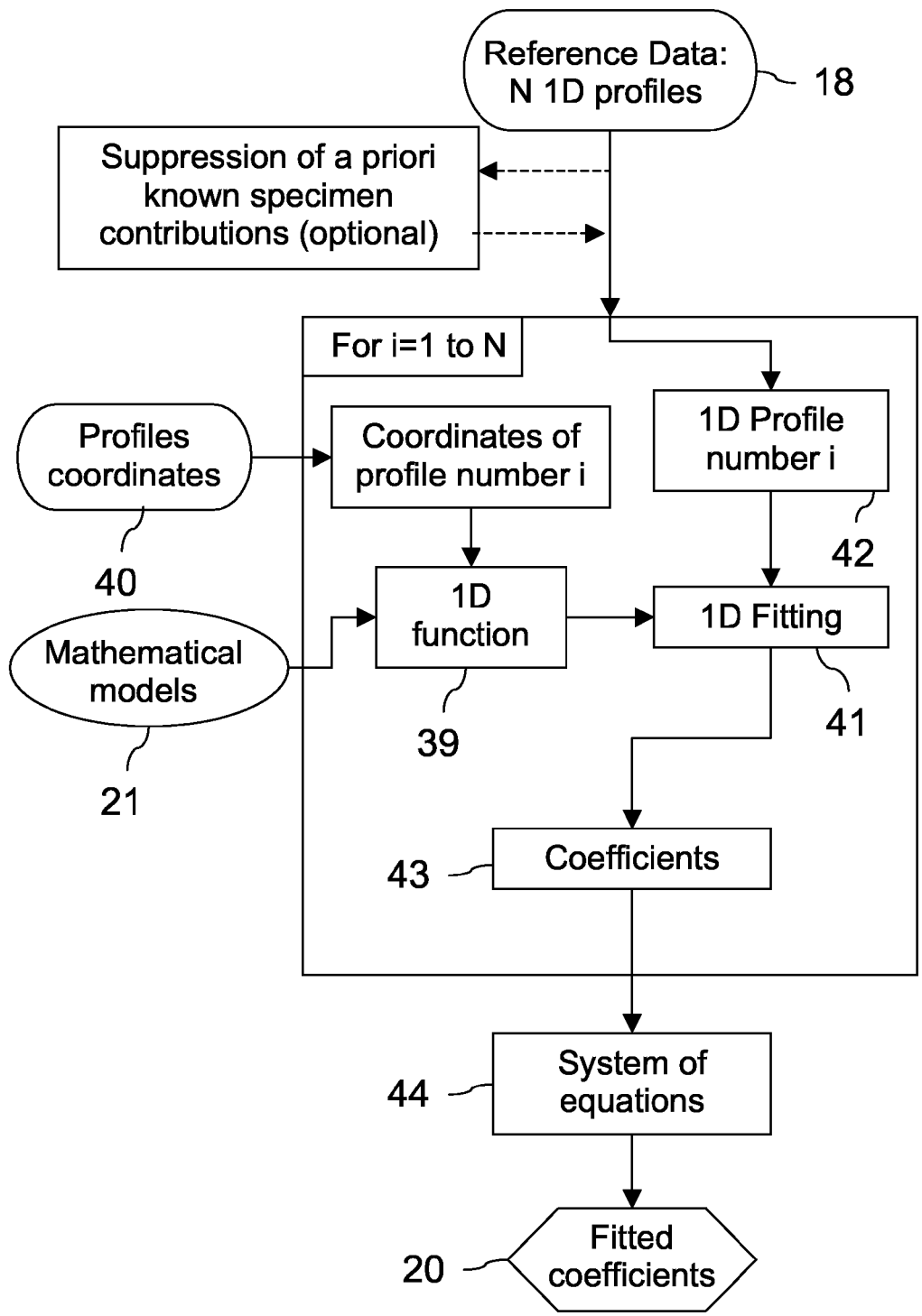
FIG. 13 describes schematically how fitted coefficients (20) can be defined from reference data (18) comprising N one-dimensional (1D) profiles.

When reference data (18) have been extracted from several different 1D profiles, operations described above are repeated for each profile. For each profile coefficients provided by the 1D fitting operation are used to build a system of equations. This system of equations is then solved to define the fitted coefficients (20). FIG. 13 describes schematically how fitted coefficients (20) can be defined from reference data (18) comprising N 1D profiles. For each of the N profiles, a 1D function (39) is defined thanks to at least one of the mathematical models (21) and thanks to the coordinates of the profile (40). A 1D fitting procedure (41) is then applied to fit a 1D function (39) on the data of a 1D profile (42). Coefficients (43) resulting from 1D fitting (41), for each of the N 1D profiles, are then grouped to build a system of equations (44). Fitted coefficients (20) can be determined by solving the system of equations (44). Optionally, a priori known specimen contributions can be suppressed from the reference data (18) before application of the fitting procedures.

In another embodiment of the present invention, reference data (18) are composed of 1D data extracted along 1D profiles. Let us define, U the number of coefficients involved by the mathematical model f(x,y), N the number of profiles, $p_i(x)=a_i x+b_i$ the description of the orientation and position of profile number i, $D_i(k)$ the 1D data extracted along profile number i, $S_i$ the size of $D_i$ or in other words the number of elements in $D_i$, and S the total number of points in reference data (18) (sum of $S_i$). In this case, fitting procedures (19) may operate as follows:

a) In the expression f(x,y) of a 2D function defining at least one of the mathematical models (21), y is replace by the expression of profiles $p_i(x)=ax+b_i$, in order to define a function of one variable $f(x,y) \rightarrow f_i(x,p_i(x))=f_i(x,a_i x+b)$.

b) The definition of the following equality: $f_i(k\Delta x, a_i k\Delta x + b_i) = D_i(k\Delta x)$ or $f_i(k, a_i k + b_i) = D_i(k)$ defines a system of $S_i$ equations, one for each k value. If necessary, a method for phase unwrapping in 1D can be applied to the phase data comprised in the 1D reference data $D_i(k)$.

c) Repeating steps a) and b) for each of the N profiles defines an over-determined system of S equations and U unknowns (U<V). If desired, this system of equations can be described by a matrix formulation.

d) Fitted coefficients (20) can be obtained by solving the system of equations defined by step c). For example, the system of equations can be solved using one of or a combination of: a least square method, Gaussian elimination, LU decomposition, a square root method, a Givens method, a Householder method, a Cholesky method, a Monte-Carlo method.

Figure 14:
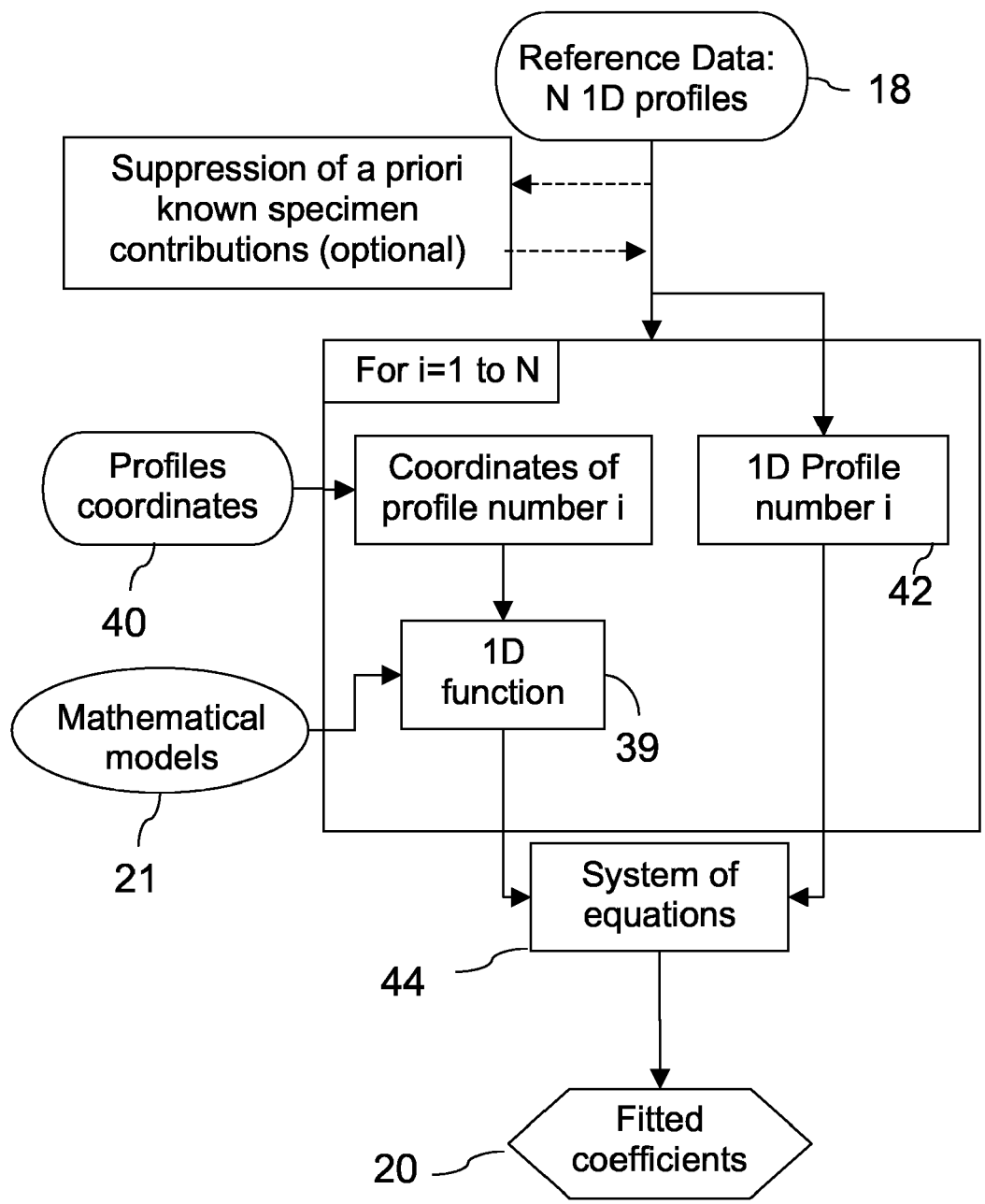
FIG. 14 describes schematically how fitted coefficients (20) can be defined from reference data (18) comprising N one-dimensional (1D) profiles.

FIG. 14 describes schematically how fitted coefficients (20) can be defined from reference data (18) comprising N 1D profiles. For each of the N profiles, a 1D function (39) is defined thanks to at least one of the mathematical models (21) and thanks to the coordinates of the profile (40). For each of the N profiles, a 1D profile (42) of data is extracted. The N 1D functions (39) and the N 1D profiles (42) define a system of equations (44). Solving the system of equations (44) enable to define fitted coefficients (20).

In another embodiment of the present invention, reference data (18) are composed of N points. These points can be isolated points or adjacent points and adjacent points can be extracted from 2D surfaces or from 1D line profiles or from 1D curves. Let us define $D_i$, the value of point number i, and $(k_i, l_i)$ a couple of integers defining the coordinates of point number i. In this case, fitting procedures (19) may operate as follows:

a) In the expression f(x,y) of a 2D function defining at least one of the mathematical models (21), x and y are replaced by respectively $k_i\Delta x$ and $l_i\Delta y$. x and y may also be replaced by respectively $k_i$ and $l_i$.

b) For each of the n points, the definition of the following equality: $f(k_i\Delta x, l_i\Delta y) = D$, or $f(k, a_i k + b_i) = D_i(k)$ defines a system N equations. If desired, this system of equations can be described by a matrix formulation.

c) Fitted coefficients (20) can be obtained by solving the system of equations defined by step b). For example, the system of equations can be solved using one of or a combination of: a least square method, Gaussian elimination, LU decomposition, a square root method, a Givens method, a Householder method, a Cholesky method.

In another embodiment of the present invention, reference data (18) are composed of a combination of 2D surfaces or 1D profiles or points, and fitting procedures (19) combine the different fitting procedures already described above.

Semi-automated and Automated Procedures for Reference Data (18) Extraction

As already described, the wave front analysis unit (17) provides reference data (18) extracted from reference areas (35). As already described reference areas (35) define areas of the FOV that satisfy locally the definition of a reference specimen (29), i.e. areas where the specimen contributions are a priori known. In particular, when the specimen locally satisfies the definition of a flat reference specimen (30), reference data (18) may be extracted and used without suppression of a priori known specimen contributions.

As already mentioned, reference areas (35) may be defined by automated image analysis procedures or by semi-automated procedures involving image analysis procedures and interventions of a human operator.

As already described (see e.g. FIG. 11), reference areas (35) are defined by analyzing amplitude or phase images. The definition of reference areas (35), and in particular the automated or semi-automated definition of reference areas (35) may be facilitated if amplitude or phase images are obtained from a wave front that have already been processed, for example in order to remove wave front errors that may result from systematic wave front deformations induced for example by the wave front sensor (11). Such preliminary wave front processing may be performed for example thanks to one of, or thanks to a combination of: Calibrated coefficients (23), user defined coefficients (22), calibrated digital wave front correctors CDWFC (24), a filtering procedure in the Fourier plane or in the reciprocal space as described e.g. by FIG. 3, former estimations of error contributions by a calibration procedure using for example a reference specimen.

The definition of reference areas (35), and in particular the automated or semi-automated definition of reference areas (35) may also be facilitated if amplitude or phase images are focused images.

If the wave front processing unit (15) define several planes, as described e.g. by FIG. 4 or 5, references areas (35) may be defined in one or several planes.

When reference areas (35) are expected to be defined from regions where specimen contributions are not constant, the definition of reference areas (35) may be facilitated if a priori known specimen contributions are removed for parts of the amplitude or phase images, or from entire amplitude or phase images.

Information concerning the specimen (10) can be used to define the reference areas. For example, if the size of a specimen or the height of a specimen or the shape of a specimen, or the position of a specimen within the FOV are known, this information may be used to define reference areas (35) or a first definition of reference areas. For example, if the present invention is applied for controlling the quality of a large number if identical or nearly identical specimens, the description of a standard specimen can be used to define reference areas (35), or at least a first definition of reference areas (35).

The present invention may operate iteratively to define reference areas (35). For example, an iterative process may start by defining a first group of fitted coefficients (20) obtained by applications of fitting procedures (19) on reference data (18) extracted from the entire field of view (FOV) of the system, i.e. without defining references areas (35). Then reference areas (35) may be defined iteratively or progressively, according to any one of the methods described by the present invention for reference areas (35) definition. An iterative process may also consist in progressively filtering out unwanted data from reference data (18) or by filtering out unwanted parts of reference areas (35).

Reference areas (35) may be defined by applying image analysis procedures and image processing procedures on at least one amplitude image or at least one phase image or on both an amplitude image and a phase image. Image analysis procedures and image processing procedures may also be applied on the reference data (18), for example in order to determine data that should be removed from reference data (18) before application of fitting procedures (19). If reference data (18) are 1D profiles, image analysis procedures and image processing procedures may also be applied being understood that described procedures are adapted to properly apply on 1D profiles. Image analysis procedures and image processing procedures may comprise one of, or a combination of:

Morphological image processing operations.
Arithmetic such as addition, subtraction, multiplication, scaling, division, blending.
Logical operations such as AND, NAND, OR, NOR, XOR, XNOR, NOT, bitshift.
Convolution with a Kernel or a structuring element.
Digital filters such as mean filter, median filter, Gaussian filter, smoothing filters, speckle removal filters, frequency filters, Laplacian filters, Laplacian of Gaussian (LoG) filter, Marr filters, unsharp filters.
Geometric operations such as scaling, rotation, symmetry, translation or affine transformation.
Morphological operations such as erosion and dilation, opening, closing, thinning, thickening.
Transforms, such as distance transform, Fourier transform, Hough transform.
Thresholding, adaptive thresholding.
Edge detection.
Noise removal.
Enhancement.
Segmentation.
Skeletonization.
Contrast stretching
Histogram equalization
Logarithm or exponential or power operators
Computing of image gradients or Laplacians.
Neighborhood pixel operations.
Image averaging.
Image smoothing.
Low-pass or high-pass or band-pass filtering.
Contours detection or definition or extraction.
Detection or definition or extraction of regions.
Application of magic wand operators to select specific regions in an image.
Edges detection, e.g. by one of the Sobel or Prewitt or Roberts or Canny or Compass methods.

For example, if the specimen comprises flat surfaces, procedures for defining reference data (18) may operate in order to detect regions of an intensity or amplitude or phase image, where intensity or amplitude or phase values are homogeneous and constant or can be approximated by a constant. For example this can be achieved by application of an operator sometime called magic wand operator. For example, magic wand operators can be applied on sub-regions of an image. For example granular procedure can also be applied that divide an image in a finite number of granulates that are defined regularly or randomly in the image.

For example a procedure for defining reference areas (35) may be an iterative process comprising the steps of:

a) Positioning of two initial 1D profiles, a vertical profile and a horizontal profile. For example these two initial profiles may have a fixed size and may be simply positioned in the center of an image. For example these two initial profiles may be positioned in homogenous areas of an amplitude or intensity image, and the profiles positions can be defined in order to maximize the profile lengths.

b) Defining an initial set of fitted coefficients from the reference data extracted from the initial profiles.

c) Reconstructing a first phase image using the initial set of fitted coefficients.

d) In homogeneous regions of the first phase image, placing one horizontal profile and one vertical profile in order to maximize their lengths, extracting corresponding reference data and computing a new phase image with the new fitted coefficients.

e) Applying step d) until the homogenous area are maximized. Profiles defined during these additional step can be added to profiles defined during previous steps in order to increase the size of reference data (18). Various profiles orientations can be defined. 2D homogeneous regions of images can also be extracted to serve as reference data.

Procedures for Tilt and Defocus Compensation

Tilt compensation is of particular interest, since it enables to compensate for changes in the specimen orientation that may occur, for example when the specimen is changed, or displaced, or rotated. To compensate an unwanted tilt the present invention may operates as follows:

Most wave front processing operations, such as operations using DWFO, and in particular wave front processing applied to the correction of aberrations such as defocus or astigmatism or coma or spherical of any desired order are performed using at least one of, or a combination of: CDWFC (24), calibrated coefficients (23), user defined coefficients (22) that have been evaluated during former use of the system according to the descriptions of the present invention, in particular they may have been evaluated using a reference specimen (29) or a flat reference specimen (30).

The wave front analysis unit (17) and fitting procedures (19) perform in order to provide only two fitted coefficients (20) a and b that enable the definition of a DWFO (14) defined using a mathematical model (21) as follows:

$$f(x,y)=\exp(i(ax+by)) \quad (73)$$

If desired defocus compensation can be added to tilt compensation by fitting of a third fitted coefficient (20) c, for defining a DWFO (14) thanks to a mathematical model (21) as follows:

$$f(x,y)=\exp(i(ax+by+c(x^2+y^2))) \quad (74)$$

Procedure for Tilt Compensation by Centering in the Fourier Space

Figure 15:
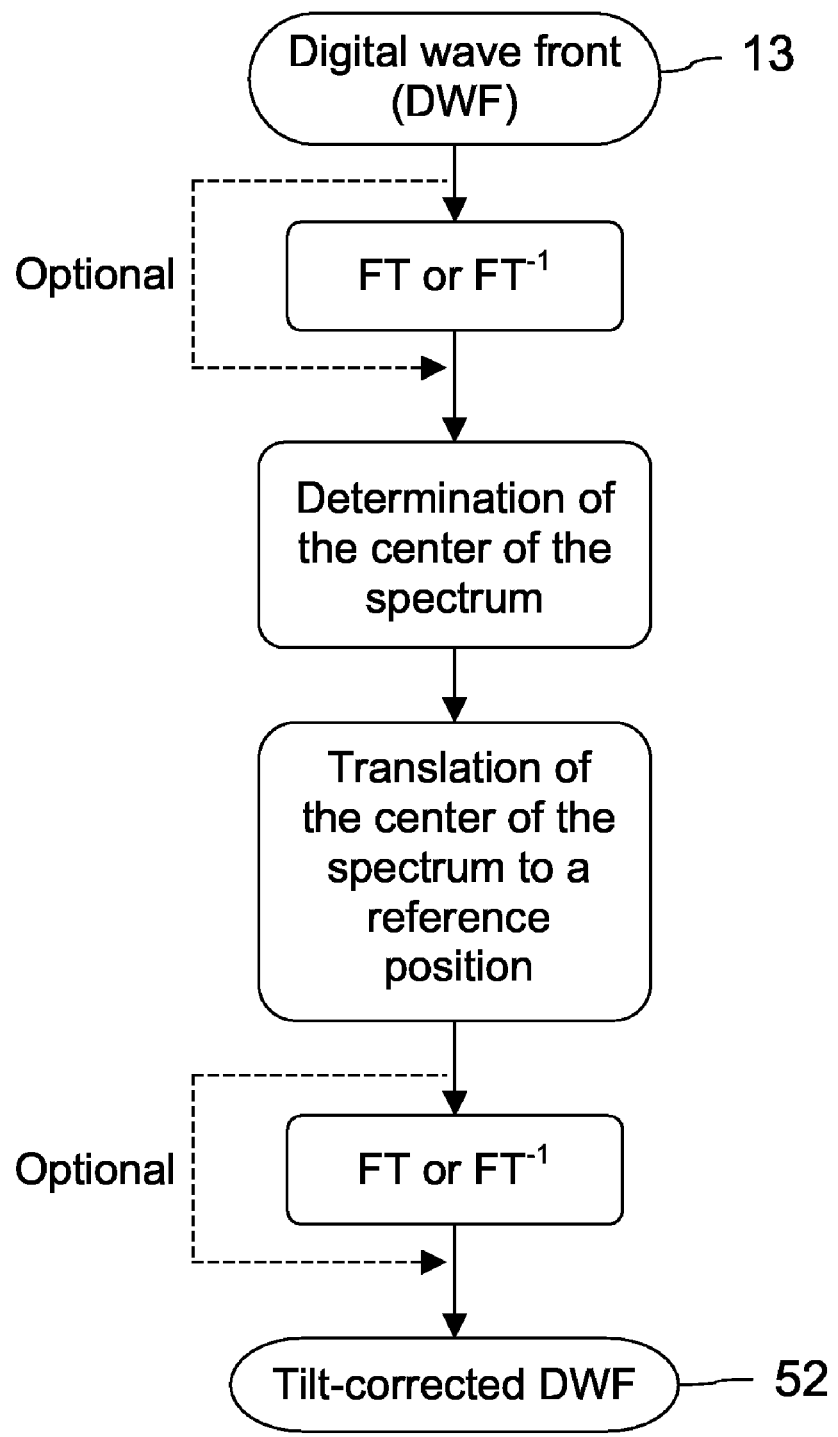
FIG. 15 describes schematically how a tilt aberration can be compensated by translating the spectrum of a digital wave front DWF.

In addition to the appearance of a tilt in the phase function, a modification of the orientation of the specimen (10) produces a translation of the spectrum of a wave front. Therefore, as presented in FIG. 15, tilt compensation can also be made by translating the spectrum to a reference position where the induced tilt is compensated. This can be achieved as follows:

Fourier transform (FT) of the digital wave front DWF (13). If DWF (13) is already expressed in the reciprocal or Fourier space, this operation is not necessary.

Determination of the center of the spectrum of the DWF (13). In a preferred way, this can be achieved automatically by an image analysis technique that determines the maximum or the center of gravity of the amplitude or intensity of the spectrum.

Translation of the center of the spectrum to a reference position that compensate the induced tilt. For example the reference position can be the center of the Fourier or reciprocal space.

Inverse Fourier transform of the translated spectrum. This operation is not necessary if following operations may take place in the reciprocal or Fourier space.

If the wave front sensor is an interferometer, or an interference microscope, or a holographic microscope, or a holographic device that provides an off-axis hologram or an off-axis interferogram, centering of the Fourier spectrum as described above, may also result in a compensation of the tilt induced by the off-axis geometry. In this case, the procedure described above may also comprise procedures for eliminating the zero order in the spectrum of the hologram or interferogram. It may also comprise procedures for eliminating the spatial frequencies associated to the real image or to the virtual image. Moreover, in this case, the procedure described by FIG. 15 may also be applied directly on the hologram or interferogram instead on a digital wave front DWF (13) that would have been defined from the hologram or interferogram.

Procedures for Compensating Temporal Variations of a Phase Offset

Figure 16:
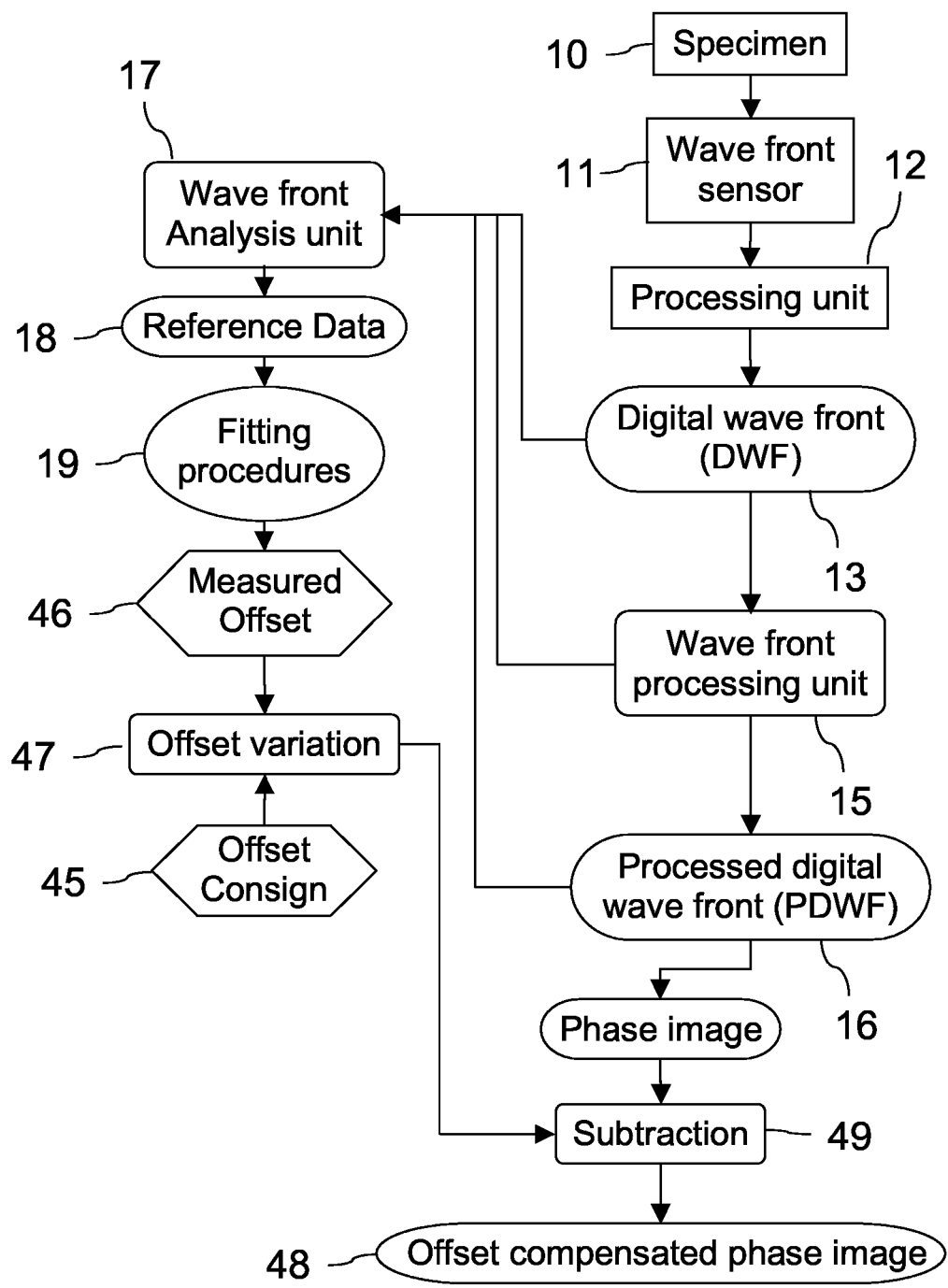
FIG. 16 describes schematically how a temporal phase offset variation can be compensated by the present invention.

A phase offset, as introduced here, defines a constant term of the phase function of a wave front such as a digital wave front DWF (13) or a processed digital wave front PDWF (16) or a digital wave front available from the wave front processing unit (15). As a result of their high sensitivity to external perturbations, the accuracy of wave front sensing systems may be affected by temporal variations of a phase offset, when measurements aim at monitoring temporally varying phenomena. It is an object of the present invention to describe a digital procedure for wave front processing that enable to compensate, or to reduce these temporal variations. As described by FIG. 16, this operation may be achieved according to the following steps:

A parameter called offset consign (45) is defined for example by an operator. For example the offset consign (45) may be one of the user defined coefficients (22).

The wave front analysis unit (17) calculates a phase image from one of: the DWF (13), the PDWF (16) or a digital wave front available from the wave front processing unit (15).

Then the wave front analysis unit (17) extracts reference data (18) from the phase image. Reference data may be extracted from reference areas (35) or may also be extracted from the entire field of view (FOV).

One the reference data (18), one of the fitting procedures (19) calculates a measured offset (46) by calculating the mean value of the reference data (18) or by calculating the mean or median of the histogram of the reference data (18). If others fitting procedures (19), are being performed, such as least square fitting in 1D or 2D, a measured offset (46) may also be defined by one of the fitted coefficients (20) that define the constant term of the fitted function, for example by taking the coefficient of the zero order or a fitted polynomial function.

The offset consign (45) is subtracted from the measured offset (46) to defined an offset variation (47).

An offset compensated phase image (48) is then defined by subtraction (49) of the offset variation (47) from a phase image defined from the PDWF (16). Alternatively (not shown in FIG. 16), offset compensation can be performed by the wave front processing unit (15), thanks a DWFO of the form: $\text{DWFO}_{\text{Offset}}=\exp\{-i\cdot\text{Offset variation}\}$.

Digital Wave Front Processing Applied to Specimen Shape Compensation

Figure 17:
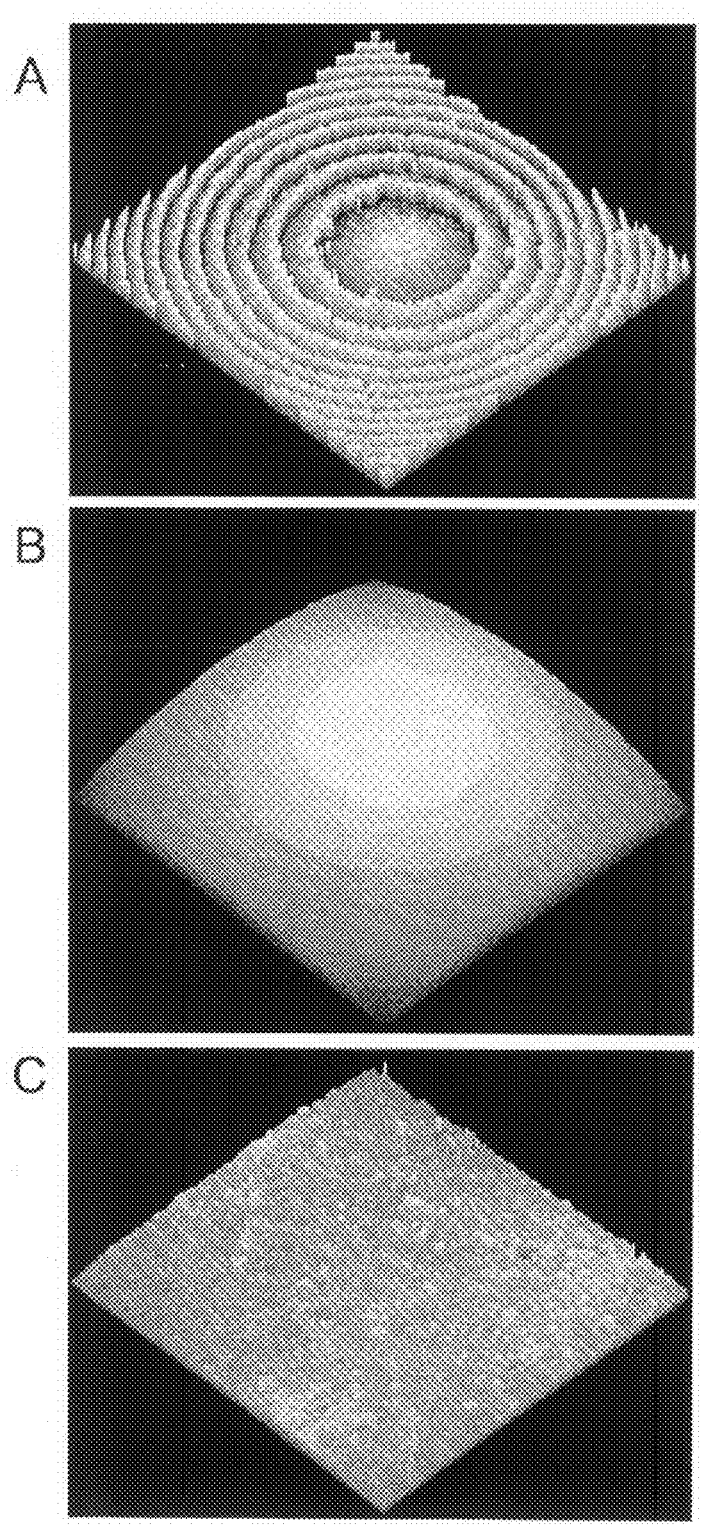
FIG. 17 presents an example of application for specimen shape compensation with a metallic sphere.
Figure 18:
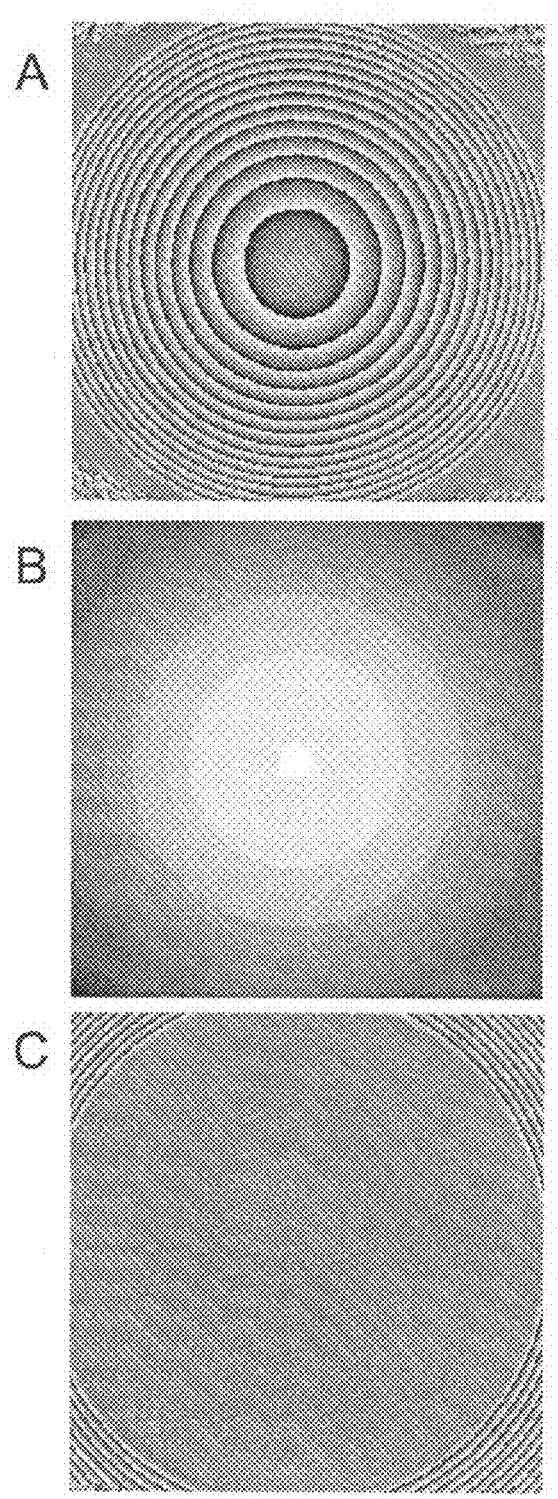
FIG. 18 presents an example of application for specimen shape compensation with a micro-lens.

The digital methods for wave front processing described by the present invention offers interesting possibilities for compensating, partially or completely, the shape of a specimen. For example, the present invention enables to generate a flattened representation of a specimen having a non-flat surface. This may be interesting for all applications that aim at characterizing the surface, e.g. surface roughness or observations of fine structures, on specimen with a non-flat shape. In this case most previous descriptions are still valid except the fact that reference data (18) must be extracted from locations of the FOV where we know that the specimen contributions are not constant, and by defining fitting procedures (19) and mathematical models (21) enabling the definition of at least one DWFO (14) whose application renders a flat or nearly flat phase functions from area of the specimen that are non-flat. In this case, the fitting procedures (19) provide coefficients that may be used to define a DWFO that may compensate for the shape of specimen. FIG. 17 presents an example of such an application for specimen shape compensation in the case of a metallic sphere. FIG. 17.A presents, in perspective, the phase image obtained by standard definition of the reference areas on a flat surface. FIG. 17.B presents the result after phase unwrapping of FIG. 17.A. FIG. 17.C presents the result when reference areas have been defined on the metallic sphere. FIG. 18 presents an example of such an application for specimen shape compensation in the case of a micro-lens. FIG. 18.A presents, the phase image obtained by standard definition of the reference areas on a flat surface. FIG. 18.B presents the result after phase unwrapping of FIG. 18.A. FIG. 18.C presents the result when reference areas have been defined on the lens.

Iterative Procedures for Fitted Coefficients Adjustment

In some cases, fitting procedures (19), when applied for the first time to a given set of reference data (18), may fail in defining directly the correct or optimal values of the fitted coefficient (20). Among different reasons for such a behavior, we can mention for example:

Reference data (18) are not properly defined meaning for example that some of the reference data have been extracted from not properly defined reference areas (35).

Unwrapping procedure (36) of phase data embedded in reference data (18) did not work properly, for example because the phase data are varying too much rapidly in the plane of a phase image.

The specimen has been changed or has moved or the wave front sensor operates differently or the environment disturb the system in such a way that the optimal values of the fitted coefficients (20) have changed significantly.

In this case, the wave front processing unit (15) and the wave front analysis unit (17) may operate several iterations in order to improve the values of the fitted coefficients (20). At each iteration, the wave front analysis unit (17) may improve the definition of reference areas (35) or may apply more properly additional control and filtering (37) procedures. It may also happen that optimal values of the fitted coefficients (20) are reached without any modifications of the reference areas, simply because unwrapping procedures (36) becomes more efficient when the fitted coefficients (20) approach progressively their optimal values. At each iteration, criteria may be defined to evaluate the quality of wave front processing operations. As example of criteria we can mention:

Visual inspection of the reconstructed images by an operator.

Calculation of a quantitative parameter. For example in regions of an image where specimen contributions are assumed to be constant, one can calculate the spatial standard deviation of phase data, which should be minimized for an optimal adjustment of fitted coefficients. If the specimen surface is not assumed to be flat, the spatial standard deviation may be evaluated after subtraction of a priori known specimen contributions. For example, one can also estimate the image total variation defined by the integral of the absolute value of the gradient of the image, calculated over a specific region of the image, or over the whole field of view. For example, one can also estimate image entropy.

Examples of Implementation of the Present Invention as a Digital Holographic Microscope (DHM)

The following descriptions present examples of a possible implementations of the present invention as a digital holographic microscope (DHM). It is clear that the following descriptions do not constitute a restriction regarding the general scope of the present invention, which can be applied to a plurality of wave front sensing techniques. It is also clear that schematic representations of DHM wave front sensors in FIGS. 19, 20 and 21, and corresponding descriptions, give only examples of possible realizations of DHM wave front sensors.

Figure 19:
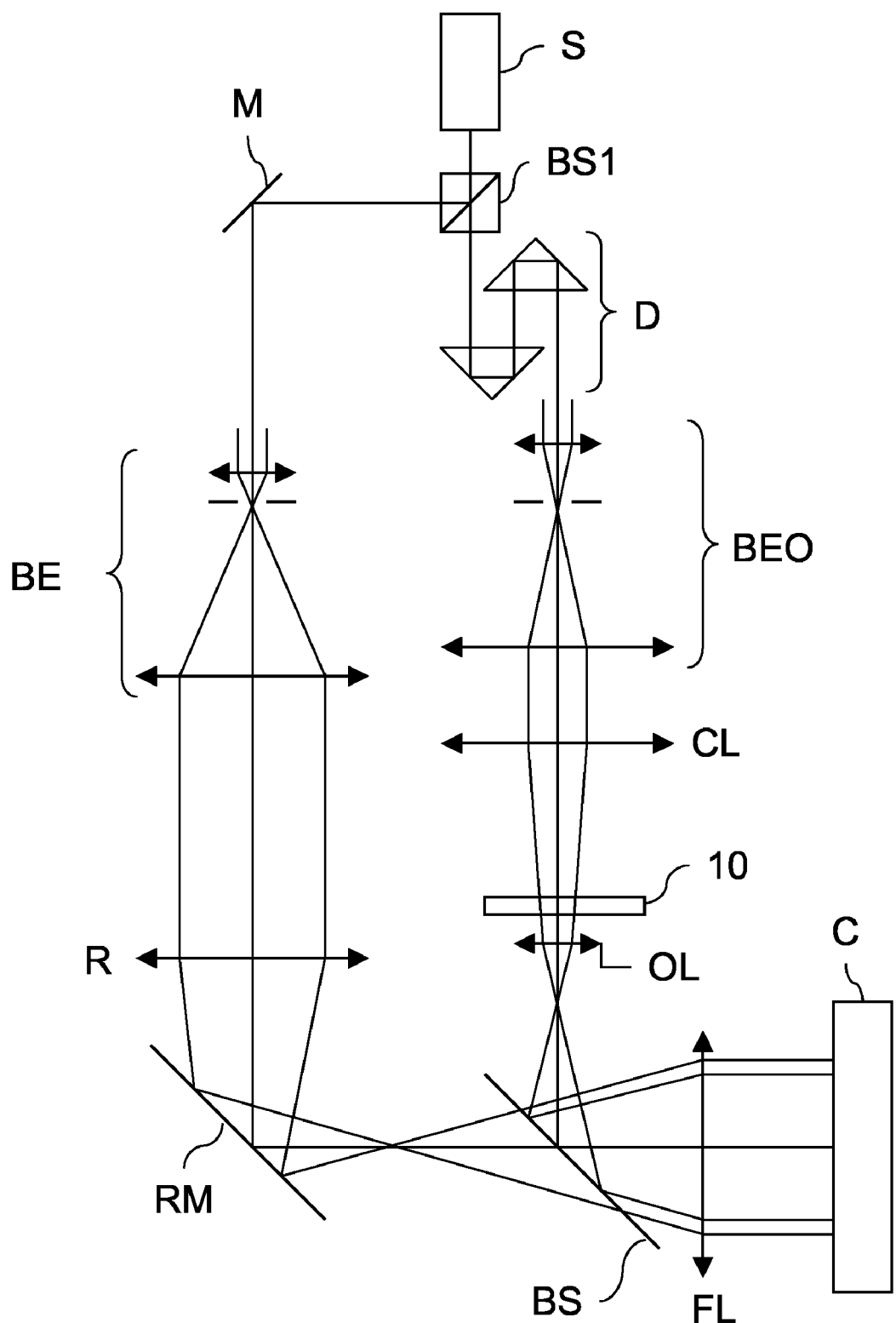
FIG. 19 describes schematically a wave front sensor as a digital holographic microscope (DHM) for transmission imaging.
Figure 20:
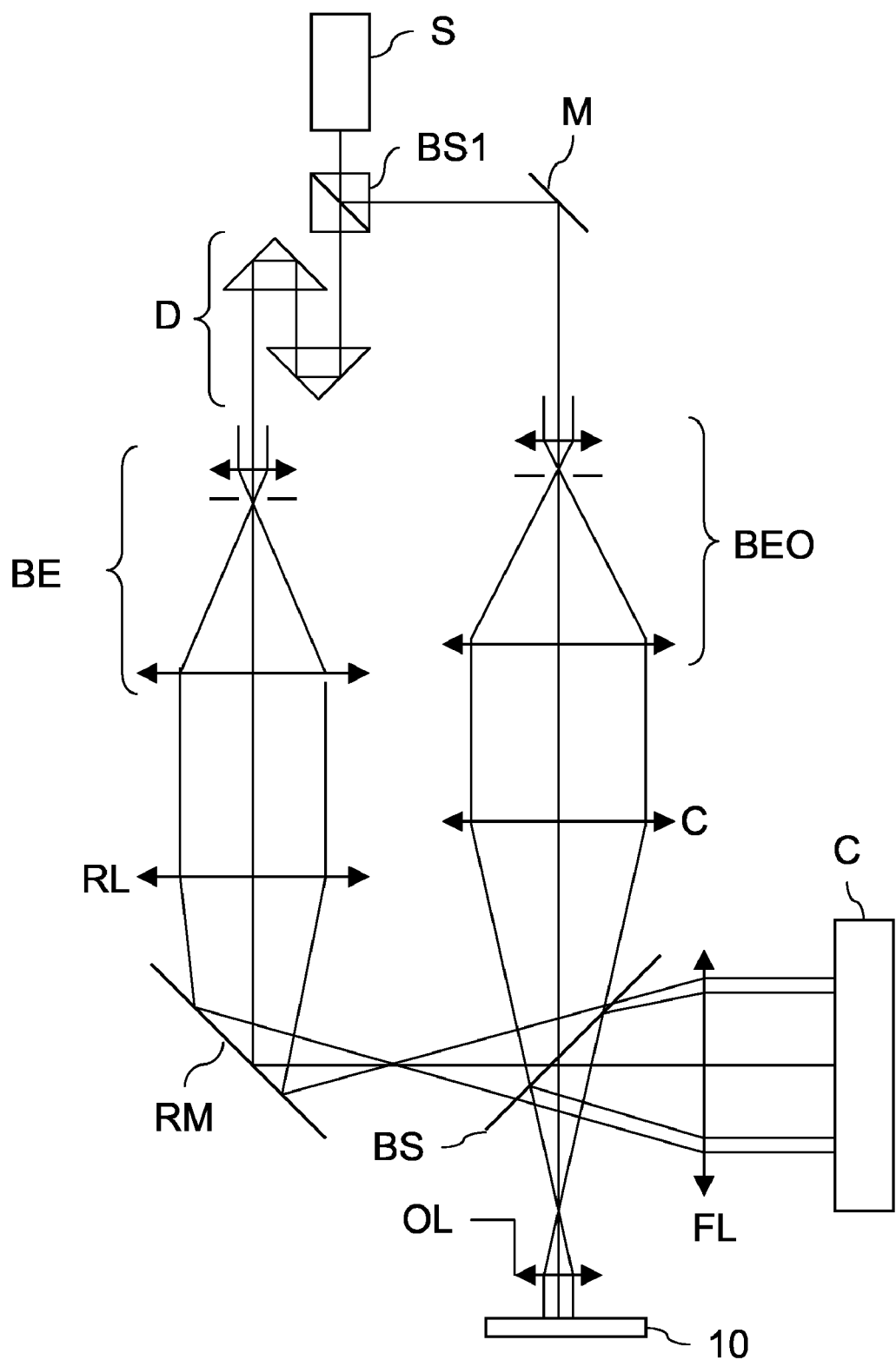
FIG. 20 describes schematically a wave front sensor as a digital holographic microscope (DHM) for reflection imaging.

FIG. 19 describes schematically a wave front sensor (11) as a digital holographic microscope (DHM) for transmission imaging. FIG. 20 describes schematically a wave front sensor (11) as a digital holographic microscope (DHM) for reflection imaging, and FIG. 21 describes schematically a wave front sensor (11) as a compact digital holographic microscope (DHM) for reflection imaging.

Figure 21:
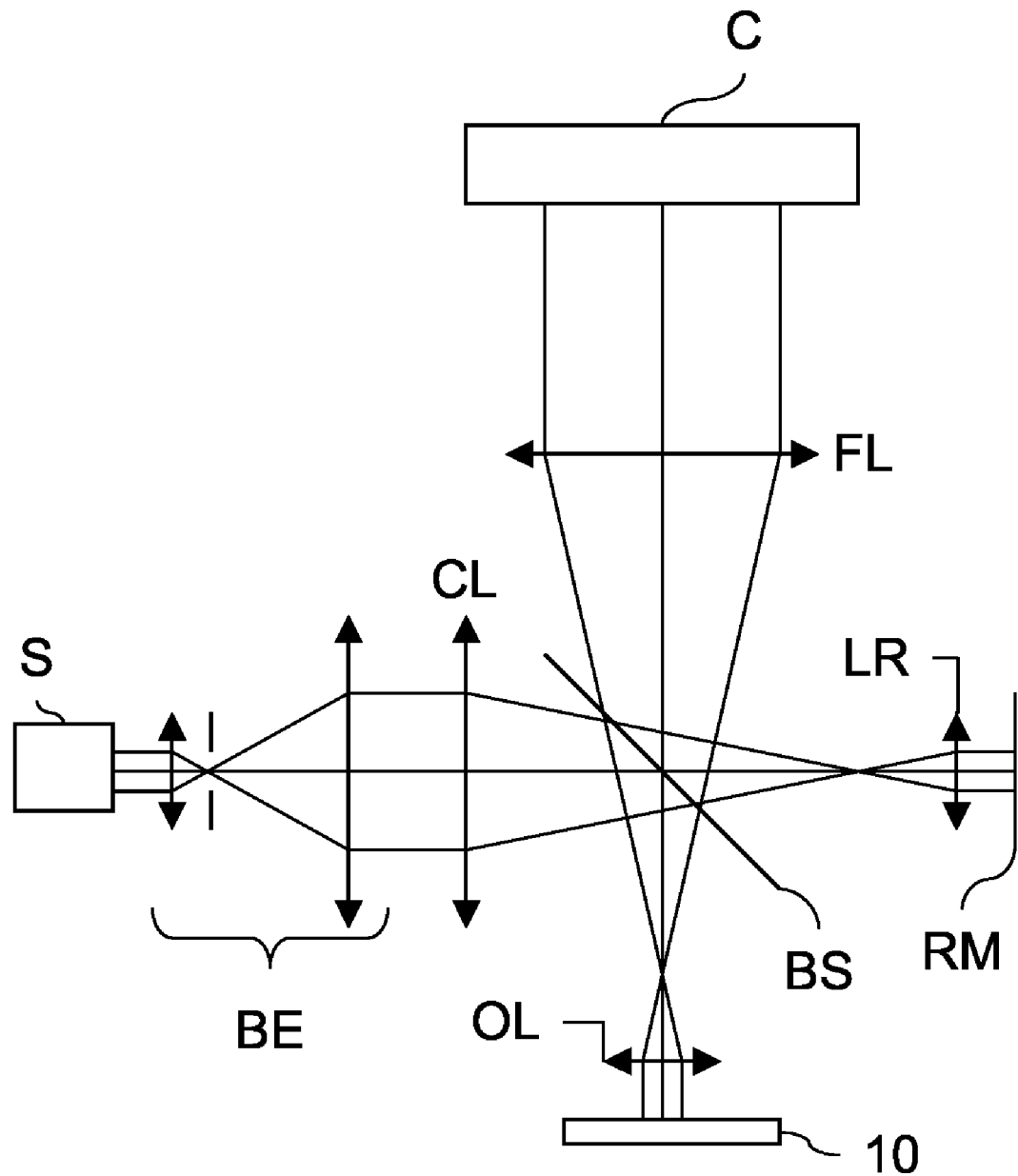
FIG. 21 describes schematically a wave front sensor (11) as a compact digital holographic microscope (DHM) for reflection imaging.

All apparatuses described in FIGS. 19, 20 and 21 are modified versions of interferometer arrangements; the Michelson arrangement for FIG. 21, and the Mach-Zender arrangement for FIGS. 19 and 20. The main features and components of these apparatuses are:

A radiation source (S). For example a light source, such as a laser, pulsed laser, a wavelength tunable laser, a diode such as a laser diode (LD), a vertical cavity surface emitting laser (VCSEL) diode, a super-luminescent diode (SLD), a light emitting diode (LED), a pigtailed diode, an external cavity diode, a distributed feedback (DFB) laser diode, a distributed Bragg reflector (DBR) laser diode.

An objective lens (OL) to produce a magnified image of a specimen (10). The radiation collected by the objective lens after interaction with the specimen (10) defines an object wave O that propagates towards a camera (C). As examples of objective lenses we can mention: A microscope objective, an infinity corrected microscope objective, an aspherical lense, a single lense, a lenses assembly, a ball lens, a half-ball lens, a solid immersion lens (SIL), a diffractive lense, a gradient index lens, a cylinder lens. Lens-less imaging is also possible by removing the objective lens (OL).

A reference mirror (RM) that reflects a wave called reference wave R towards a camera (C).

In a preferred embodiment, holograms are off-axis holograms. This means that, in the plane of the camera, a small angle exits between the propagation direction of the reference wave R and the propagation directions of the object wave O.

A camera (C) for recording holograms resulting from the interference between an object wave O and a reference wave R. As examples of camera (C), we can mention: a charged coupled devices (CCD) camera, a CMOS camera, a digital camera, an area scan camera, a line scan camera, a progressive scan camera.

A field lens (FL), also sometimes called tube lens, located in front of the camera (C). Simplified versions of the apparatuses can be realized without filed lens (FL). In some cases, the field lens (FL) can be removed and its function can be accomplished by a DFWO (14).

Beam expanders, (BEO) and (BER) in FIGS. 19 and 20, (BE) in FIG. 21. Beam expanders may be composed of two lenses. Optionally, a pinhole may be incorporated between the two lenses for spatial filtering. Apparatuses with 2 beam expanders, as in presented FIGS. 19 and 20, may also be realized with only one beam expander located just after the radiation source (S) before splitting of the beam with a beam splitter (BS1). The second lens of a beam expander may also be removed and replaced by another lens of the apparatus, such as the condenser lens (CL) or the reference lens (RL). A simplified version of the apparatus presented in FIG. 19, can be realized without beam expander (BEO) in the object arm.

A condenser lens (CL) for controlling the illumination of the specimen (10). Simplified versions of the apparatuses can be realized without condenser lens (CL).

A beam splitter (BS) for combining an object wave and a reference wave. In FIG. 21, beam splitter (BS) is also used to split the beam into two parts. Beam splitter (BS) may be one of: a cube beam splitter, a plate beam splitter, a plate beam splitter with a wedge, a pellicle beam splitter. If beam splitter (BS) is a polarizing beam splitter, quarter wave plates, and polarizer may be introduced in order to ensure proper behavior of apparatuses.

A beam splitter (BS1) for splitting the beam from the radiation source (S). Beam splitter (BS1) may be one of: a cube beam splitter, a plate beam splitter, a plate beam splitter with a wedge, a pellicle beam splitter. If beam splitter (BS1) is a polarizing beam splitter, at least one half-wave plate may be introduced in order to ensure proper behavior of apparatuses, one of the introduced half wave plates could be used to balance the radiation energy between the two arms. If radiation source (S) is transmitted by a fiber, beam splitter (BS1) may be replaced by a fiber coupler or by a fiber splitter.

In FIGS. 19 and 20, a delay system (D), may be inserted in order to control the length in one arm of the system. Delay systems (D) may also be inserted in the two arms of the system. Simplified versions of the apparatuses of FIGS. 19 and 20 may be realized without delay system (D). A delay system can be realized using one of, or a combination of: mirrors, prisms, corner cubes, fibers.

Mirrors (M) can be inserted to deflect a beam.

EXAMPLES OF APPLICATION OF THE PRESENT INVENTION

The present invention defines a new technique for imaging, microscopy in particular, and metrology with a large field of applications in the material and life sciences and industry domains. Compared to existing techniques for wave front sensing, digital processing methods described by the present invention enables the conceptions of wave front sensing systems characterized by an increased speed, an increased robustness, an improved ease and of use, and a reduction of the fabrications costs. These features open new fields of applications that are not traditionally addressed by wave front sensing systems.

Systems according to the present invention are particularly well adapted for industrial applications, e.g. quality control applications requiring rapidity, precision and robustness.

As a result of their simplicity, reduced costs and non-invasiveness, systems according to the present invention may also be used as standard laboratory equipments for research and development applications in several domains including life sciences, biology, cellular biology, proteomics and genomics, pharmaceutical research, high throughput screening, material sciences, nano-technology, micro-technology, semi-conductor technology, micro-electronics, non-destructive testing, optics, micro-optics, telecommunication optics. Among others the present invention is particularly recommended for the following applications: surface topography measurements, surface analysis, optical testing, non-invasive biological cells and tissues imaging and monitoring, cell on chip inspections, micro-fluidic devices inspections, inspections—dynamic inspections in particular—of micro electro mechanical systems (MEMS) and micro opto electro mechanical systems (MOEMS), characterization of surfaces and internal structures in transparent and semi-transparent specimen, inspection of micro-injected or molded parts.

Systems according to the present invention offers also interesting possibilities for studying specimen comprising contrasts agents or probes such as molecules, micro-spheres, particles, nano-particles, reagents, indicators, labels, markers, antibodies, ligants, phase shifting substances, fluorescent probes, luminescent probes, colorimetric probes, dyes, fluorophores, chromophores, haptens, fluorescent-dye quenchers.

Systems according to the present invention are well adapted for the realization of compact instruments that may be used as sensors, such as roughness sensors, distance sensors, displacement sensors, refractive index sensors, optical properties sensors.

As a result of their rapidity, systems according to the present invention offers attractive possibilities for the temporal observations of dynamic processes, even very fast phenomena. The temporal resolution of systems according to the present invention can be improved by use of stroboscopic imaging modalities.

As a result of their stability and sensitivity, systems according to the present invention offers attractive possibilities for the temporal observations of dynamic processes over long periods of time.

Systems according to the present invention can be adapted with great flexibility to a wide variety of applications. In particular, systems according to the present invention can be implemented conjointly, possibly in a single apparatus, with other imaging or measuring technique. For example systems according to the present invention can be applied conjointly with scanning probe micros opes, atomic force microscopes, magnetic microscopes, acoustic microscopes, optical microscopes, fluorescence microscopes, electron-microscopes, endoscopes, telescopes.

As a result of their robustness, systems according to the present invention are also well adapted for critical applications with severe environmental conditions, such spatial applications, sub-marine applications Following descriptions present a selection of a few examples of results illustrating applications, possibilities, technical features and concepts according to the present invention. Presented results have been obtained with digital holographic microscopes as described e.g. by FIGS. 19, 20 and 21. Presented results have been obtained as follows:

a) Recoding of an off-axis hologram thanks to a digital holographic microscope.

b) Definition of a digital wave front DWF by application of a filtering procedure in the Fourier plane of the off-axis hologram in order to suppress the zero order and one of the twin images.

c) Calculation, in the Fresnel approximation, of the propagation of the DWF over a distance d, in a plane where reconstructed images are in focus.

Digital wave front operators DWFO have been applied before and/or after the propagation calculation (step b)). DWFO were all defined using Cartesian (0xy) coordinates.

Figure 22:
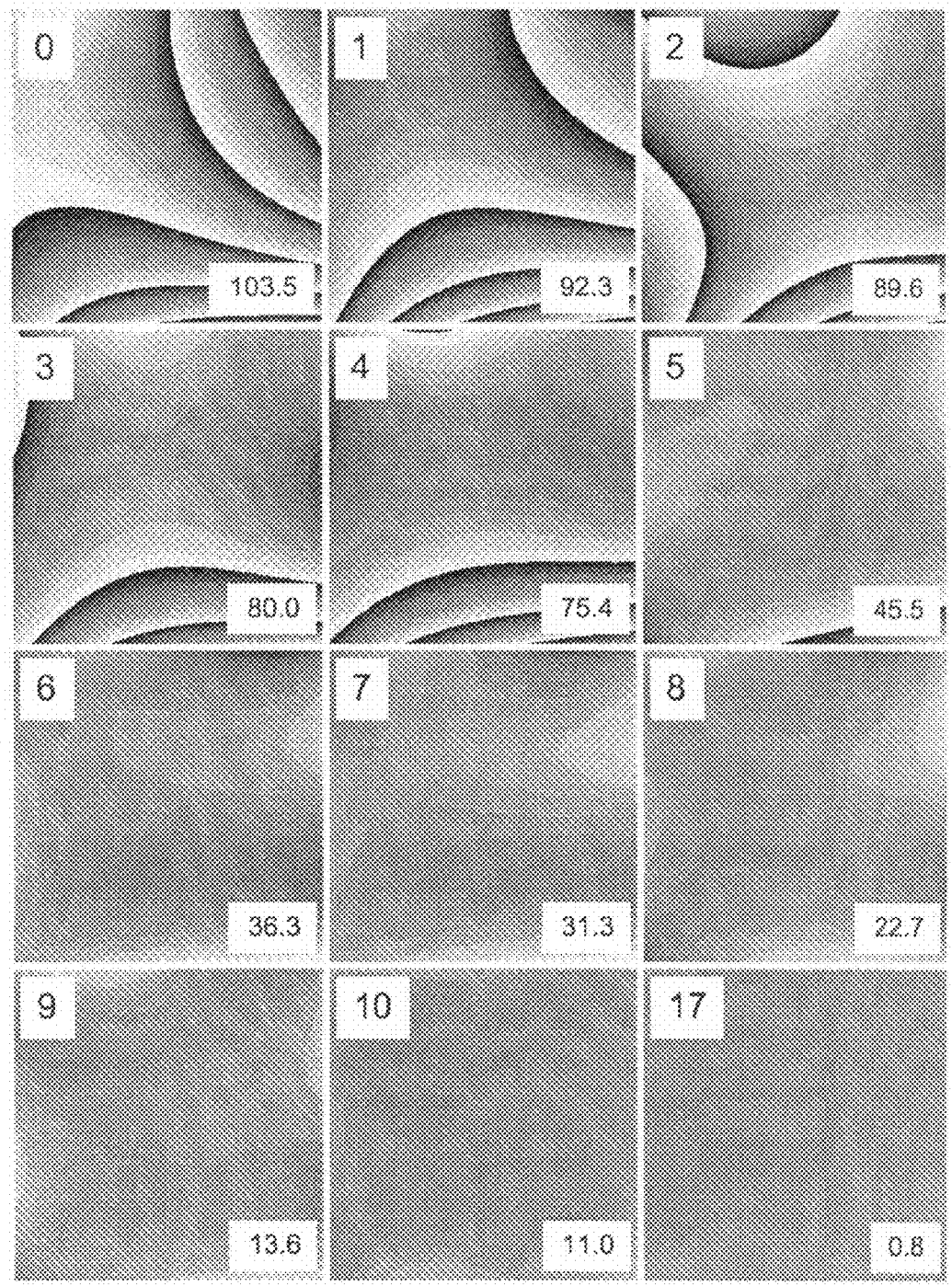
FIG. 22 illustrates possibilities offered by the invention for wave front correction. A series of phase images reconstructed from a hologram recorded without specimen contributions are presented. These images have been obtained using a DWFO defined using Zernike polynomials. The number in the top left corner of each images indicates the polynomial order. The number in the right down corner indicates the standard deviation of phase values, in degree. The first image (polynomial order 0) corresponds to a result without wave front correction according to the present invention.

Some of the possibilities offered by the present invention for wave front correction are illustrated by FIG. 22, which presents a series of phase images reconstructed from a hologram recorded without specimen using a transmission holographic microscope (see e.g. FIG. 19). In transmission, removing the specimen, as performed here, enables a very accurate estimation of instrumental errors since there are no specimen contributions. Presented phase images have been obtained using a DWFO applied after the propagation calculation. The DWFO has been defined using Zernike polynomials to define the phase function of the mathematical model. According to standard conventions, Zernike polynomial orders are connected to aberrations functions, e.g. order 0 for piston or bias, orders 1 and 2 for tilt, order 3 for defocusing, orders 4 and 5 for astigmatism, orders 6 and 7 for coma, order 8 for primary spherical, orders 9 and 10 for trefoil. The number in the top left corner of each images in FIG. 22 indicates the polynomial order (or degree) of the DWFO. Fitted coefficients, have been obtained by a 2D least square fitting on reference data extracted over the entire field of view. The number in the right down corner gives an indication of noise obtained by estimating the standard deviation of phase values, in degree, over the entire field of view. The first image (polynomial order 0) corresponds to a result without correction and shows the presence of strong aberrations inducing strong deformation on a wave front that should ideally be perfectly flat (constant phase distribution). As can be seen phase jumps are present in the phase image up to polynomial order 6. Then, increasing the polynomial order decreases the standard deviation, up to 0.8 for polynomial order 17. Of course the polynomial order can still be increased, but without significant effect in the present case. With conventional wave front sensing systems, such as interferometers or interference microscopes, equivalent wave front quality can be achieved only by recourse to high quality opto-mechanical designs.

Figure 23:
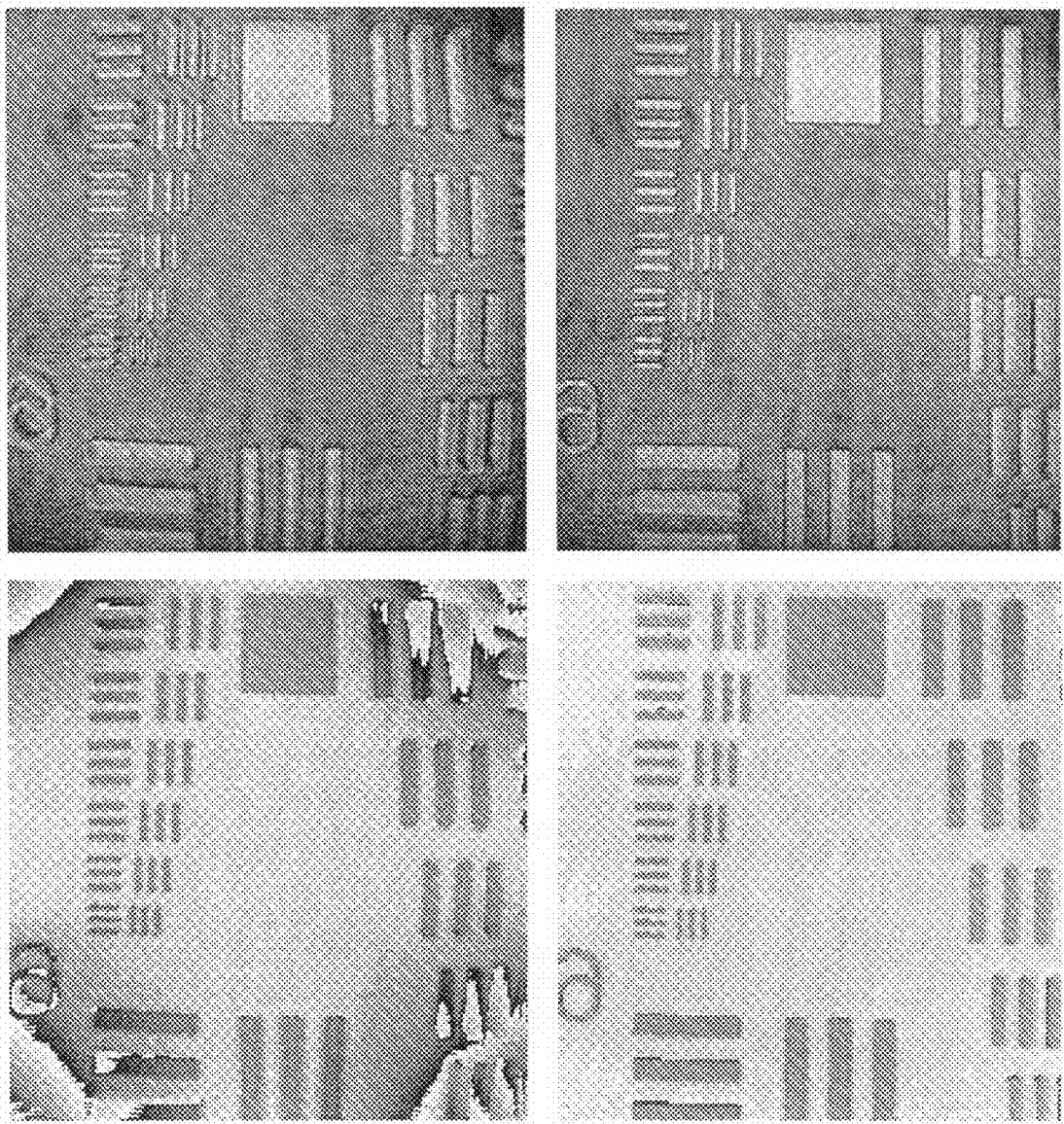
FIG. 23 illustrates possibilities offered by the invention for wave front correction. Uncorrected images are on the left column and corrected images on the right column. Images on the top are intensity images, images on the bottom are phase images. As can be observed, digital wave front processing according to the present invention enables to correct both distortions and aberrations in both intensity and phase images.

FIG. 23 is another illustration of some possibilities offered by the present invention for wave front correction. The corresponding hologram has been recorded with a test target as specimen, on a reflection holographic microscope as presented e.g. in FIG. 20. As a result of imperfections of the optical set-up, aberrations were present in the system. Uncorrected images are on the left column and corrected images on the right column. Images on the top are intensity images, images on the bottom are phase images. Corrected images have been obtained with polynomial functions of order 6 as phase functions for the definition of a mathematical model used to defined two digital wave front operators $DWFO_1$ and $DWFO_2$, which have been applied in two different planes, before and after propagation, according e.g. to FIG. 4. As can be observed, digital wave front processing according to the present invention enables to correct both distortions and aberrations in both intensity and phase images.

Figure 24:
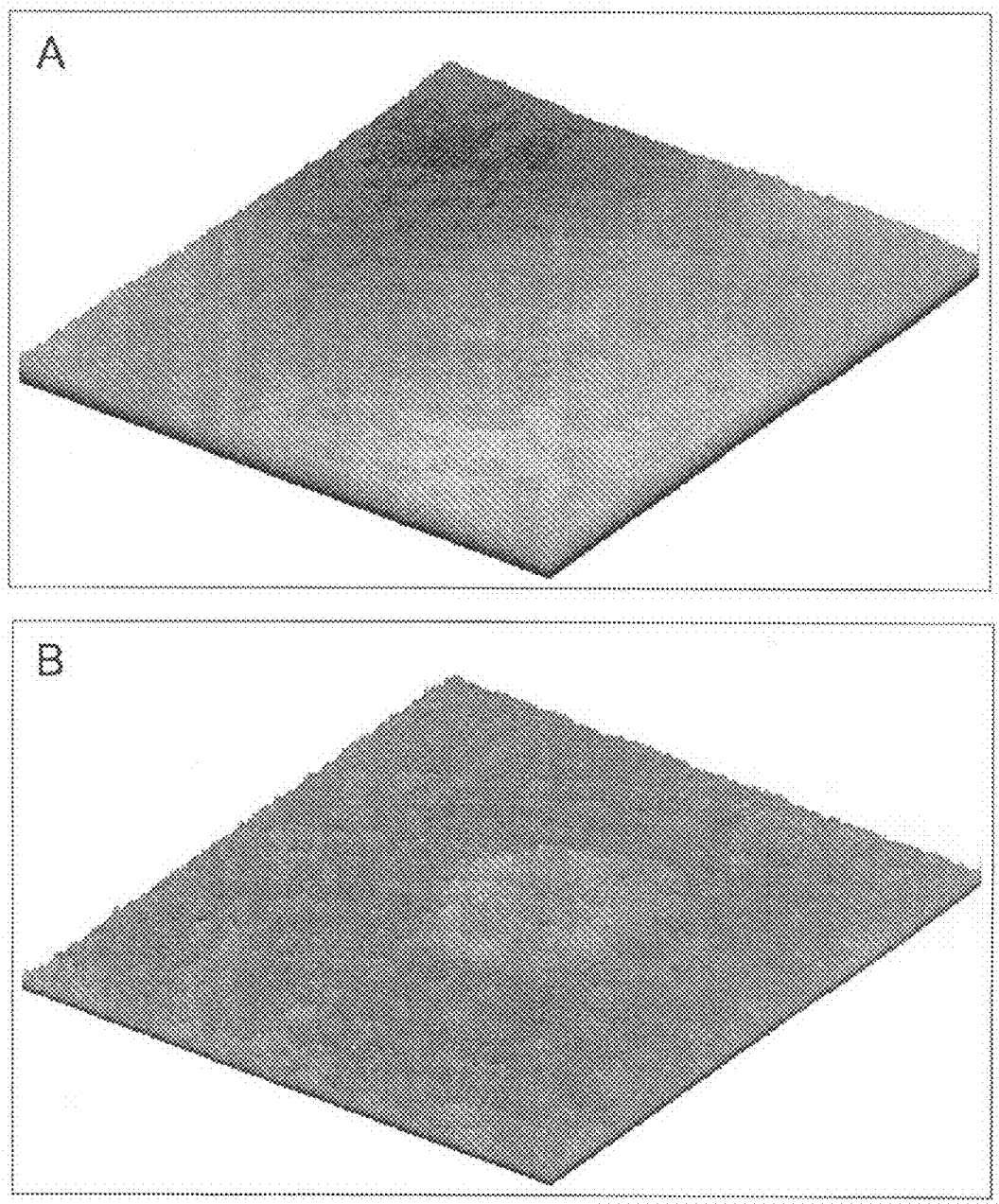
FIG. 24 presents two phase images, in perspective, of the surface of a biochip comprising a thin layer of proteins deposited as a spot on a glass substrate.

FIG. 24 present two phase images, in perspective, obtained using the same procedures as for images presented in FIG. 22, except that a reflection holographic microscope has been used here to observe a biochip comprising a thin layer of proteins deposited as a spot on a glass substrate. FIG. 24A presents the phase image obtained for Zernike polynomial order 6, and FIG. 24 B for Zernike polynomial order 17. As can be seen wave front correction capabilities according to the present invention enable significant improvement of image quality.

Figure 25:
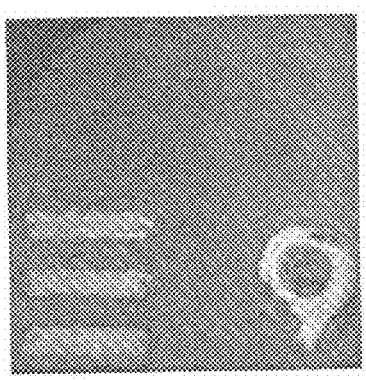
FIG. 25 illustrates possibilities offered by the present invention for magnifying images.
Figure 25:
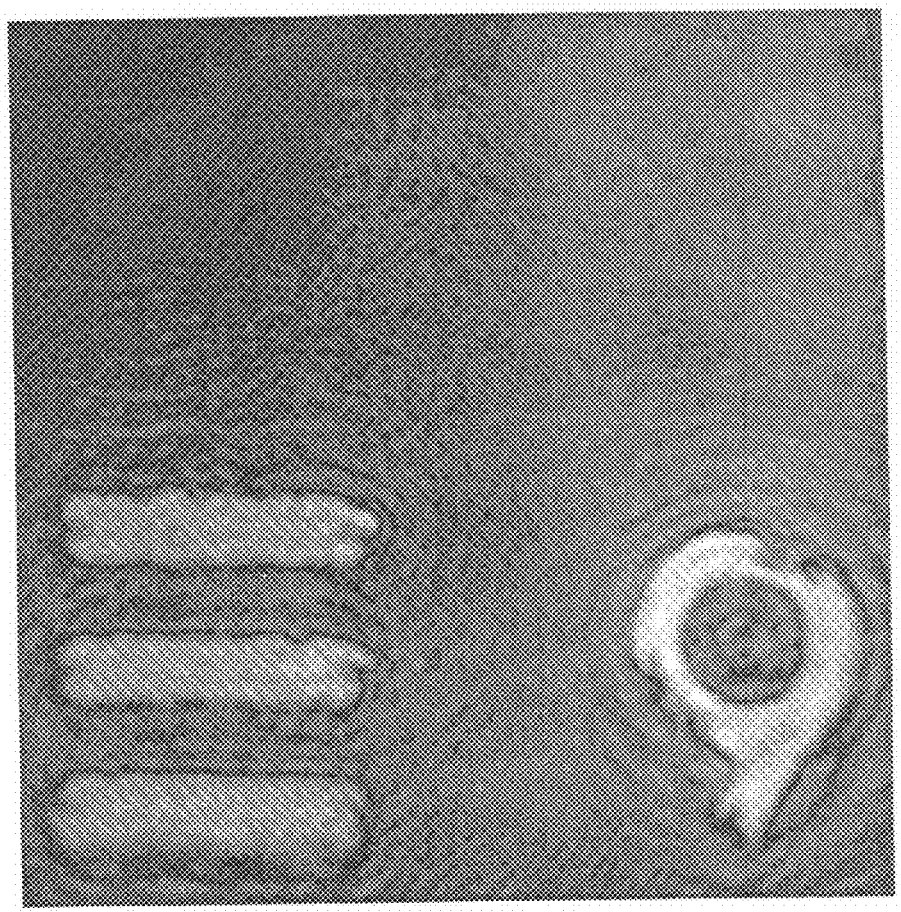

FIG. 25 illustrates possibilities offered by the present invention for magnifying images. FIG. 25 A presents a first image numerically reconstructed without special processing. FIG. 25 B present a magnified image obtained by defining a DWFO playing the role of a digital lens which can be used to magnify the image. The DWF is first propagated in the plane where a digital lens with a given focal length is applied as a DWFO, and then the resulting wave front is propagated again towards a plane where a magnified focused image of the object can be observed. Compared to others digital methods for zooming images, the present procedure presents the advantage that no information is lost as a result of interpolation, because the applied procedure is physically equivalent to what happen experimentally when using a magnifying lens.

REFERENCES

Patents
1. WO200020929, A Method for simultaneous amplitude and quantitative phase contrast imaging by adjusting reconstruction parameters for definition of digital replica of reference wave and aberration parameters correction digitally, by Cuche E. and Depeursinge C., priority US103557P 7 Oct. 1998.
2. WO9857234, Direct to-digital holography and holovision, by Thomas C. E., Baylor L. R., Hanson G. R. et al., priority US873252 11 Jun. 1997.
3. WO2003048868-A, Digital holographic imaging apparatus has container that contains medium in which sample is located, by Marquet P., Cuche E., Depeursinge C., and Magistretti P., priority WOCH00701 04 Dec. 2001.
4. WO200240937-A, High speed interferential microscopic imaging, uses two-arm interferometer with sinusoidal modulation and computer integrating output interference signal, by Dubois A. and Boccara C, priority FR014904 17 Nov. 2000.
5. WO2003060588-A, Microscopic viewing of a 3-D object by viewing the sample through an interferometer with local probes of nanometer dimensions introduced into the sample, by Boccara A. and Dubois A., priority FR000132 07 Jan. 2002.
6. WO2004025379-A2, Direct-to-digital holography system for image processing, has tilting mirror optically coupled between laser and illumination lens at back focus point of lens, where mirror reflects laser beam towards lens at off-axis angle, by Thomas C. T., Mayo M., McMackin I., et al., priority US410151P 12 Sep. 2002.
7. WO2003034010-A, Phase determination of radiation wave-field to produce phase image of objects in optical microscopy using computed measure of phase over object surface, Allman B. E., Nugent K, priority AU008308 16 Oct. 2001.
8. WO2003012822-A1, Phase retrieval from focused and defocused electron beam images in electron microscopy preventing image distortion, Allman B., priority AU006726 31 Jul. 2001
9. WO2003002972-A, Three-dimensional sample image obtaining method, especially a thick biological sample, using combination of digital holography and fluorescence microscopy to yield a clear final image, Dubois F. and Yourassowsky C., priority EP870147 29 Jun. 2001.
10. WO200250513-A, The apparatus to give a two-dimensional ellipsometric display of a sample uses a polarizer and an analyzer, together with a microscope and structured light, to give a view of small samples which are not seen with a normal microscope, Ausserre D., Valignat M., priority FR016529 18 Dec. 2000.

Other Publications
1. Ferraro P., De Nicola S., Finizio A. et al, *Compensation of the Inherent Wave Front Curvature in Digital Holographic Coherent Microscopy for Quantitative Phase-Contrast Imaging*, Applied Optics, Volume 42, Issue 11, 1938-1946, April 2003.
2. Stadelmaier A., Massig J. H, *Compensation of lens aberrations in digital holography*, Optics Letters, Volume 25, Issue 22, 1630-1632, November 2000
3. Lehmann M., *Determination and correction of the coherent wave aberration from a single off-axis electron holo-* gram by means of a genetic algorithm, Ultramicroscopy, Volume 85, Issue 3, 165-182, November 2000.
4. A. Y. M. N G, C. W. See and M. G. Somekh, *Quantitative optical microscope with enhanced resolution using pixilated liquid crystal spatial light modulator*, Journal of Microscopy Vol. 214, pp 334-340, 2004.
5. M. Schwertner, M. J. Booth, M. A. A. Neil and T. Wilson, *Measurement of specimen-induced aberrations of biological samples using phase stepping*, Journal of Microscopy Vol. 213, pp 11-19, 2004.
6. Wenbo Xu, M. H. Jericho, I. A. Meinertzhagen, and H. J. Kreuzer, *Digital in-line holography for biological applications*, Proc. Natl. Acad. Sci. USA, Volume 98, pp. 11301-11305, 2001.
7. M. Liebling, T. Blu and M. Unser, *Complex-Wave Retrieval from a Single Off-Axis Hologram*, Journal of the Optical Society of America A, vol. 21, no. 3, pp. 367-377, March 2004.
8. D. Carl, B. Kemper, G. Wemicke and G. von Bally, *Parameter-optimized digital holographic microscope for high-resolution living-cell analysis*, Applied Optics, Vol. 34, Issue 36, pages 6536-6544, December 2004.

The invention claimed is:

1. A method for acquiring a digital image of a specimen comprising the following steps:
providing a specimen (10),
sensing said specimen (10) with a wave front sensor (11),
processing the wave front obtained by said wave front sensor (11),
providing an initial digital wave front (DWF) of said specimen by use of a processing unit (12) connected to a wave front sensor (11),
providing at least one digital wave front operator (DWFO) defined by use of at least one mathematical model (21) and by use of at least one set of coefficients,
processing said digital wave front (DWF) by use of a wave front processing unit (15) using at least one of said digital wave front operator (DWFO) and providing a processed digital wave front (PDWF),
analyzing with a wave front analysis unit (17) at least said digital wave front (DWF), said processed digital wave front (PDWF) or a at least one wave front available from said wave front processing unit (15),
providing reference data (18) from said wave front analysis unit (17), and
using said reference data (18) for obtaining a digital image of said specimen (10).

2. A method according to claim 1 further comprising fitting procedures (19) on said reference data (18), and wherein said fitting procedures (19) provides at least one set of coefficients defined as fitted coefficients (20).

3. A method of claim 1 wherein said reference data (18) are extracted from specific areas of a wave front called reference areas, and wherein said specimen (10) has contributions and the contributions of said specimen (10) are known or assumed to be known inside said reference area.

4. A method of claim 1 wherein said wave front analysis unit defines said reference data by use of at least one of: tasks performed a human operator, automated tasks such as digital image analysis procedures.

5. A method of claim 1 wherein a plurality of said digital wave front operators (DWFO) are defined in a plurality of different planes, and wherein a propagation between said plurality of planes is achieved by use of procedures for calculating numerically the propagation of wave fronts.

6. A method of claim 1 wherein at least parts of said reference data are one-dimensional data extracted from a set of profiles, and wherein at least one of said set of coefficients is obtained by:
building a system of equations with the data extracted from said profiles, and
solving said system of equations in order to obtain said set coefficients.

7. A method of claim 1 further comprising processing operations of at least one of: the reference data, the digital wave front, the processed digital wave front, or a wave front available from said wave front processing unit, and wherein said processing operations comprises at least one of: low-pass filtering, band-pass filtering, high-pass filtering, phase unwrapping, averaging, summation.

8. A method of claim 1 wherein at least one of said set of coefficients are calibrated coefficients defined during a previous use of the method of claim 1 using a reference specimen, and wherein said reference specimen is a specimen for which specimen contributions are known or assumed to be known.

9. A method of claim 1 further comprising a procedure for compensating temporal fluctuations comprising the steps of:
a phase offset consign is defined,
a measured phase offset is measured from the reference data (18), and
the difference between the phase offset consign and the measured phase offset is used to define a digital wave front operator (DWFO) for temporal offset compensation.

10. A method of claim 1 further comprising a procedure for tilt compensation comprising the steps of:
a tilt or a slope is evaluated from the reference data (18), and
said tilt or slope is used to define a digital wave front operator (DWFO) for tilt compensation.

11. An apparatus for the method according to claim 1, said apparatus comprising:
a wave front sensor (11),
a processing unit (12) connected to said wave front sensor (11) and adapted for providing a digital wave front (DWF),
means to provide at least one digital wave front operator (DWFO),
a wave front processing unit (15) adapted for providing a processed digital wave front (PDWF), and
a wave front analysis unit (17) adapted to analyze at least said digital wave front (DWF), said processed digital wave front (PDWF) or a at least one wave front available from said wave front processing unit (15), said wave front analysis unit (17) being furthermore adapted to provide reference data (18).

12. The apparatus of claim 11 wherein at least one of said digital wave front operators (DWFO) is dedicated to wave front correction, meaning that it aims at removing or reducing error contributions comprising at least one of: experimental errors, instrumental errors, environmental errors, numerical or digital errors, wave front deformations, aberrations, errors inducing differences with respect to an ideal wave front.

13. The apparatus of claim 11 wherein the use of at least one of said digital wave front operator (DWFO) enables at least one of: obtaining a flattened representation of a non-flat specimen, simplifying said wave front sensor, improving the performances of said wavefront sensor, simplifying the use of said wave front sensor, improving the robustness of said wave front sensor, reducing the costs of said wave front sensor, reliable imaging performance with said wave front sensor being an instrument not specifically designed or optimized for imaging purposes, reliable wave front sensing with said wave front sensor being an instrument not specifically designed or optimized for wave front sensing.

14. The apparatus of claim 11 wherein at least one of said digital wave front operator (DWFO) enables to describe the physical behaviour of an optical element such as a lens, a system of lenses, a prism, an aperture, a diffractive element, an array of optical elements, a gradient index element, a mirror, a diffuser.

15. The apparatus of claim 11 further comprising a digital wave front operator (DWFO) defined by the complex transfer function or by the optical transfer function of the wave front sensor.

16. The apparatus of claim 11 further comprising at least one digital wave front operator (DWFO) changing dynamically as a function of time.

17. The apparatus of claim 11 wherein said wave front sensor is one of: a digital holographic microscope, a digital holographic endoscope, a digital holographic telescope, an interferometer, an interference microscope, a device for direct to digital holography, a device for quantitative phase imaging, a Hartmann-Shack sensor, a device for ellipsometry, a device for in-line holography, a device for fringe projection, a device for digital holography or interferometry working with a synthetic wavelength, a dual wavelength device for digital holography or interferometry, a device combining fluorescence microscopy and digital holographic microscopy or interferometry, a roughness sensor, a distance sensor, a displacement sensor, a refractive index sensor, an optical properties sensor.

18. The apparatus of claim 11 implemented conjointly with other imaging or measuring devices such as a scanning probe microscope, an atomic force microscope, an optical microscope, a fluorescence microscope, a confocal microscope, an ellipsometer.

19. Use of the apparatus of claim 11 for quality control, cellular biology, proteomics and genomics, pharmaceutical research, high throughput screening, nano-technology, micro-technology, semi-conductor technology, micro-electronics, non-destructive testing, surface topography, surface analysis, optical testing, non-invasive imaging, cell on chip inspections, micro-fluidic devices inspections, inspections—dynamic inspections in particular—of micro electro mechanical systems (MEMS) and micro opto electro mechanical systems (MOEMS), characterization of surfaces and internal structures in transparent and semi-transparent specimen, inspection of micro-injected or molded parts, temporal observations of dynamic processes, stroboscopic imaging, temporal observations of dynamic processes over long periods of time, spatial applications, sub-marine applications.

* * * * *